United States Patent
Tokuhashi et al.

(10) Patent No.: US 7,620,713 B2
(45) Date of Patent: Nov. 17, 2009

(54) DEVICE CONTROL MANAGEMENT APPARATUS

(75) Inventors: Yoshio Tokuhashi, Nara (JP); Toru Ueda, Kyoto (JP); Minoru Takemoto, Chiba (JP); Ken Nakashima, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 855 days.

(21) Appl. No.: 10/512,057

(22) PCT Filed: Apr. 14, 2003

(86) PCT No.: PCT/JP03/04720

§ 371 (c)(1),
(2), (4) Date: Oct. 21, 2004

(87) PCT Pub. No.: WO03/092265

PCT Pub. Date: Nov. 6, 2003

(65) Prior Publication Data

US 2006/0031438 A1 Feb. 9, 2006

(30) Foreign Application Priority Data

Apr. 23, 2002 (JP) ............................. 2002-121505

(51) Int. Cl.
*G06F 15/16* (2006.01)
*G06F 15/173* (2006.01)

(52) U.S. Cl. ................. 709/224; 709/217; 709/219; 709/223; 709/229

(58) Field of Classification Search ................. 709/219, 709/223, 225, 231, 217, 224, 228
See application file for complete search history.

(56) References Cited

U.S. PATENT DOCUMENTS

| | | | | |
|---|---|---|---|---|
| 5,249,269 | A * | 9/1993 | Nakao et al. | 709/225 |
| 6,836,287 | B1 | 12/2004 | Nakahara | |
| 6,870,555 | B2 * | 3/2005 | Sekiguchi | 709/217 |
| 6,981,094 | B2 * | 12/2005 | Nonaka et al. | 709/223 |
| 2001/0025308 | A1 * | 9/2001 | Jinushi et al. | 709/219 |

(Continued)

FOREIGN PATENT DOCUMENTS

JP      2000-59760 A     2/2000

(Continued)

*Primary Examiner*—Quang N. Nguyen
(74) *Attorney, Agent, or Firm*—Birch, Stewart, Kolasch & Birch, LLP

(57) ABSTRACT

Control commands are sent from communication stations (A, B) to devices (D to F), such as a VTR, connected to a communication station (C) via radio networks (NW) provided between the communication stations (A, B) and the communication station (C), thereby controlling the devices (D to F). As a result, video signals outputted from the devices (D to F) via analog wirings (W) are sent from the communication station (C) to the communication stations (A, B) so that videos based on the video signals are displayed in display devices (A11, B11) via the communication stations (A, B). In the communication station (C), identifiers for specifying controllers (A1, B1) which have sent the control commands to the communication stations (A, B) and identifiers for specifying the devices (D to F) controlled are made to respectively correspond to each other, and are stored so that a controller which can be allowed to control is specified. When the control command is sent from the controller (A1), the communication station (C) adds a control right for the device (D) for example to the controller upon confirming that the controller (A1) can be allowed to control the device (D).

31 Claims, 47 Drawing Sheets

U.S. PATENT DOCUMENTS

| | | | |
|---|---|---|---|
| 2002/0013827 A1* | 1/2002 | Edstrom et al. | 709/219 |
| 2002/0091848 A1* | 7/2002 | Agresta et al. | 709/231 |
| 2003/0041137 A1* | 2/2003 | Horie et al. | 709/223 |
| 2006/0070105 A1 | 3/2006 | Kawai | |

FOREIGN PATENT DOCUMENTS

| | | |
|---|---|---|
| JP | 2000-134502 A | 5/2000 |
| JP | 2000-196636 A | 7/2000 |
| JP | 2000-224673 A | 8/2000 |
| JP | 2000-269994 A | 9/2000 |
| JP | 2000-269994 A | 9/2000 |
| JP | 2000-350178 A | 12/2000 |
| JP | 2001-148705 A | 5/2001 |
| JP | 2001-218194 A | 8/2001 |

\* cited by examiner

FIG. 5

| DEVICE ID | DEVICE NAME | CONTROL INFORMATION |
|---|---|---|
| 123 | VTR1 | |
| 456 | DVD | |
| 789 | VTR2 | 555 |
| ⋮ | ⋮ | ⋮ |

FIG. 6

| SELECTION | DEVICE ID | DEVICE NAME | COMMUNICATION ADDRESS |
|---|---|---|---|
| | 123 | VTR1 | 33333 |
| | 456 | DVD | 33333 |
| | 789 | VTR1 | 33333 |
| | 222 | TV1 | 22222 |
| | ⋮ | ⋮ | ⋮ |

FIG. 7

| RECEIVING END ADDRESS | 33333 | |
|---|---|---|
| SENDING END ADDRESS | 11111 | |
| INFORMATION SECTION | COMMAND | CONTROL RIGHT REQUEST |
| | TARGET DEVICE ID | 123 |
| | SENDING DEVICE ID | 444 |
| | ⋮ | ⋮ |

FIG. 10

| COMMAND | TARGET DEVICE ID | CONTROLLER ID |
|---|---|---|
| CONTROL RIGHT REQUEST | 123 | 444 |

FIG. 12

| SELECTION | DEVICE ID | DEVICE NAME | COMMUNICATION ADDRESS |
|---|---|---|---|
| ○ | 123 | VTR1 | 33333 |
|   | 456 | DVD | 33333 |
|   | 789 | VTR2 | 33333 |
|   | 222 | TV1 | 22222 |
|   | ⋮ | ⋮ | ⋮ |

FIG. 14

| DEVICE ID | DEVICE NAME | CONTROL INFORMATION |
|---|---|---|
| 123 | VTR1 | 444 |
| 456 | DVD | |
| 789 | VTR2 | 555 |
| ⋮ | ⋮ | ⋮ |

FIG. 15

| RECEIVING END ADDRESS | 11111 | |
|---|---|---|
| SENDING END ADDRESS | 33333 | |
| INFORMATION SECTION | COMMAND | CONTROL RIGHT REQUEST |
| | TARGET DEVICE ID | 123 |
| | SENDING DEVICE ID | 444 |
| | ⋮ | ⋮ |

FIG. 17

| COMMAND | CONTROLLER ID |
|---|---|
| REPRODUCTION | 444 |

FIG. 18

| RECEIVING END ADDRESS | 33333 | |
|---|---|---|
| SENDING END ADDRESS | 11111 | |
| INFORMATION SECTION | COMMAND | REPRODUCTION |
| | TARGET DEVICE ID | 123 |
| | SENDING DEVICE ID | 444 |
| | ⋮ | ⋮ |

FIG. 19

| RECEIVING END ADDRESS | 11111 | |
|---|---|---|
| SENDING END ADDRESS | 33333 | |
| INFORMATION SECTION | COMMAND | NO CONTROL RIGHT |
| | TARGET DEVICE ID | 123 |
| | SENDING DEVICE ID | 444 |
| | ⋮ | ⋮ |

FIG. 21

| COMMAND | TARGET DEVICE ID | CONTROLLER ID |
|---|---|---|
| REPRODUCTION | 123 | 444 |

FIG. 25

| DEVICE ID | DEVICE NAME | CONTROL INFORMATION | STREAM RECEIVING END |
|---|---|---|---|
| 123 | VTR1 | 444 | 11111 |
| 456 | DVD | | |
| 789 | VTR2 | 555 | 22222 |
| ⋮ | ⋮ | ⋮ | ⋮ |

FIG. 28

| DEVICE ID | DEVICE NAME | CONTROL INFORMATION |
|---|---|---|
| 123 | VTR1 | *** |
| 456 | DVD | |
| 789 | VTR2 | 555 |
| ⋮ | ⋮ | ⋮ |

FIG. 43

| NUMBER | DEVICE NAME | DEVICE TYPE | COMMUNICATION STATION | CONDITION |
|---|---|---|---|---|
| 1 | VTR IN LIVING ROOM | VTR | COMMUNICATION STATION IN LIVING ROOM | UNUSED |
| 2 | DVD IN LIVING ROOM | DVD | COMMUNICATION STATION IN LIVING ROOM | IN USE |
| 3 | VTR IN CHILD'S ROOM | VTR | COMMUNICATION STATION IN CHILD'S ROOM | UNCLEAR |
| 4 | HARD DISC RECORDER IN STUDY ROOM | HARD DISC RECORDER | COMMUNICATION STATION IN STUDY ROOM | UNUSED |

| RECEIVING END ADDRESS | 11111 | |
|---|---|---|
| SENDING END ADDRESS | 33333 | |
| INFORMATION SECTION | COMMAND CONTENT | CONNECTION ESTABLISHMENT REQUEST |
| | SENDING END COMMUNICATION STATION ADDRESS | 33333 |
| | SENDING END DEVICE ID | 123 |
| | RECEIVING END COMMUNICATION STATION ADDRESS | 11111 |
| | RECEIVING END DEVICE ID | 1111 |
| | CONTROLLER ID | 444 |

DEVICE CONTROL MANAGEMENT APPARATUS

TECHNICAL FIELD

The present invention relates to a device control management apparatus for managing a condition under which a device is controlled, so as to give a control right to a specific control source out of a plurality of control sources.

BACKGROUND ART

Generally, a device such as an AV (Audio Visual) device has a remote control function based on a remote controller, by which a user can control the device so that the device carries out various operations remote from the user. Further, recently, it has become easier to carry out data communication at a short distance between devices with advancement of data communication technique.

For example, Japanese Unexamined Patent Publication No. 134502/2000 (Tokukai 2000-134502) (Publication date: May 12, 2000) discloses a delivery apparatus in which data is, by radio, sent/received between (i) a sending device connected to an AV device or a TV receiver and (ii) a receiving device connected to the TV receiver. In this delivery apparatus, when a user on the side of the receiving device selects an AV device and gives an instruction such as "reproduction" by means of a remote controller, the sending device selects the AV device in accordance with information sent from the receiving device, and gives the instruction of "reproduction" for example by means of infrared ray data communication. A video and a sound reproduced by the AV device are sent from the sending device and are received by the receiving device, and are outputted to the TV receiver on the side of the receiving device. According to the delivery apparatus, it is possible to operate the AV device and it is possible to listen to its output sound and to view its output video at such position that it is impossible to operate the AV device by means of a remote controller (for example, in another room).

However, according to such delivery apparatus, in case where a plurality of receiving devices are respectively disposed at different positions and a plurality of users operate the AV device via the respective receiving devices, when the users operate the same AV device, the AV device operates in response to operation instructions given by the respective users. Thus, a single user cannot exclusively operate the AV device.

Such disadvantage can be solved by a control method disclosed, for example, by Japanese Unexamined Patent Publication No. 148705/2001 (Tokukai 2001-148705) (Publication date: May 29, 2001). According to the control method, respective controlled devices are made accessible, and an access right is given to any one of controlling devices, thereby controlling a single controlled device corresponding to the controlling device. In the control method, the access right is given to each controlling device (each node).

Further, Japanese Unexamined Patent Publication No. 269994/2000 (Tokukai 2000-269994) (Publication date: Sep. 29, 2000) discloses a control method in which: a management device for managing the access right in a network is provided, and a user registers (i) an identification code of a controller and (ii) an identification code of a controlled device in the management device in advance, and a combination of (i) the identification code of the controller and (ii) the identification code of the controlled device is outputted while outputting an operation signal from the controller. The management device compares the combination with the registered combination. When the combination and the registered combination are identical to each other, the management device responds so as to make the controller accessible. When the combination and the registered combination are not identical to each other, the management device responds so as not to make the controller accessible.

Thus, each of plural devices connected to a network receives mere an instruction given by the controller to which the access right has been given, so that it is possible to avoid such disadvantage that a single device limitlessly receives instructions given by a plurality of controllers.

However, according to the control method disclosed by Tokukai 2001-148705, the controlled device has a table for setting the access rights, so that it is necessary to manage the access rights of the respective controlled devices. Thus, it is necessary that the controlled device includes a memory region for the table and a program for managing the access rights. This causes manufacturing cost of the controlled device to rise.

While, according to the control method disclosed, the management device manages information for giving the control right, so that each of the controlled devices does not have to manage the information. However, the control method brings about the following disadvantage. According to the control method, the management device manages the control right with respect to the controlled device connected to the network, but it is impossible to manage the control rights of the controlling devices which are not connected to a network (communication network between the sending device and the receiving device).

Further, according to both the control method disclosed by Tokukai 2001-148705 and the control method disclosed by Tokukai 2000-269994, a special command for obtaining the control right is sent to a device which manages the control right of the corresponding device, so that the control right is obtained. However, in the control method, it is necessary that a device other than the device for managing the control right, e.g., a device which requests the control right can explicitly treat the control right, so that it is impossible to obtain the control right from a conventional device which gives no consideration for treatment of the control right.

The present invention was devised from the foregoing viewpoint, and its object is to provide a device control management apparatus which can manage a control right with respect to a device which is not directly connected to a network. Also, the object of the present invention is to provide a device control management apparatus which can treat a control right in response to an operation of a device which gives no consideration for treatment of the control right.

DISCLOSURE OF INVENTION

The device control management apparatus of the present invention includes: first communication means connected to each of communication devices via each of first communication paths; second communication means connected to each of controlled devices via each of second communication paths; and control right management means for managing a control right that is set between the communication device connected to the first communication means and the controlled devices connected to the second communication means.

According to the arrangement, it is possible to manage the control right between devices that are not connected to the same network (between the communication devices and the controlled devices).

For a fuller understanding of the nature and advantages of the invention, reference should be made to the ensuing detailed description taken in conjunction with the accompanying drawings.

BRIEF DESCRIPTION OF DRAWINGS

FIG. 5 shows a control information management table provided in the video signal sending side communication station.

FIG. 6 shows a control information management table provided in the video signal receiving side communication station.

FIG. 7 shows an arrangement of a packet, including a command for requesting the control right, which is sent between both the communication stations.

FIG. 10 shows an arrangement of a control signal, including the command for requesting the control right, which is sent from a controller on the side of the video signal receiving side communication station.

FIG. 12 shows a condition under which a device ID is selected in the device information management table.

FIG. 14 shows a condition under which values of control information are written in the control information management table.

FIG. 15 shows an arrangement of a packet, including a command indicative of "success in the request for the control right", which is sent between both the communication stations.

FIG. 17 shows an arrangement of a control signal including a reproduction command.

FIG. 18 shows an arrangement of a packet including the reproduction command.

FIG. 19 shows an arrangement of a packet including a command result indicating that there is no control right.

FIG. 21 shows an arrangement of a control signal including the device ID.

FIG. 25 shows a control information management table used in the video signal sending side communication station of FIG. 24.

FIG. 28 shows a control information management table used in the video signal sending side communication station of FIG. 27.

FIG. 43 shows a condition under which the device selection process causes a list of devices to be displayed in a display section of a display device.

FIG. 46 shows an arrangement of a packet, including a command for requesting connection, which is sent between both the communication stations.

BEST MODE FOR CARRYING OUT THE INVENTION

One embodiment of the present invention is described below with reference to FIG. 1 to FIG. 51. Note that, the present invention is not limited to this.

Embodiment 1

Figure 1:
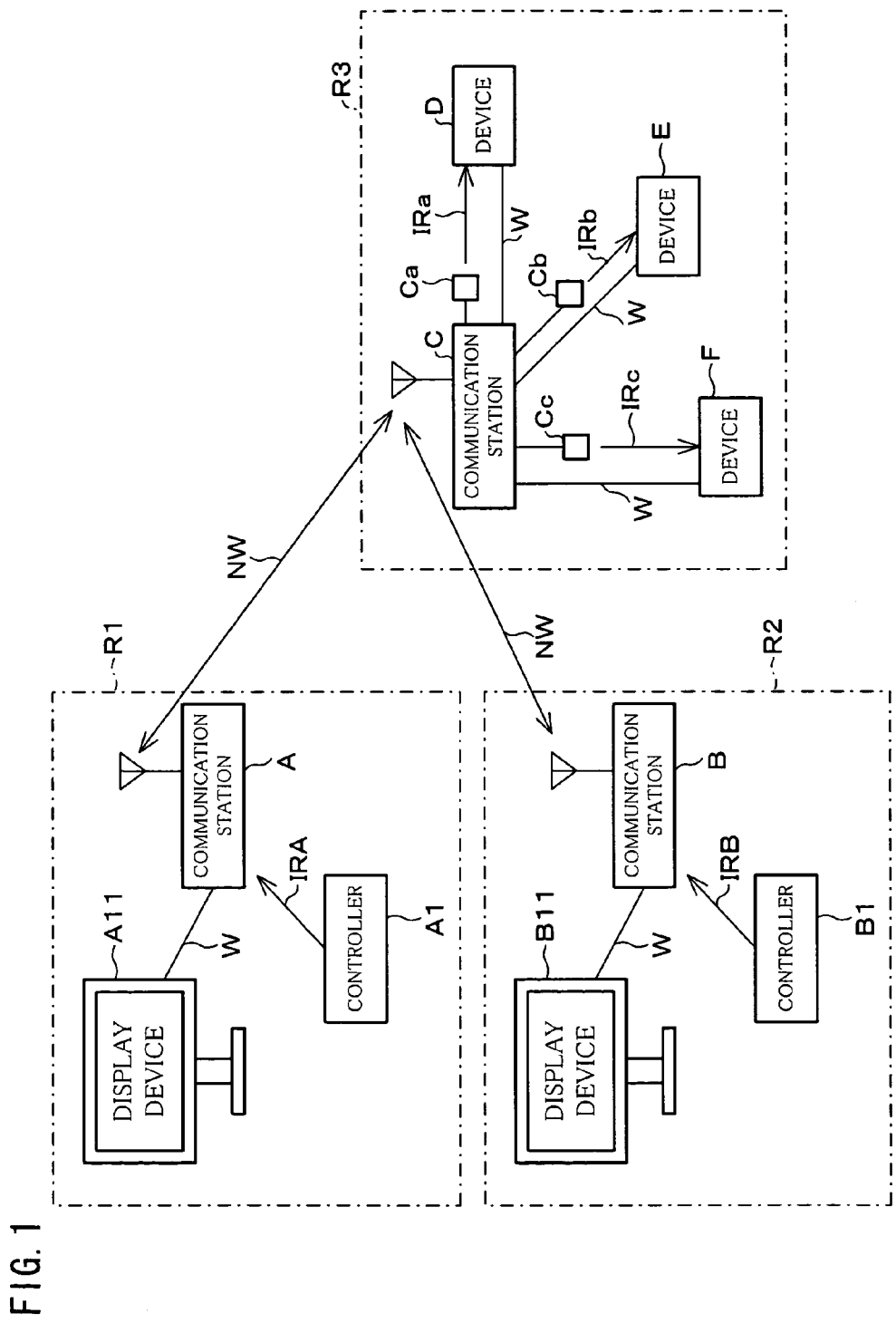
FIG. 1 is a block diagram showing an arrangement of an AV system according to an embodiment of the present invention.

FIG. 1 shows an AV system according to the present embodiment.

The AV system includes communication stations A to C as first communication means respectively disposed in different rooms R1 to R3. Further, in the room R1, a controller A1 and a display device A11 are disposed. In the room R2, a controller B1 and a display device B11 are disposed. Further, in the room R3, devices D to F are disposed. Each of the communication stations A and B can send/receive various kinds of information to/from the communication station C via a radio network NW (first communication path) such as a radio LAN.

The controllers A1 and B1 each of which functions as a control source device are remote control devices (remote controllers) which respectively send infrared rays IRA and IRB for controlling devices to the communication stations A and B. Each of the controllers A1 and B1 has various kinds of operation buttons. A user pushes the operation buttons, so that control signals including control information corresponding to the operation buttons are modulated, and thus modulated control signals are sent as the infrared rays IRA and IRB.

The display devices A11 and B11 are respectively connected to the communication stations A and B, and function as devices which display some of output videos of the devices D to F that had been sent from the communication station C and were received by the communication stations A and B. Each of the display devices A11 and B11 may be a television receiver which can display an external input video, or may be a monitor device which displays mere the external input video. The display devices A11 and B11 are connected to the communication stations A and B respectively via analog wirings (image signal transmission lines) W each of which functions as the second communication path. Video signals are transmitted from the communication stations A and B via the analog wirings W.

Each of the devices D to F is a device, such as a tuner, a video recorder, a DVD recorder, and a hard disk recorder, which can output a video. The devices D to F are connected to the communication station C via the analog wirings W (second communication path), and transmit video signals to the communication station C via the analog wirings W.

Further, the communication station C is provided with control signal sending sections Ca to Cc. The control signal sending sections Ca to Cc respectively emit infrared rays IRa to IRc to the devices D to F, so that control signals that had been sent from the communication stations A and B and were received by the communication station C are sent to the devices D to F.

As described above, the communication stations A and B and the communication station C communicate with each other via the radio networks NW, so that information such as video data and a control signal can be exchanged.

In the present embodiment, in case where the user in the room R1 views a video outputted from the device D in the room R3 via the radio network NW, there is provided means for controlling the device D via the radio network NW. Moreover, in this case, the present embodiment also provides means for restricting the device D so that the device D is not arbitrarily operated by another user in the room R2. The means are specifically described as follows.

Figure 2:
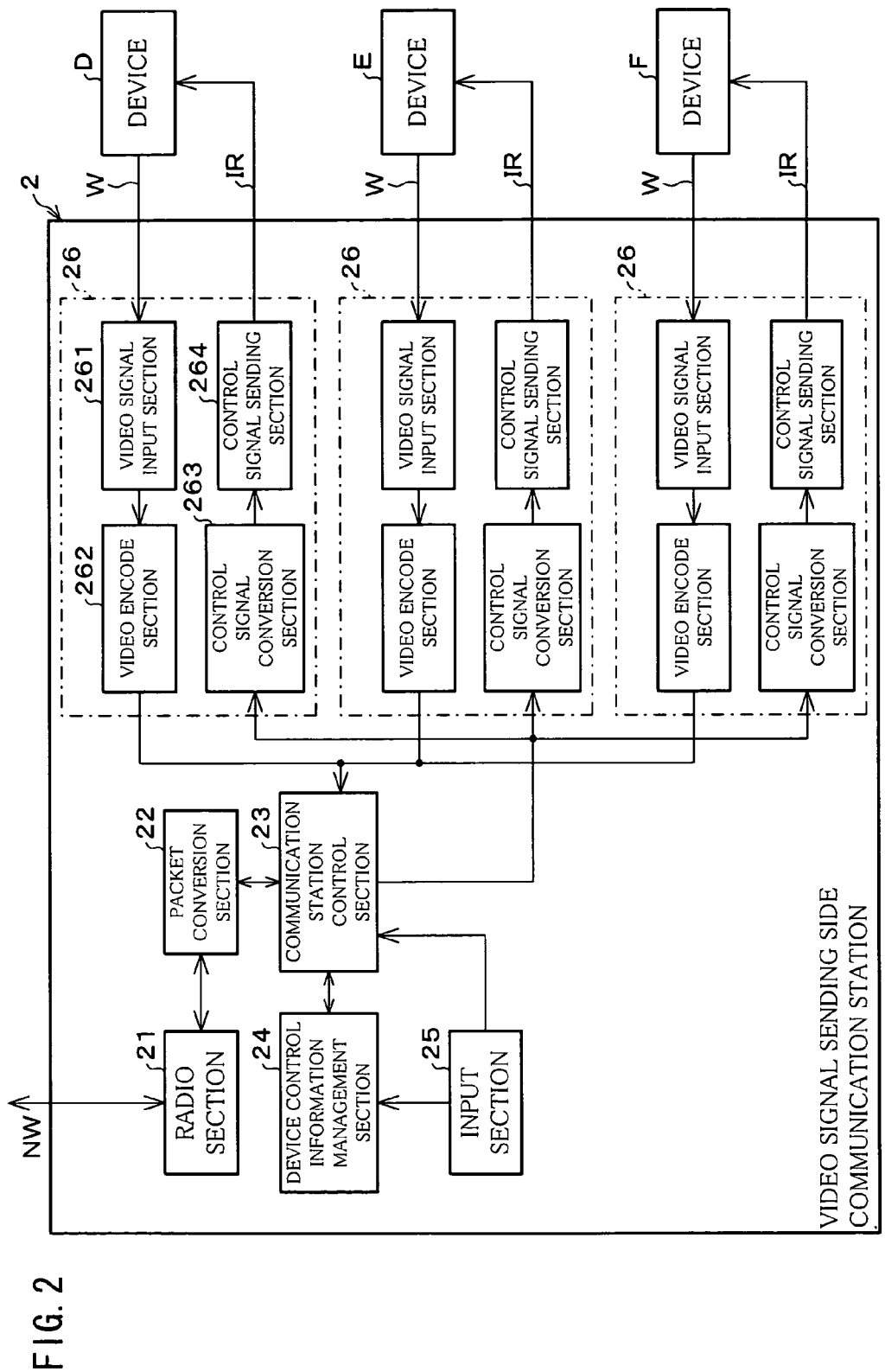
FIG. 2 is a block diagram showing an arrangement of a video signal sending side communication station of the AV system.

FIG. 2 is a block diagram showing a video signal sending side communication station (hereinafter, referred to merely as a sending station) 2. The sending station 2 corresponds to the aforementioned communication station C shown in FIG. 1.

The sending station 2 includes a radio section 21, a packet conversion section 22, a communication station control section 23, a device control information management section 24, an input section 25, and a signal processing section 26.

The radio section 21 has a radio communication function for carrying out communications via the radio network NW, and has a communication circuit for realizing the radio communication function.

The packet conversion section 22 is a circuit which converts data into a packet, and provides the packet to the radio section 21 in order to exchange information having passed through the radio network NW, and converts the packet into data in order to obtain original data from the packet that has been received by the radio section 21. A packet format will be described later.

The communication station control section 23 is a portion for entirely controlling the sending station 2, and carries out a process for exchanging data between the packet conversion section 22 and the signal processing section 26, and carries out a process for giving a control right to a specific controller in accordance with information of a control right registered in the control information management table (described later) of the device control information management section 24.

Specifically, the communication station control section 23 which functions as specific means extracts (i) information (control source specifying information) for specifying the controllers A1 and B1 or the communication stations A and B each of which functions as a control source and (ii) information (controlled device specifying information) for specifying the devices D to F each of which is to be controlled by the controllers A1 and B1, from the data which the packet conversion section 22 has obtained from the received signal, thereby specifying the controllers A1 and B1 or the communication stations A and B, and the devices D to F. Examples of the control source specifying information include: sender addresses (described later) which are addresses of the communication station A and B; and controller IDs which are identifiers of the controllers A1 and B1.

The communication station control section 23 which functions as control allowing means compares (i) a relationship in which the controllers A1 and B1 correspond to the devices D to F that are specified as described above with (ii) a relationship in which the controllers A1 and B1 managed in the control information management table by the device control information management section 24 so as to be allowed to control the devices D to F in advance correspond to the devices D to F which are targeted by the controllers A1 and B1. When both the relationships are identical to each other, the communication station control section 23 causes the controllers, which have been allowed to control the devices, to control the target devices.

Further, the communication station control section 23 receives a command from the packet conversion section 22, or receives a signal, which the user inputs to the communication station C, from the input section 25 described later. When the received command or the signal inputted by the user relates to the control right, the communication station control section 23 refers to the control information of the control information management table managed by the device control information management section 24 (described later) so as to update the information as required.

The device control information management section 24 which functions as corresponding management means has the control information management table therein so as to manage control information and the like of the respective devices D to F connected to the sending station 2. Further, the device information management section 24 allows registration and edition of information managed in the control information management table in response to information inputted from the input section 25. The control information management table includes: an identifier (device ID) of a target device; and an identifier of a control source for controlling the device (for example, a relationship with respect to a controller ID of the controller). A structure of the control information management table will be detailed later.

The device control information management section 24 sets the control right with respect to one or more controllers each of which generates a local command which can be received by the receiving station 3.

The input section 25 is an input device by which the user inputs information to the device control information management section 24 and inputs an instruction for the communication station control section 23, and is constituted of a keyboard or buttons.

The signal processing section 26 is provided so as to correspond to the number of connectable devices, and includes a video signal input section 261, a video encode section 262, a control signal conversion section 263, and a control signal sending section 264.

The video signal input section 261 is a portion which receives a video signal transmitted from each of the connected devices D to F via the analog wirings W, and has an input terminal and an AGC (Auto Gain Control) circuit.

The video encode section 262 converts the video signal received from the video signal input section 261 into a digital signal so that the video signal can be included in a packet.

The control signal conversion section 263 converts a control command such as "reproduction" and "stop" so that the control command corresponds to a format of each of the devices D to F which are to be controlled. The control signal sending section 264 corresponds to the aforementioned control signal sending sections Ca to Cc, and outputs the command converted by the control signal conversion section 263 as a control signal in a form such as infrared rays IRa to IRc.

Figure 3:
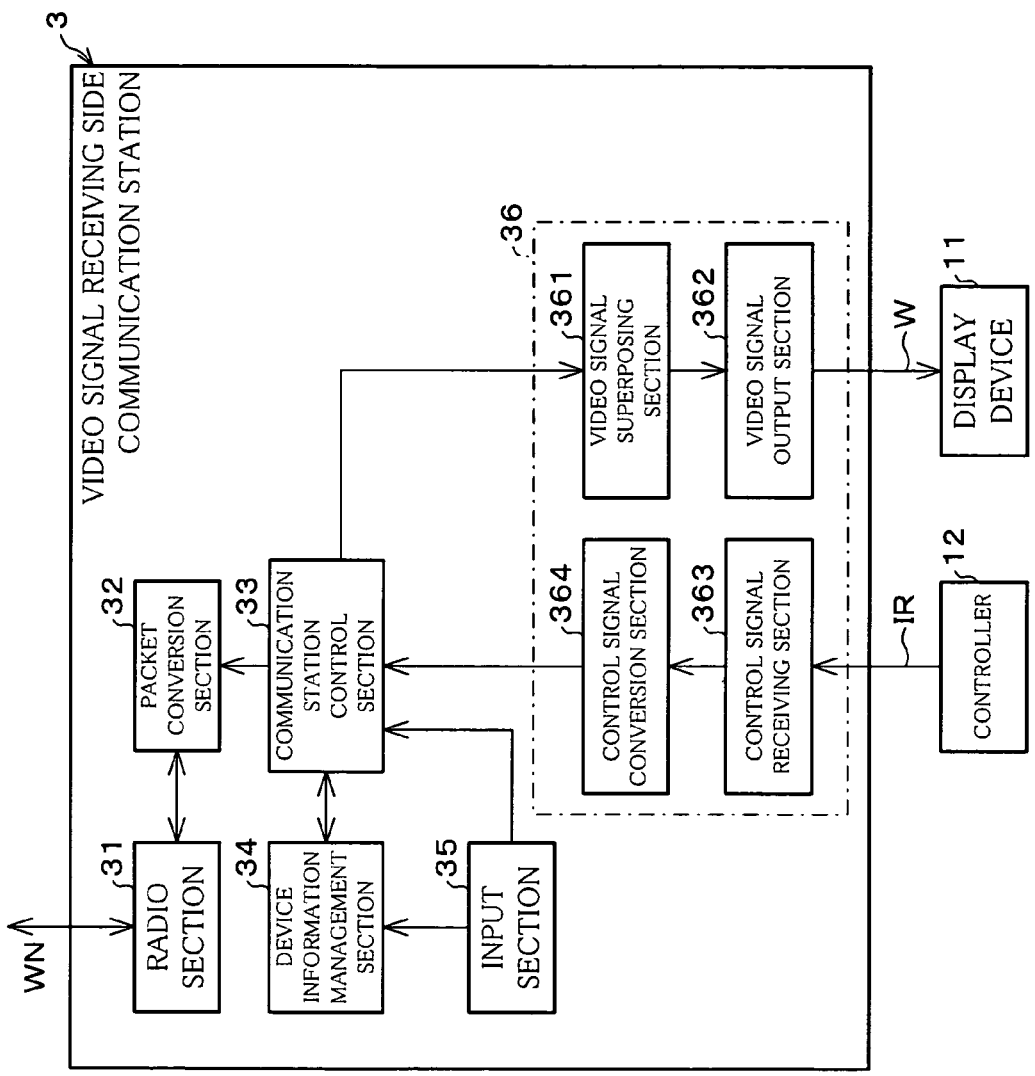
FIG. 3 is a block diagram showing an arrangement of a video signal receiving side communication station of the AV system.

FIG. 3 is a block diagram showing a video signal receiving side communication station (hereinafter, referred to merely as a receiving station) 3. The receiving station 3 corresponds to each of the aforementioned communication stations A and B shown in FIG. 1.

The receiving station 3 includes a radio section 31, a packet conversion section 32, a communication station control section 33, a device information management section 34, an input section 35, and a signal processing section 36.

The radio section 3 has a radio communication function for carrying out communications via a radio network NW, and has a communication circuit and the like for realizing the function.

The packet conversion section 32 converts a packet received by the radio section 31 into data so as to exchange information having passed through the radio network NW, and performs a process for converting a sending data given by the communication station control section 33 into a packet.

The communication station control section 33 is a portion for entirely controlling the receiving station 3, and performs (i) a process for exchanging data between the packet conversion section 32 and the signal processing section 36 and (ii) a process for giving information of a device registered in a device information control table (described later) of the device information management section 34.

The device information management section 34 internally includes the device information management table so as to manage (a) a communication station (for example, the sending station 2) with which it is possible to perform communications via the radio network NW and (b) information concerning a devices and the like connected to the communication station.

The input section 35 is an input device by which the user inputs information to the device information management section 34 and inputs instructions for the communication station control section 33, and is constituted of a keyboard or buttons.

The signal processing section 36 is provided so as to correspond to the number of connectable devices, and has a video signal superposing section 361, a video signal output section 362, a control signal receiving section 363, and a control signal conversion section 364.

The video signal superposing section 361 converts received data, that the packet conversion section 32 has converted from a packet, into an analog video signal, and superposes visualized character information, that has been given by the communication station control section 33, onto the video signal, so as to synthesize them into a single video signal. This function is used in case of displaying a message concerning the control right (described later) with the massage superposed on the output video.

The video signal output section 362 is a portion for outputting a video signal, that has been sent from the video signal superposing section 362, to the display device 11 via the analog wirings W, and has an output terminal for allowing connection with an output amplification circuit and the analog wirings W. The display device 11 corresponds to each of the aforementioned display devices A11 and B11.

The control signal receiving section 363 includes a light receiving element and a receiving circuit so as to receive the infrared ray IR that has been sent from the controller 12 (corresponding to each of the controllers A1 and B1) as a control signal. The control signal conversion section 364 converts a control command such as "request for control right" "reproduction" and "stop" into a predetermined command signal (data), and performs a correction process with respect to decoded data, and outputs thus corrected data to the communication station control section 33.

Figure 4:
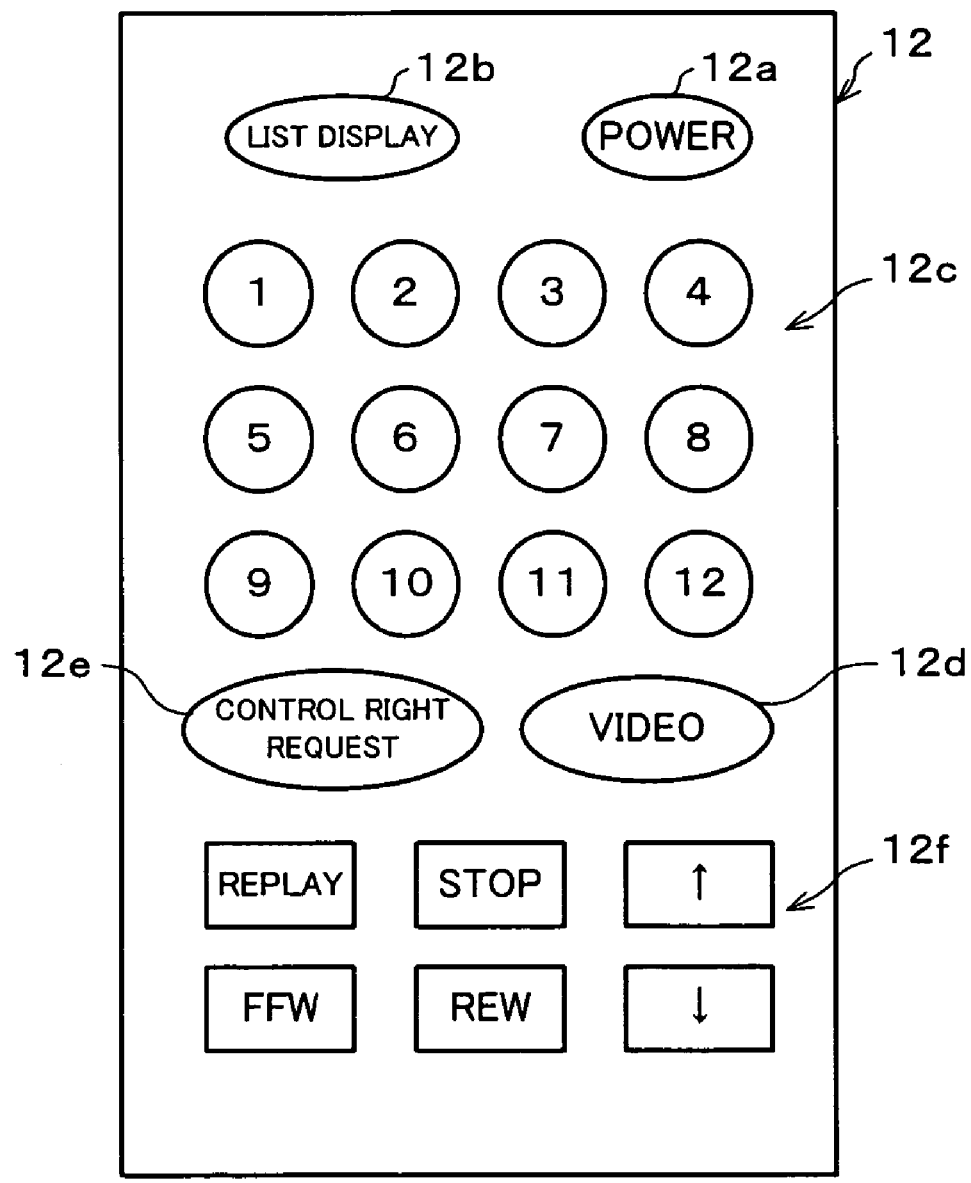
FIG. 4 is a plan view showing an appearance of a controller used in the video signal receiving side communication station.

FIG. 4 shows an appearance of the controller 12. The controller 12 includes a power source button 12a, a list display button 12e, a numerical button group 12c, a video button 12d, a control right request button 12e, and an operation button group 12f.

The power source button 12a is a button for instructing a device to turn ON/OFF.

Figure 9:
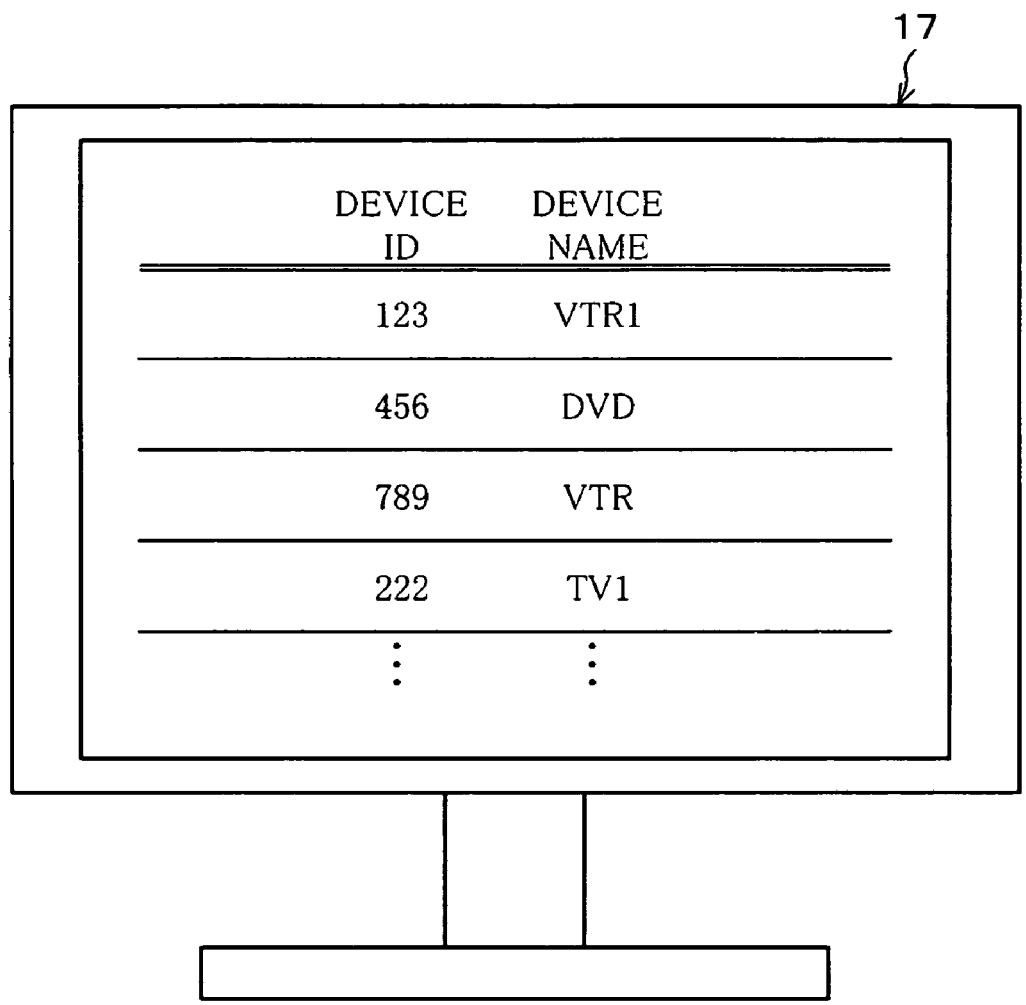
FIG. 9 shows a condition under which a display device connected to the video signal receiving side communication station displays a list of devices.

The list display button 12b is a button for giving an instruction to display contents (list) of the device information table with the contents superposed on a video displayed in the display device (see FIG. 9).

The numerical button group 12c is constituted of 1 to 12 numerical buttons each of which is used to perform various kinds of setting, such as setting of broadcast station channels and setting of device IDs, that are specified in accordance with numbers.

The video button 12d is a button used to generate a "start sending stream" command (see [Embodiment 5] described later) in case of sending video signals from the devices D to F as stream data.

The control right request button 12e is a button used to generate a command for requesting the sending station 2 for the control right. When the button is pushed, the request for the control right is incorporated in the control signal as a command, and is sent from the sending station 3 to the receiving station 2.

The operation button group 12f includes: a pointer moving button used to move a pointer upward or downward so as to perform various kinds of setting in the window; and a button used to perform operations of VTR or the like, such as replay, stop, fast forward (FFW), and fast rewind (RWD).

Next, a structure of the control information management table that the device control information management section 24 internally manages is described as follows with reference to FIG. 5.

The control information management table has items such as "device ID", "device name", and "control information", and stores data concerning the items with them related to each other.

The device ID is an identifier for identifying a device connected to the sending station 2, and has an individual (unique) value for each device or a unique value set in the sending station 2. The value can be inputted and varied by means of the input section 25.

The device name is information indicative of a name of a device corresponding to the device ID, and is set as a name corresponding to a device type such as VTR and DVD, or as a unique name which enables the user to easily discriminate. As in the device ID, the information can be inputted and varied by means of the input section 25.

The control information is an item for storing information concerning the control right of a device corresponding to the device ID. In case where no setting is found in the item, this means that neither the controller 12 having the control right nor the receiving station 3 corresponding thereto exist. In case where an identifier (controller ID) included in the controller 12 or a communication station address (address of the sending station 2 or the receiving station 3) is written in the item, this means that the controller 12 or the communication station has the control right for the corresponding device. It is possible to input and vary the setting of the item by means of the input section 25. Also, the communication station control section 23 can vary the setting of the item according to a condition.

Subsequently, a structure of the device information management table that the device information management section 34 internally manages is described as follows with reference to FIG. 6.

The device information management table has items such as "selection", "device ID", "device name", and "communication station address", and stores data of the items with them related to each other.

The "selection" indicates a target device controlled by the receiving station 3 at the time. Specifically, as to the target device to be controlled, "selection" is indicated by "o" (see FIG. 12). In case of FIG. 6, no value is set in the item of "selection", which shows a condition under which no device is controlled.

The device ID is an identifier for identifying each device in case where a plurality of devices are connected to the sending station 2, and an individual value is set for each device. The value can be exchanged with the sending station via the radio network NW, and can be varied to a received value.

The device name is information indicative of a name of a device corresponding to the device ID, and is set as a name corresponding to a device type such as VTR and DVD, or as a unique name which enables the user to easily discriminate. As in the device ID, the information can be exchanged with the sending station 2 via the radio network NW, and can be varied to received information.

The communication station address stores addresses of communication stations (the sending station 2 and the receiving station 3) connected to the corresponding device. For example, the device D of FIG. 1 is connected to the communication station C, so that an address of the communication station C is stored in an item of a communication station address corresponding to the device D.

Note that, it is possible to input and vary values of all the items by means of the input section 35.

Further, a structure of a packet treated in each of the aforementioned packet conversion sections 22 and 32 is described as follows with reference to FIG. 7.

The packet has "receiving end address", "sending end address", and "information section".

The receiving end address is an address of a communication station which functions as a receiving end of the packet (in case of sending the packet from the sending station 2 to the receiving station 3, the receiving end communication station is the receiving station 3). The sending end address is an address of a communication station which sends the packet (in case of sending the packet from the sending station 2 to the receiving station 3, the sending end communication station is the sending station 2).

The information section is a portion including various information concerning the control. Specifically, not only the video data but also "command", "target device ID", "sending device ID", and the like are written in the information section.

The command is given to the communication station or the device. With respect to the communication station, the command is a request for the control right for a specified device (shown in FIG. 7). With respect to the devices, the command is a control content (operation content).

The target device ID is an identifier for specifying a device in case where the device is the receiving end of data or a command-target device which is connected to the communication station.

The sending device ID is an identifier for specifying a device in case where a sender of the data and the command is not the communication station but the device or the controller connected to the communication station.

Here, operations of the AV system in case of managing the control right via the communication path are described as follows. First, a procedure in which the control right is managed is described with reference to a flowchart of FIG. 8.

It is assumed that: in the room R1, the user is near the communication station A and the display device A11 which function as the receiving station 3, and the user can use the controller A1. At this time, the device information table provided in the device information management section 34 is under a condition shown in FIG. 6, and any control-target device is not selected.

First, when the user pushes the list display button 12*b* of the controller 12 so as to select a device which the user wants to control, a control signal indicative of a "list display" command is sent from the controller 12 to the receiving station 3 (S1). The receiving station 3 converts the control signal received by the control signal receiving section 363 into a command format (command code) by means of the control signal conversion section 364, and confirms its content by means of the communication station control section 33. Here, when it is confirmed that the received control signal is the "list display", the communication station control section 33 reads the content of the device information table from the device information management section 34, and the information is superposed on the video signal by the video signal superposing section 361, and thus superposed video signal is outputted from the video signal output section 362. The outputted video signal is sent to the display device 11, and is displayed in a screen of the display device 11 as shown in FIG. 9.

Next, the user sees the content of the device information table that is displayed in the screen of the display device 11, and selects a device ID corresponding to the device that the user wants to control, and pushes the control right request button 12*e* of the controller 12, so as to send a control signal including the control right as a command (S2) from the controller 12. In the example of FIG. 9, in case where the user wants to control "VTR 1" (device D) whose device ID is "123", the user uses inputs "1", "2", and "3" by using the numerical button group 12*c* of the controller 12, and pushes the control right request button 12*e*. Further, the control signal generated by performing this operation includes (i) "control right request" as a command, (ii) "123" as a target device ID, and (iii) the controller ID, as shown in FIG. 10. In this example, the controller ID indicative of an identifier of the controller 12 is "444".

When the receiving station 3 receives the control signal sent from the controller 12, the receiving station 3 performs a process for sending a command of the control right request to the sending station 2 (S3). Various processes including the process that are performed in the receiving station 3 are detailed later.

When the control right request command is sent from the receiving station 3 and is received by the sending station 2, the sending station 2 determines whether the control right request based on the control right request command was successfully performed or not (S4). Further, in case where the control right request is successfully performed, the sending station 2 notifies the receiving station 3 of the success (S5). In case where the control right request is not successfully performed, the sending station 2 notifies the receiving station 3 of the failure (S6).

When the receiving station 3 receives a result such as the success or the failure in the control right request that has been notified by the sending station 2, the receiving station 3 displays the content of the result in the display device 11 (S7).

When the user confirms the success in the control right request in accordance with the content displayed in the display device 11 and operates the controller 12 so as to control the control-target device, the receiving station 3 receives a control signal from the controller 12, and sends a device control command corresponding to the operation content (S8).

When the sending station 2 receives the device control command, the sending station 2 confirms whether the controller 12 having sent the control signal has the control right for the control-target device or not (S9). When the sending station 2 determines that the controller 12 has the control right, the sending station 2 sends the device control command to the control-target device (S10). When the sending station 2 determines that the controller 12 does not have the control right, the sending station 2 notifies the receiving station 3 that the controller 12 does not have the control right (S11).

Next, a procedure in which the receiving station 3 performs a process including the steps S3 and S7 is described with reference to a flowchart of FIG. 11, and a procedure in which the sending station 2 performs a process including the steps S4 to S6 and the steps S9 to S11 is described with reference to a flowchart of FIG. 13.

First, the receiving station 3 receives the control signal, which has been sent from the controller 12, by means of the control signal receiving section 363, and extracts the content of the control signal by means of the control signal conversion section 364, and determines whether the content is a command signal or not (S101). In case where the command signal is included as a result of the determination, the receiving station 3 confirms the command signal by means of the communication station control section 33 (S112).

Further, whether the command signal is a list display command or not is determined by means of the communication station control section 33 (S113). When the command signal is the list display command, the content of the device information table is displayed in the display device 11 (S108), and the step returns to the step S101. When the command signal is not the list display command, whether the command signal is the control right request command or not is determined (S114). Here, when the command signal is not the control right request command, there is a possibility that the receiving end is not selected in the control signal. Thus, whether the receiving end is selected or not is determined (S115). When the receiving end is not selected, an error process is performed (S116), and the step returns to the step S101.

When it is determined that the command signal is the "control right request", a device ID that has been simultaneously sent is extracted, and is given to the device information management section 34. The device information management section 34 writes the mark o in the selection item of the corresponding device ID of the device information management table as shown in FIG. 12, and a specific device is selected (S117). Thus, it is possible to select a device which is to be controlled by means of the receiving station 3 (communication station A).

Further, when the communication station control section 33 obtains an address of a communication station connected to the target device ID from the device information management table and gives thus obtained address to the packet conversion section 32, the packet conversion section 32 inputs a value of the communication station address into the receiving end address of the packet. In this case, the device ID "123" corresponds to the communication station address "33333", so that the value is the receiving end address. Further, after the packet conversion section 32 inputs the "control right request" command, the target device ID "123", the controller ID "444" as the sending device ID, and the communication station A address "11111" as a sending source address, into the packet so as to generate a packet as shown in FIG. 7, the packet conversion section 32 sends thus generated packet from the radio section 31 to a specific device (S118).

The packet is sent from the receiving station 3 via the radio network NW to the sending station 2 (here, the communication station C) specified by the receiving end address.

Figure 13:
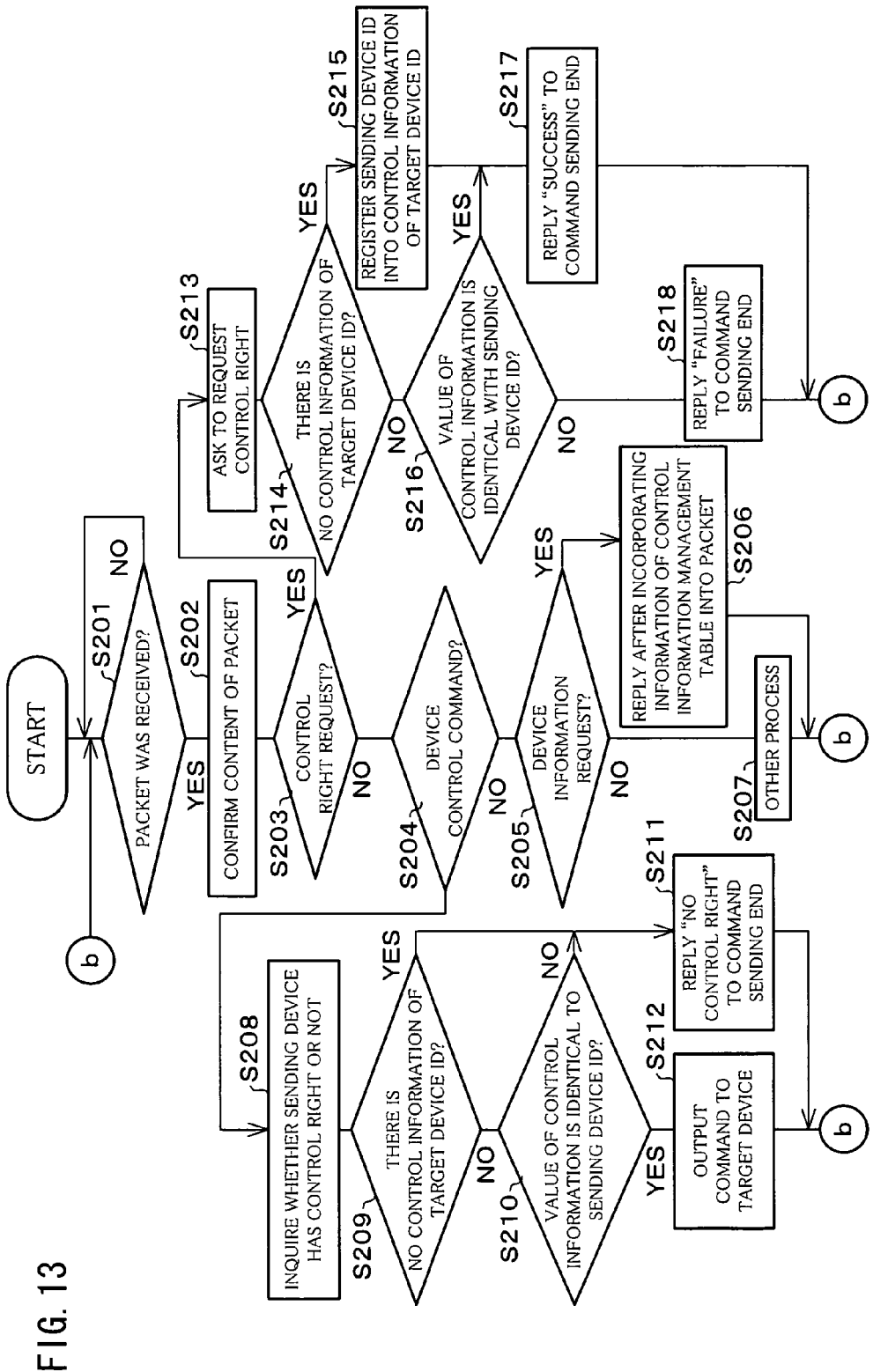
FIG. 13 is a flowchart showing a procedure in which the video signal sending side communication station processes a received packet.

The sending station 2 processes the packet received through the procedure shown by the flowchart of FIG. 13.

First, when the packet is received by (is provided to) the radio section 21 (S201), information included in the packet is extracted by the packet conversion section 22, and is given to the communication station control section 23.

The communication station control section 23 confirms the information included in the packet (S202), and recognizes whether the "control right request" command is included or not (S203). Here, when the information in the packet includes the "control right request" command, the target device ID and the sending device ID are extracted from the packet. These values are given to the device control information management section 24, thereby asking the device control information management section 24 to request the control right (S213).

In the device control information management section 24, a control information item corresponding to the target device ID is searched from the control information management table, and whether no control information exists (blank) or not is determined (S214). In an example of the control information management table shown in FIG. 5, when the device ID is "123", there is "no" control information corresponding thereto (blank). That is, at this time, the control right corresponding to the device ID is not given to any controller. Thus, it is possible to accept the request for the control right, so that the sending device ID is stored in the control information item, thereby registering the sending device ID (S215). As a result, for example, a value "444" is written in the control information management table as the control information item as shown in FIG. 14.

Further, the device control information management section 24 notifies (replies) the receiving station 3, which is a sender of the control right request, of the success in the control right request (S217). At this time, when data indicative of the success in the control right request is given from the device control information management section 24 to the communication station control section 23, the packet conversion section 22 uses the data so as to generate a packet indicative of the "success in the control right request" as a reply to the control right request command. In the packet, as shown in FIG. 15, the "success in the control right request" is written as a result of command execution, and each of the target device ID and the sending device ID that are specified by the command includes the same value as that of the packet sent from the receiving station 3 (see FIG. 7). Further, the receiving end address is a sending end address of the control right request command. The packet is sent from the radio section 21 via the radio network NW to the receiving station 3.

In the aforementioned step S214, when a value of the control information corresponding to the target device ID is stored in the control information management table, the value and the sending device ID are compared with each other so as to determine whether the value and the sending device ID are identical to each other or not (S216). At this time, when the stored value of the control information and the sending device ID are identical to each other, the control right has been already obtained. Thus, in the aforementioned step S217, the receiving station 3 which is a sender of the control right request is notified of the "success in the control right request".

Adversely, when the value and the sending device ID are not identical to each other, another controller has already obtained the control right, so that the control right is not given to the controller that has performed the control right request. Thus, the receiving station 3 is notified of the "failure in the control right request" (S218). At this time, when data indicative of the failure in the control right request is given from the device control information management section 24 to the communication station control section 23, the packet conversion section 22 generates a packet indicative of the "failure in the control right request" as a reply to the control right request command. In the packet, as shown in FIG. 15, instead of the "success in the control right request", the "failure in the control right request" is written as a result of the command execution. The packet is sent from the radio section 21 via the radio network NW to the receiving station 3.

Figure 11:
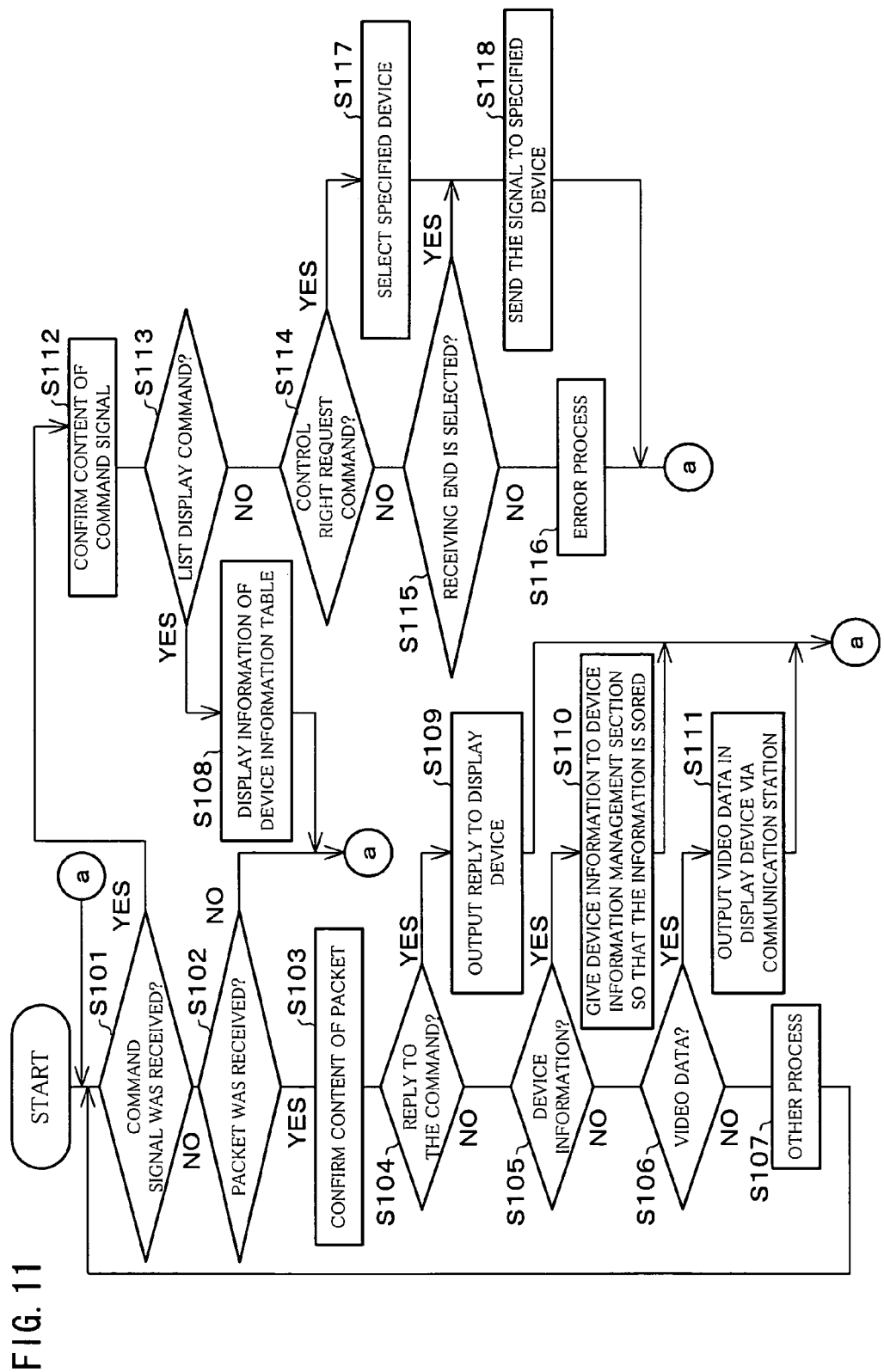
FIG. 11 is a flowchart showing a procedure in which a command signal received by the video signal receiving side communication station is processed.

In the receiving station 3, as shown in FIG. 11, whether the packet has been received or not is determined (S102). When the packet has not been received, the step returns to S101. When the packet has been received, the content of the packet is confirmed by the communication station control section 33 (S103), and whether the content is a replay to the command or not is determined (S104).

Here, when the content of the packet is not the reply to the command, whether the content of the packet is device information or not is determined (S105). When the content of the packet is the device information, the device information is given to the device information management section 34 and is stored (S110). When the content of the packet is not the device information, whether the content of the packet is video data or not is further determined. When the content of the packet is the video data, the video data is outputted to the display device 11 via the communication station A (receiving station 3) (S111). When the content of the packet is not the video data, another process is performed (S107), and the step returns to S101.

Figure 16:
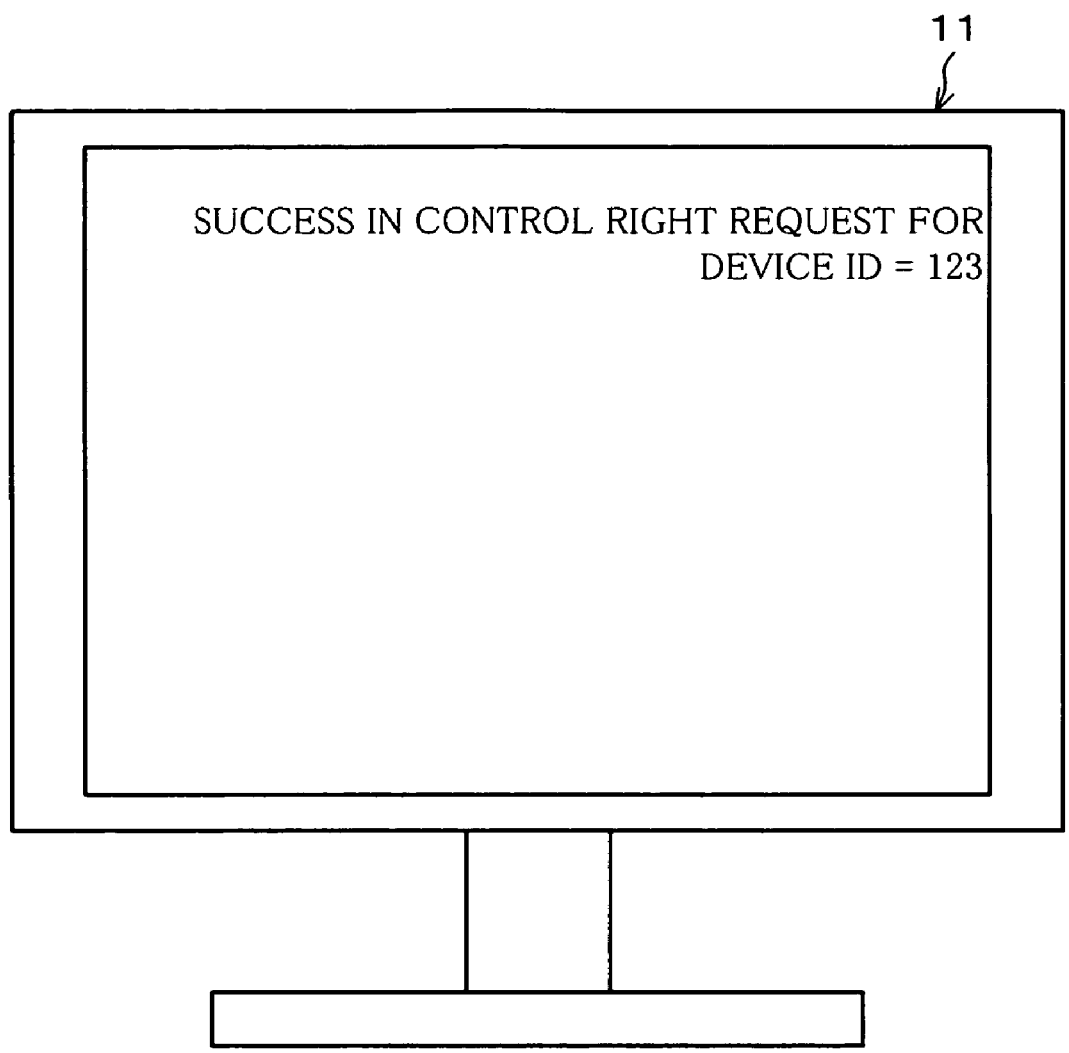
FIG. 16 shows a condition under which the display device displays the success in the request for the control right.

Further, in the step S104, when the content of the packet is a reply to the command, the content is outputted and displayed in the display device 11 (S109). At this time, the content of the packet is given from the communication station control section 33 to the video signal superposing section 361, and is superposed on a video signal of a displayed video by means of the video signal superposing section 361. The video signal outputted from the video signal superposing section 361 is transmitted via the analog wiring W to the display device 11, and is displayed in the display device 11. The display screen of the display device 11 displays the reply to the command, e.g., a message such as "success in the control right request for the device ID=123" as shown in FIG. 16.

By performing the foregoing procedure, the control right for the device D (VTR 1) whose device ID is "123" is given to the controller 12 (A11) whose controller ID is "444". Then, this can be found by the user near the display device A1.

Next, a case where the user sends a control command to the device D is described as follows.

When the user pushes the reproduction button in the operation button group 12f of the controller 12 (A11) so as to send a "reproduction command" to the device D, a control signal including a command of "reproduction" is sent from the controller 12 as shown in FIG. 17. When the receiving station 3 receives the control signal (S101), the receiving station 3 confirms content of the control signal (S112).

As a result, the content of the command signal is the "reproduction" command, and is neither the "list display" command (S113) nor the "control right request" command (S114). Thus, in this case, the device ID and the communication station address that are currently selected are obtained from the device information management table of the device information management section 34, and whether the receiving end is selected or not is determined in accordance with the device ID and the communication station address (S115). At this time, when any device is not selected, an error process is performed (S116).

In this example, the device information management table is under a condition shown in FIG. 12 at this time, so that the selected device ID is "123", and the communication station address is "33333". The communication station control section 33 extracts the values from the device information management table and gives thus extracted values to the packet conversion section 32. Thus, the packet conversion section 32 generates a packet shown in FIG. 18 by storing the values into the packet, and sends thus generated packet to the sending station 2 (S118).

On the other hand, in the sending station 2 (communication station C), when the packet sent from the receiving station 3 via the radio section 21 is received (S201), content of the packet is confirmed by the communication station control section 23 (S202). As a result, it is determined that the content of the packet is not the "control right request" command (S203), and whether the content of the packet is the device control command or not is determined (S204). Here, the content of the packet is the "reproduction" command which is the device control command, so that the communication station control section 23 extracts the target device ID and the sending device ID from the packet, and gives thus extracted target device ID and sending device ID to the device control information management section 24, and inquires the device control information management section 24 whether the sending device has the control right or not (S208).

In the device control information management section 24, when the inquiry is received, an item of the target device ID is searched from the content of the internally provided control information management table, and whether there is control information of the target device ID or not is determined (S209). When the control information of the target device ID is found as a result of the determination, a value of the control information and the sending device ID are compared with each other, thereby determining whether the value of the control information and the sending device ID are identical to each other or not (S210).

At this time, the control information management table is under a condition shown in FIG. 14 for example, and the control information corresponding to the target device ID "123" is "444", so that the control information "444" is identical to the sending device ID (controller ID). Thus, it is found that the sending device ID "444" has the control right of the target device ID "123". Then, the device control information management section 24 notifies the communication station control section 23 that "the control right is given".

In response to the notification, the control station control section 23 sends a "reproduction" command to the device D (VTR 1). Thus, the communication station control section 23 gives the "reproduction" command to the control signal conversion section 263 for the device D. In the control signal conversion section 263, the "reproduction" command is converted into a signal format understandable for the device D, and thus converted command is outputted from the control signal sending section 264 to the device D (S212). When, the device D receives the control signal, the device D performs a reproduction operation.

In case where there is no control information item (blank) of the target device ID of the control right management table in performing the determination in the step S209 at the time of determination performed by the device control information management section 24, or in case where a value different from the sending device ID is stored as the control information in the step S210, it is determined that the sending device ID has no control right, so that "no control right" is notified to the communication station control section 23 (S211).

In this case, the communication station control section 23 does not send the "reproduction" command to the device D. Instead, to the communication station A having sent a command, the communication station control section 23 sends a packet indicating that there is no control right corresponding to a command sent from the communication station A. In the packet, the "no control right" is set as a result of the command as shown in FIG. 19.

As shown in FIG. 11, when the communication station A receives the packet (S102), content of the packet is confirmed by means of the communication station control section 33 (S103), and whether the packet is a reply to the command or not is determined (S104). As a result, it is found that the packet is the reply to the command, so that information of the "no control right" is superposed on a video signal by means of the video signal superposing section 361, and thus superposed video signal is sent to the display device A11 (11) (S109).

As a result, a video based on the information of the "no control right" is displayed in the screen of the display device A11, thereby notifying the user that there is no control right.

By performing the foregoing procedure, it is possible to realize management of the control right for each device connected to the communication station C.

As described above, the AV system according to the present embodiment is arranged so that: the controller A1 on the side of the communication station A and the controller B1 on the side of the communication station B request the control rights, and the communication station C has the control information management table registering a condition under which only the controllers allowed to control the devices D to F have the control rights, and the communication station C allows only the controllers having the control rights to control specific devices when control commands for devices are sent from the controllers A1 and B1. Thus, it is possible to manage the control rights of the communication stations A and B connected to the radio network NW in controlling the devices D to F which are not connected to the radio network NW.

Note that, the present embodiment describes the method in which the radio LAN is used as the radio network NW, but it is possible to perform the same process by using other wired or wireless communication means. Further, the present embodiment describes the method in which infrared rays are used as the communication means between the controllers A1/B1 and the communication stations A/B and as the communication means between communication station C and the devices D to F, but it is possible to realize the same process by using other wired or wireless communication means. Further, the present embodiment describes the method in which the analog wiring W is used as means for transmitting a video signal from the devices D to F to the communication station C and as means for transmitting video signals from the communication stations A and B to the display devices A11 and B11, but it is possible to realize the same process by using other wired or wireless communication means. Further, as long as each of the devices D to F is equipped with a function for outputting a digital video signal, it is possible to use a digital wiring instead of the analog wiring W. The description in this paragraph is applicable not only to the present embodiment but also later embodiments.

In the present embodiment, the display devices A11 and B11 are respectively connected to the communication stations A and B each of which functions as the receiving station 3, but it may be so arranged that a plurality of display devices are connected to each communication station. Further, the present system is arranged so that the controllers A1 and B1 are respectively correspond to the communication stations A and B, but it may be so arranged that a plurality of controllers correspond to each communication station. Further, on the side of the communication station C, a controller which can control the devices D to F is not provided, but it may be so arranged that a controller similar to the controllers A1 and B1 is provided on the side of the communication station C. In this case, as in the communication stations A and B (receiving station 3), also in the communication station C (sending station 2), it is necessary to provide the control signal receiving section 363 and the control signal conversion section 364. Further, the controllers A1 and B1 are generally provided as remote controllers. However, not only the arrangement in which the controllers are provided separately from the communication stations A and B but also an arrangement in which the controllers are provided in the communication stations A and B may be adopted. Alternatively, it may be so arranged that each of the communication stations A and B includes both the built-in controller and the remote controller. The arrangement in which both the built-in controller and the remote controller are included is applicable also in the case where the controller is provided on the side of the communication station C. The description in this paragraph is applicable not only to the present embodiment but also later embodiments.

Note that, in case where the receiving station is controlled by a plurality of controllers (in case where the receiving station is connected to a plurality of display devices and there are controllers respectively corresponding to the display devices), the control rights are partially managed by the receiving station 3. This arrangement is effective in reducing an amount of communications between the communication stations. Specifically, in the device information management table (FIG. 12) managed by the receiving station 3, instead of merely indicating a device specified by the controller with a mark "o", IDs and the like of the controller and the receiving device each of which has obtained the control right for the device are written. Thus, in case where the receiving station 3 is controlled by a plurality of controllers, it is possible to find competition for the control right between the controllers inside the receiving station 3.

In the present embodiment, the communication station C which functions as the sending station 2 is provided so as to correspond to each of the communication stations A and B, but it may be so arranged that a plurality of receiving stations 2 are provided so as to correspond to each of the communication stations A and B. Further, three devices D to F are connected to the sending station C, but the number of connected devices is arbitrary and is determined according to the number of signal processing sections 26. Also the description in this paragraph is applicable not only to the present embodiment but also to later embodiments.

In the present embodiment, the communication station C and the devices D to F are provided separately from each other. However, even when it is so arranged that the communication station and the devices are integrally provided, it is possible to manage the control right in the same manner as described above. Specifically, it is preferable to adopt such an arrangement that a communication station having the same function as that of the communication station C is provided in each of the devices D to F, for example, it is preferable that the communication station is provided in a housing of each device. According to the arrangement, the device and the communication station are positioned close to each other, so that it is possible to use wired communication means instead of infrared rays in transmitting the control signal. Thus, it is not necessary to provide the control signal sending sections Ca to Cc. Instead, a signal transmission cable is used to exchange the control signal between the device and the communication station. Also such arrangement is applicable not only to the present embodiment but also to later embodiments.

Incidentally, the present embodiment describes the method in which the controller 12 obtains the control right. According to the method, when the controller A1 obtains the control right for the device D for example, it is impossible to control the device D by means of the controller B1. However, there is a case where the user near the communication station A has a plurality of controllers and wants to control the device D by means of either of the controllers. In this case, it can be so arranged that the control right is obtained not by the controller but by the communication station A (or the communication station B).

Specifically, the packet shown in FIG. 7 is generated when the communication station A sends the "control right request" command, and a value of the sending device ID is set as a communication station address instead of the controller ID. That is, in this case, an address "11111" of the communication station A is incorporated into the sending device ID. Further, when the packet is sent to the communication station C, the address "11111" of the communication station A is stored as a value of the control information of the control information management table in accordance with the aforementioned procedure.

Thereafter, also in sending the control command for the device D, the address "11111" of the communication station A is incorporated into the packet as the sending device ID, and is sent. Then, in the communication station C, the control information of the control information management table is identical to the sending device ID, so that it is admitted that the control right is given. In this manner, the communication station A can obtain the control right.

The communication station A may send a "device information request" command to all the communication stations, with which it is possible to carry out communications via the radio network NW, so as to update information of the device information management table in receiving the "list display" command from the controller. The communication station which has received the command incorporates information, such as the "device ID" and the "device name" that are stored in the control information management table in the device control information management section 24, into a packet, and sends back the packet. When the communication station A receives the packet that has been sent back, the communication station A stores the information, included in the packet, in the device information management table in the device information management section 34. At this time, also an address of the communication station that has sent back the packet is stored together. Further, in case where information that has already been stored in the device information management table has information identical to the device ID, the information is updated so as to be the information that has been sent.

Note that, it may be so arranged that: the communication station always obtains new information by periodically sending the "device information request" not only in the case where the communication station receives the "list display" command.

When the user selects a device to be controlled by checking the displayed list, the device is specified by inputting a value of the device ID in the foregoing example. Instead, it may be so arranged that: a pointer is displayed in the screen, and a direction button of the controller is pushed so as to move the pointer, thereby selecting a device specified by the pointer.

Figure 20:
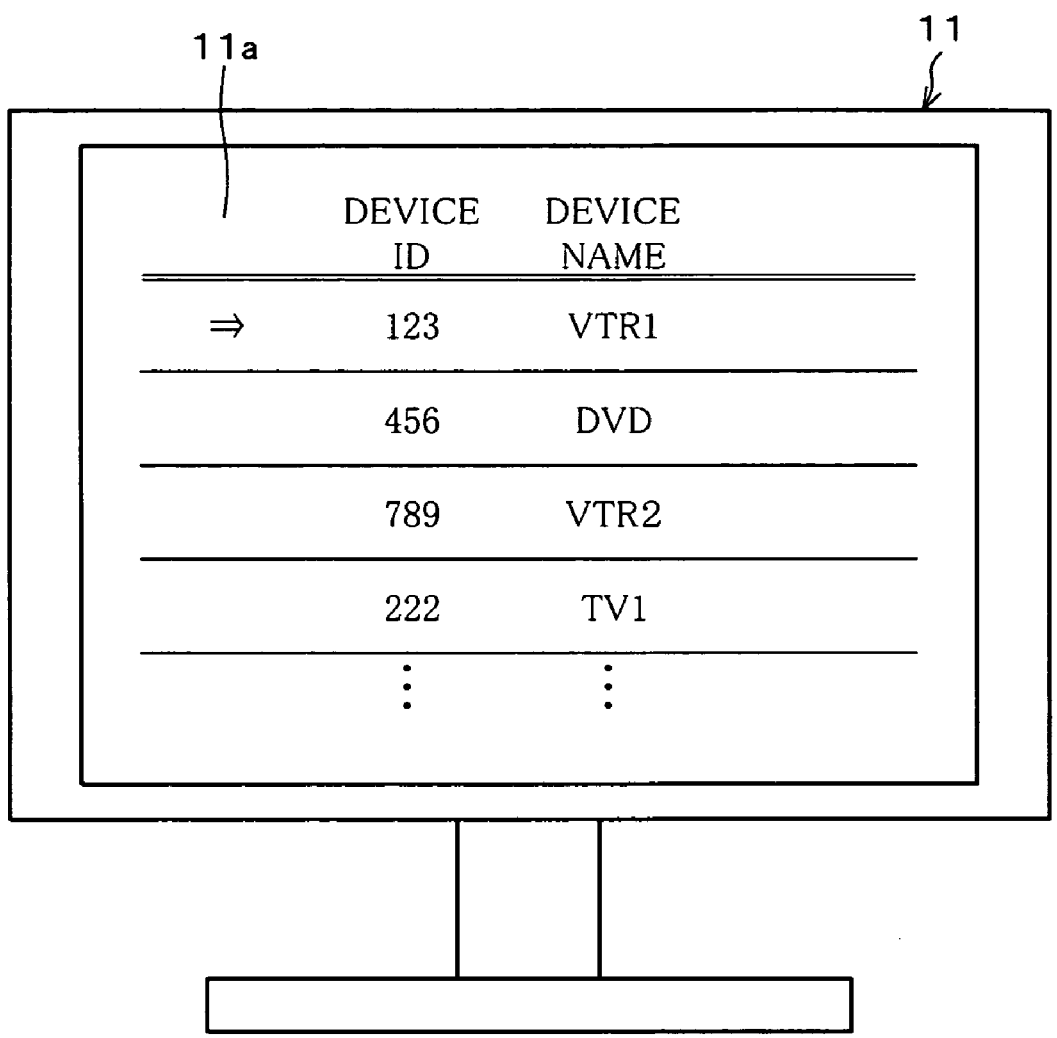
FIG. 20 shows a condition under which the display device connected to the video signal receiving side communication station displays a list of devices including a device selection pointer.

Specifically, as shown in FIG. 20, a pointer 11a indicates a device whose device ID is "123" while the list is displayed in the display device 11. When a direction button (either an up button or a down button) in the operation button group 12f of the controller 12 is pushed, the controller 12 (A11) sends a command for moving the pointer upward or downward to the communication station A. When the communication station A receives the command, the communication station A updates the content which is to be superposed on a video signal, and moves the pointer in an indicated direction. When the control right request button 12e is pushed under such condition, a device indicated by the pointer 11a at the time of reception of the command is selected. A process thereafter is performed in the same manner as the aforementioned process. According to the method, it is not necessary to incorporate the target device ID into a signal sent from the controller 12.

Embodiment 2

Embodiment 1 describes the method in which the user demonstratively requests the control right. The present embodiment describes a method in which: even though the control right is not requested, mere sending of a device control command such as "reproduction" enables the control right to be simultaneously requested.

Figure 8:
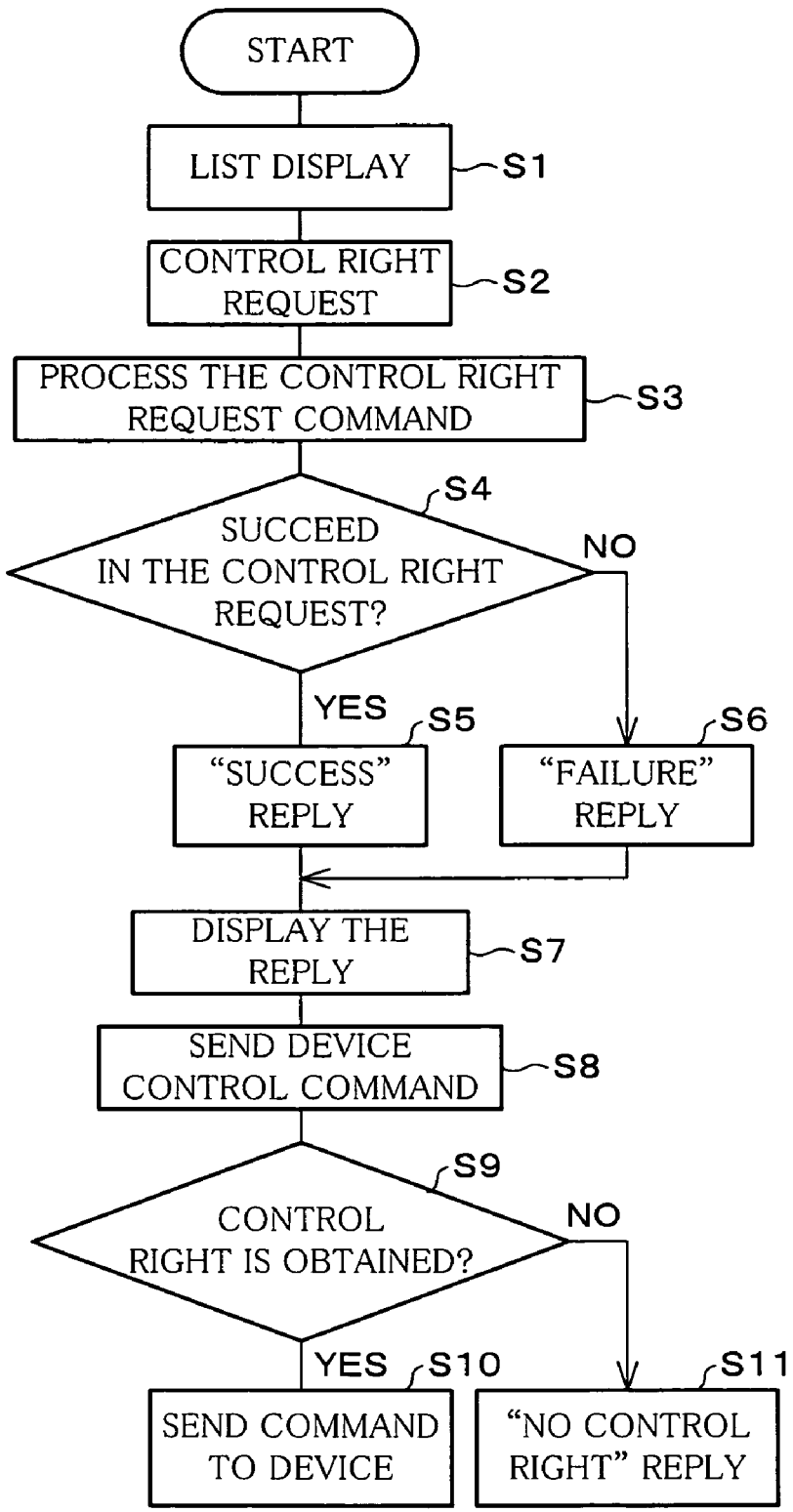
FIG. 8 is a flowchart showing a procedure in which the video signal sending side communication station responds to the request made by the video signal receiving side communication station for the control right.

Here, a procedure thereof is performed in the same manner as in Embodiment 1 except for the steps performed after the step S1 shown in FIG. 8.

Next, the user selects a device to be operated. At this time, the user inputs (i) a device ID of the device to be operated and (ii) a command to be implemented. For example, in case of sending a "reproduction" command for the device D, "1", "2", and "3" that constitute the device ID of the device D (VTR 1) are inputted, and a reproduction button is pushed. Thus, the control signal includes the target device ID "123" as shown in FIG. 21.

Figure 22:
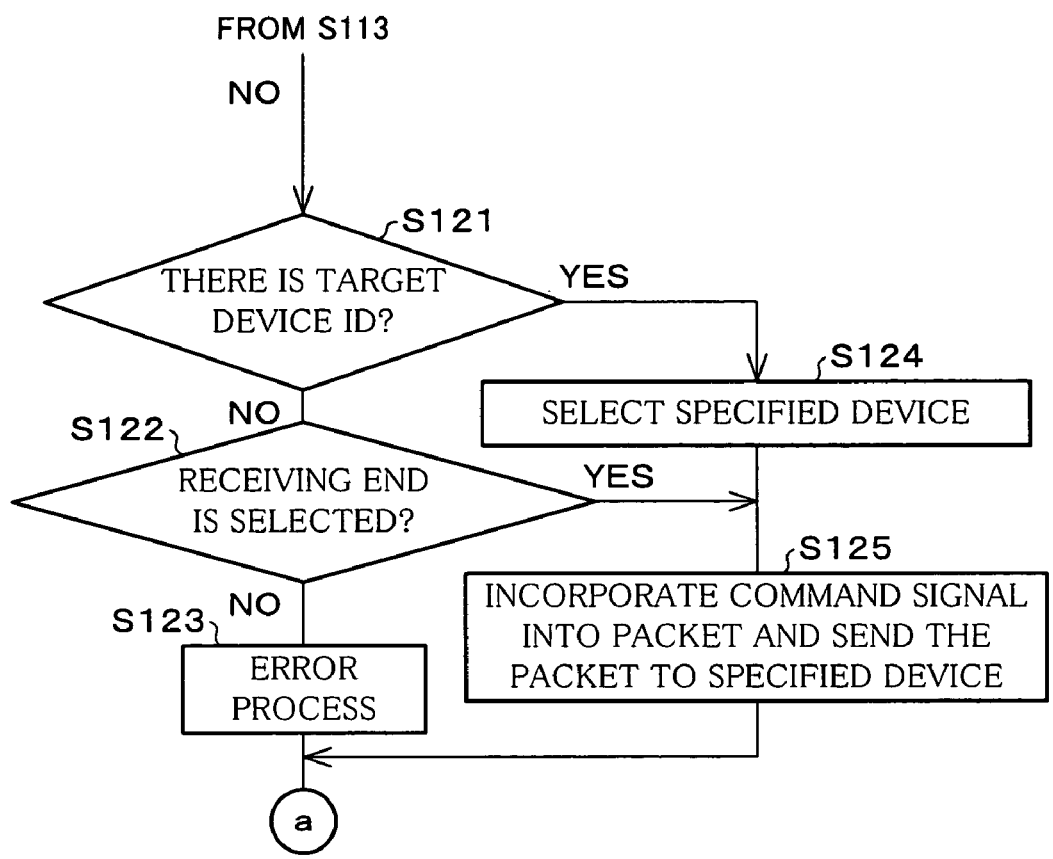
FIG. 22 is a flowchart which is partially different from the flow chart of FIG. 11 in terms of steps.

The communication station A that has received the command performs a process in accordance with the procedure performed before the step S113 shown in the flowchart of FIG. 11. The steps after the step S114 are replaced with the steps S121 to S125 that are shown in the flowchart of FIG. 22.

In case where it is determined that the command signal is not the list display command in the step S113, whether the target device ID is included in the command signal or not is determined (S121). Then, in case where the target device ID is included, a device whose target device ID is specified is selected (S124). As a result, the device information management table is set as shown in FIG. 12. Further, the packet shown in FIG. 18 is generated by means of the packet conversion section 32, and thus generated packet is sent to the communication station C connected to the specified device (S125).

Further, a process in case where the target device ID is not included in the command signal is performed in the same manner as in FIG. 11. That is, the communication station control section 33 of the communication station A determines whether the receiving end has been selected or not (S122). When the receiving end has been selected, the target device ID and the command content each of which corresponds to the receiving end are incorporated into a packet, and the packet is sent from the radio section 31 (S125). When the receiving end has not been selected, an error process is performed (S123), and the step returns to the step S101 in FIG. 11.

Figure 23:
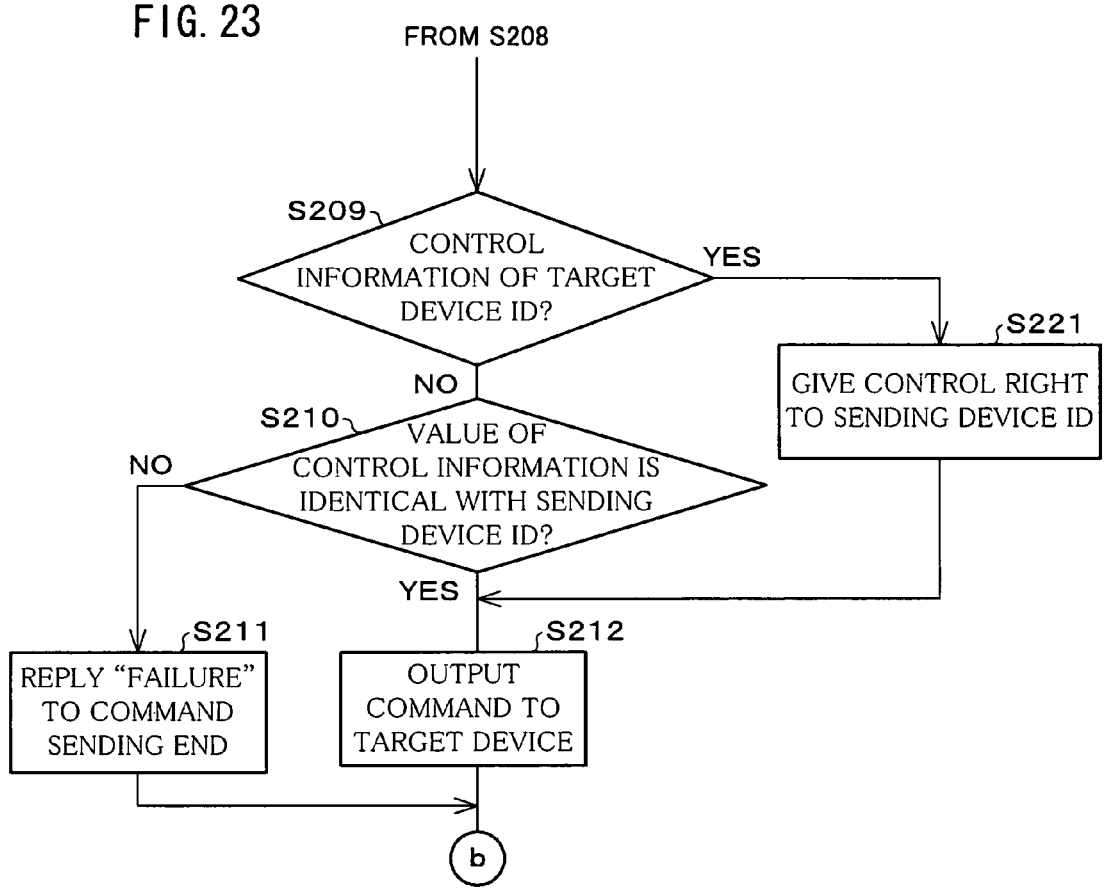
FIG. 23 is a flowchart which is partially different from the flow chart of FIG. 13 in terms of steps.

In the communication station C, a process is performed in accordance with a procedure in which the step branching from YES of the step S209 of the flowchart of FIG. 13 is replaced with the step S221 shown in FIG. 23.

In the communication station C, when the packet shown in FIG. 18 is received, it is recognized that the packet is the device control command, and the device control information management section 24 determines whether or not to give the control right to the controller A1 which is a sending end. At this time, the controller A1 has not obtained the control right yet, so that the control information management table is under a condition shown in FIG. 5. Here, the control information corresponding to the device ID "123" is blank, so that the control right for the device is given to the controller A1 (S221). As a result, in the control information management table, as shown in FIG. 14, the sending device ID "444" is stored. Thereafter, when the step proceeds to the step S212, a "reproduction" command is converted into a control signal, and is sent to the device D.

The foregoing description gives an example where the device control command is received and the control right is given to the controller or the communication station. However, it may be so arranged that: the device control command is received and the control right given to the controller or the communication station is released. Further, it may be so arranged as to make it possible or impossible to give or release the control right according to a type of the received device control information command.

Further, it may be so arranged that: not only the device control command but also other command, such as establishment/release of communication connection, makes it possible to give/release the control right. That is, it may be so arranged that: upon receiving a command for changing a condition under which the device operates, the control right is given to or is released from a device having issued the command.

Further, in case where the same device or the same communication station can accept commands from a plurality of devices or a plurality of communication stations, it may be so arranged that: the control right is given to the first device or communication station that accepted the command, but the control right is not given to the second or further devices or communication stations that accepted the commands.

Further, in case where the device or the communication station that has obtained the control right cancels the command after a plurality of devices or communication stations had given commands to a certain target device, there is a possibility that any device or any communication station does not have the control right for the controlled device. In this case, the communication station C may notifies other device or communication station, secondly expected to obtain the control right, that there is no device or communication station having the control right. Further, it may be so arranged that: the communication station C memorizes the device or communication station that accepted the command (the device or communication station which gave the command to the target device), and the second device or communication station that accepted the command is selected, or a similar method is performed, thereby determining a device or communication station to which the control right is newly given. In this case, it is preferable that the communication station C sends a message, which notifies the foregoing condition, to the device or communication station to which the control right has been newly given.

Note that, Embodiment 2 gives an example where there are devices (communication stations A and C) connected to a plurality of networks. However, this is not an essential arrangement, and it may be so arranged that each of the communication stations A and C includes the device A11 and the devices D, E, and F therein. That is, the communication station which carries out the process of the present embodiment may be a communication station connected to a single network.

Likewise, in later embodiments, it is not essential that communication stations are connected to a plurality of networks, and it may be so arranged that the communication stations are connected to a single network.

By performing the foregoing procedure, it is possible to obtain the control right merely by sending the control command for the specific device even when the user does not demonstratively request the control right.

Embodiment 3

Embodiment 2 describes the method in which: mere sending of the device control command enables the control right to be simultaneously requested even when the user does not request the control right. The present embodiment describes a method for handling the control right in receiving a plurality of commands.

For example, in case where a plurality of devices receive streams outputted from a video player, the streams can be received by the plurality of devices. However, in order to avoid confusion of operations, there may be placed such restriction that only a single device is used to operate the video player. In this case, it is effective that: a command issued from any device in setting a stream communication path is accepted, but a device control command such as "reproduction" that has been issued from a device other than a specific device having the control right is not accepted.

Before describing a specific procedure of the present embodiment, "connection" is described as follows. The connection means to specify a transmission path of a stream, and means a setting which enables the stream outputted from the device D to reach the display device A1 via the communication stations C and A. This setting is performed by using a connection establishment request packet.

FIG. 46 shows a format of the connection establishment request packet. A receiving end address and a sending end address are the same as in FIG. 7, so that description thereof is omitted. A value indicative of the connection establishment request is incorporated in the command. A sending end communication station address and a sending end device ID respectively indicate an address and a device ID of a communication station sending a stream to a network. A receiving end communication station address and a receiving end device ID respectively indicate an address and a device ID of a communication station receiving the stream from the network. Lastly, a controller ID indicates an ID of a controller which request issuance of the connection establishment request.

In this example, a setting is performed so that the controller A1 sends the stream from the device D to the display device A11 via the communication stations C and A. Thus, in the connection establishment request packet, the setting is such that: the sending end communication station address=33333 (communication station C), the sending end device ID=123 (device D), the receiving end communication station address=11111 (communication station A), the receiving end device ID=1111 (display device A11), the controller ID=444 (controller A1). Although a format of the connection establishment response packet is not shown, the connection establishment response packet includes information indicative of the requested connection and information indicative of an establishment result (success/failure).

Note that, in case where a stream sent from the same device or the same communication station is received by different communication stations or different devices, there are a plurality of connections identical to each other in terms of the sending end communication station address and the sending end device ID. In this case, it is possible to adopt two methods: a method in which a single stream is sent to the network NW and the stream is received by a plurality of communication stations, or a method in which a plurality of streams identical to each other in terms of content are sent to the network NW and the streams are respectively received by the communication stations.

Further, in the communication station A, setting and management of the connection are performed by the communication station control section 33. In the communication station C, the setting and management of the connection are performed by the communication station control section 23.

Figure 47:
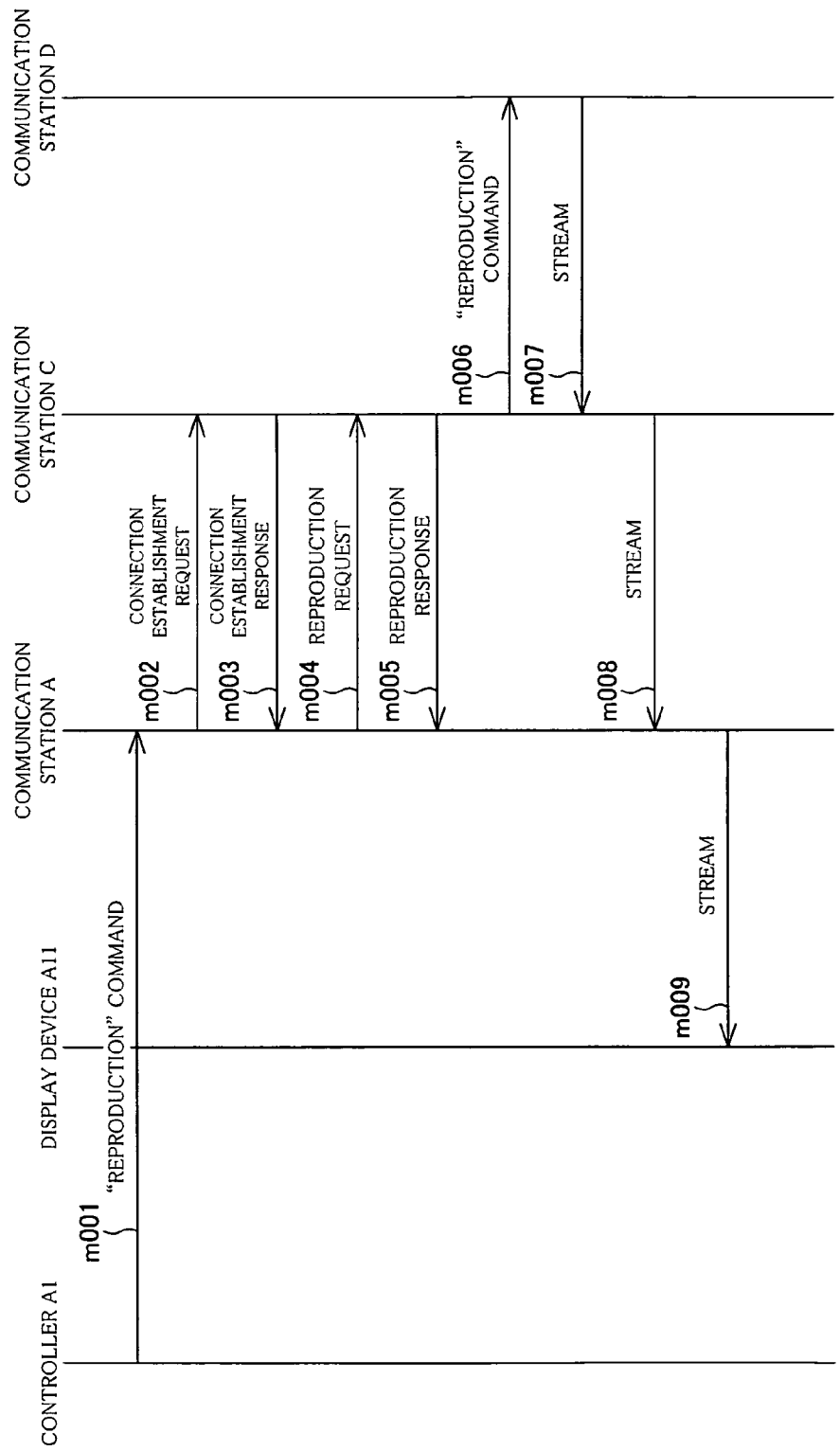
FIG. 47 is a timing chart showing a message sequence in case where a control right is successfully obtained by sending a reproduction command.
Figure 48:
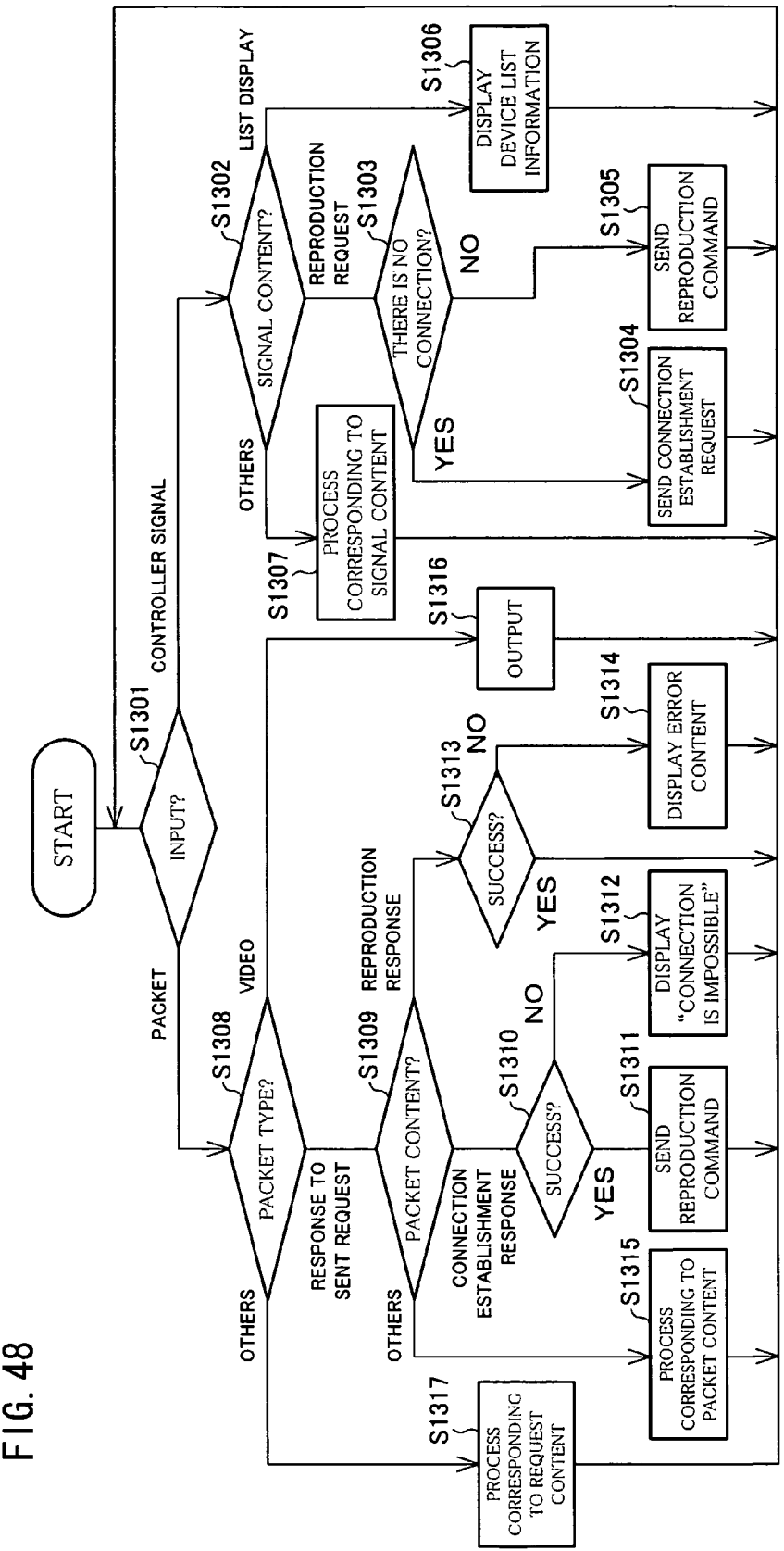
FIG. 48 is a flowchart showing a procedure, including a process in case where the control right is successfully obtained by sending a reproduction command, which is carried out in the video signal receiving side communication station.
Figure 49:
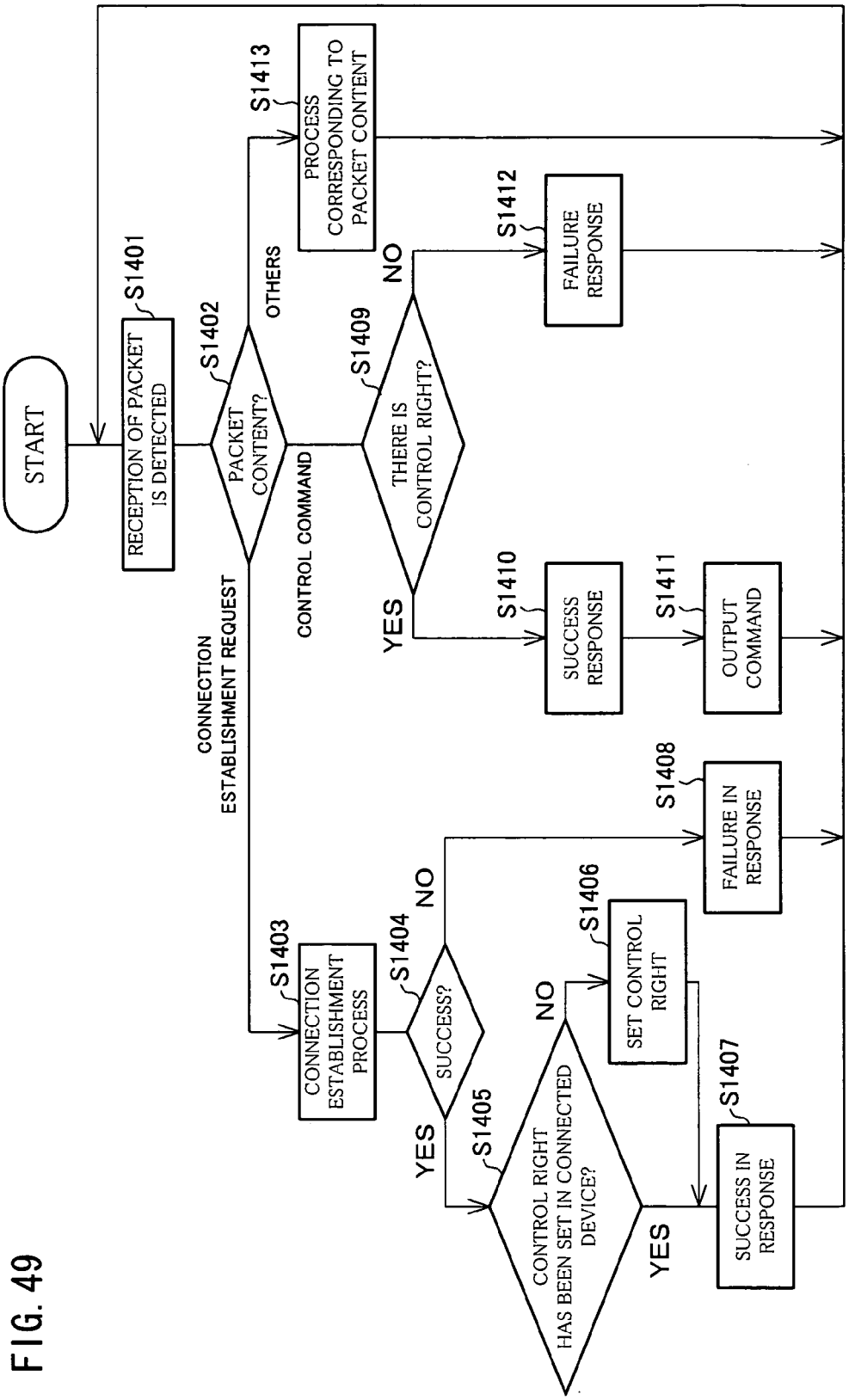
FIG. 49 is a flowchart showing a procedure, including a process in case where the control right is successfully obtained by sending a reproduction command, which is carried out in the video signal sending side communication station.

Here, a message sequence at the time of success in obtaining the control right that is shown in FIG. 47 is described with reference to FIG. 2, FIG. 3, FIG. 48, and FIG. 49. FIG. 48 and FIG. 49 are flowcharts respectively showing processes performed in a command sending station (communication station A) and in a command receiving station (communication station C).

Note that, in the communication station A, selection of a connection end (the communication station C and the device D) is completed on the basis of the displayed list of S1 shown in FIG. 8 and a result thereof before entering into the sequence shown in FIG. 47. That is, the communication station A can set a receiving end of a command sent from the controller A1.

When the user pushes a reproduction button of the controller A1 (that is, the controller 12), a "reproduction" command is sent to the communication station A (m001). The communication station control section 33 of the communication station A receives the command via the signal processing section 36, and determines that an input is a signal sent from the controller (S1301), and determines contents of the signal (S1302).

Here, the command content is a reproduction command, so that whether a communication connection to a receiving end (communication station C in this example) of the selected command has been established or not is confirmed (S1303). In case where the connection has not been established, the communication station control section 33 sends a connection establishment request packet to the communication station C via the packet conversion section 32 and the radio section 31 (S1304, m002).

The communication station control section 23 of the communication station C receives the connection establishment request packet via the radio section 21 and the packet conversion section 22 (S1401), and confirms contents of the connection establishment request (S1402), and tries to establish the connection in the communication station C (S1403), and confirms a result thereof (S1404).

In case where the connection is established, the communication station C manages the information in the communication station control section 23, and causes the device control information management section 24 to confirm whether the control right for a device with which the connection is established has been already set or not (S1405). If the control right has not been set, the control right is allocated to the controller A1 which has established the connection, and thus allocated control right is registered into the control information management table managed by the device control information section 24 (S1406).

Further, regardless of whether the control right has been set or not, the communication station control section 23 sends a connection establishment response packet to the communication station A via the radio section 21, and notifies a result of the connection establishment (S1407, m003).

In case where the connection has not been established, the connection establishment response packet is sent to the communication station A, and notifies the communication station A of failure in the connection establishment (S1408). Here, the connection is successfully established, and the controller A1 obtains the control right.

When the communication station control section 33 of the communication station A receives the packet via the radio section 31 and the packet conversion section 32, the communication station control section 33 determines that an input is a packet (S1301), and determines a type of the packet (S1308). Here, when a content of a response to the request packet that has been sent is determined (S1309), it is found that the response is to the connection establishment request. Further, whether the connection establishment request has resulted in success or not is confirmed in accordance with the response (S1310). As a result, it is found that the connection establishment request has resulted in success. Thus, the communication station A sends reproduction request to the communication station C via the packet conversion section 32 and the radio section 31 (S1311, m004). Note that, in case where the connection establishment response sent from the communication station C indicates failure in the connection establishment, the communication station A sends a video showing "disconnection" to the display device A1 (S1312).

The communication station control section 23 of the communication station C receives the reproduction request command via the radio section 21 and the packet conversion section 22 (S1401), and confirms that the command is a control command (S1402), and determines the control right by inquiring a setting condition of the control right from the device control information management section 24 (S1409). In this example, the controller A1 has the control right for the device D, so that the communication station control section 23 of the communication station C notifies the communication station A of the success in the reproduction command request via the packet conversion section 22 and the radio section 21 (S1410, m005). Further, the communication station control section 23 of the communication station C notifies the signal processing section 26 corresponding to the device D of the reproduction request, and converts the reproduction request into a reproduction command for the device D, and sends the command to the device D (S1411, m006).

Note that, in the step S1409, when the controller A1 does not have the control right for the device D, the communication station control section 23 of the communication station C notifies the communication station A of the failure in the reproduction request via the packet conversion section 22 and the radio section 21 (S1412, m005).

The communication station control section 33 of the communication station A receives the reproduction response via the radio section 31 and the packet conversion section 32 (S1310, S1308, S1309), and determines whether the reproduction request results in success or not (S1313). If the reproduction request results in success, it is not necessary to perform a special process at this time. If the reproduction request results in failure, the communication station control section 33 of the communication station A orders the signal processing section 36 to send a video showing a reason for which it is impossible to carry out the reproduction (that is a video showing error content) to the display device A11 (S1314).

While, upon receiving the reproduction command from the communication station C (m006), the device D commences the reproduction, and sends a stream to the communication station C. The signal processing section 26 of the communication station C receives and encodes the stream, and sends thus encoded stream to the communication station A, that has established the communication connection, via the packet conversion section 22 and the radio section 21 (m008).

Upon receiving the stream packet via the radio section 31 and the packet conversion section 32, the communication station control section 33 of the communication station A determines that an input is a packet (S1301), and determines a type of the packet (S1308). Here, the packet is a video packet, so that content of the packet is decoded by the signal processing section 36, and is outputted to the display device A11 (S1316, m009). Thus, the stream is sent and received after setting the control right without demonstratively performing the control priority setting request.

Note that, if the communication connection is established when the communication station A receives the reproduction command from the controller A1 (S1303), the communication station A sends the reproduction command instead of sending the connection establishment request to the communication station C (S1305). The steps thereafter are the same as described above.

Further, in case where the communication station A receives the reproduction response from the communication station C (S1301, S1308, S1309) and a result thereof is failure, a video showing a reason for which it is impossible to carry out the reproduction is sent to the display device A11 (S1314) as described above. In this case, if the communication station A fails to obtain the control right for the device D and fails in the reproduction request, another device may have received the stream from the device D via the communication station C.

Figure 50:
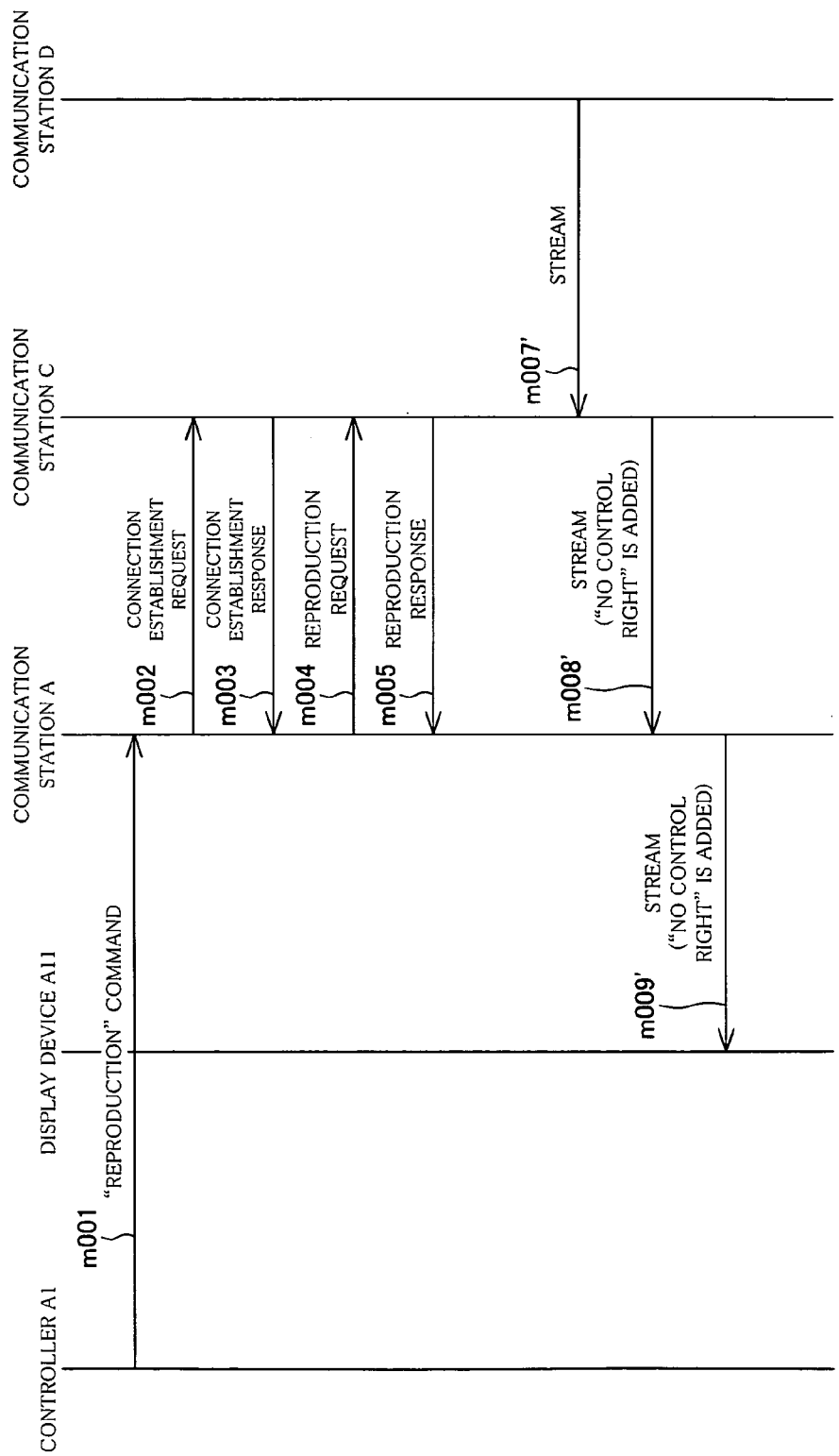
FIG. 50 is a timing chart showing another example, being different from FIG. 47, which shows the message sequence in sending the reproduction command.

In this case, as shown in FIG. 50, the stream (m007') has already flowed from the device D to the communication station C, and setting of the communication connection from the communication station C to the communication station A has been completed, so that the communication station A can receive the stream from the device D via the communication station C (m008'). Thus, the communication station A can send the stream to the display device A11. That is, the controller A1 cannot control the device D, but the display device A11 can receive the stream outputted from the device D.

In this case, the communication station C has recognized that the controller A1 does not have the control right for the device D in accordance with the determination performed in the step S1409, so that the communication station C superposes the information on the stream, so as to send the superposed stream to the display device A11 via the communication station A (m008' and m009'). Thus, even when each of the communication station A and the display device A11 does not have a configuration for handling the control right, it is possible to notify the user seeing the display device A11, i.e., the user who uses the controller A1 in controlling a device, that it is impossible to control the device D since the control right cannot be obtained.

The addition of the information "it is impossible to carry out the reproduction since the control right cannot be obtained" to the stream is carried out by the communication station C which functions as a stream sending station. Other than this arrangement, if the information "it is impossible to carry out the reproduction since the control right cannot be obtained" is included in the aforementioned reproduction response, it may be so arranged that the addition of the information is carried out by the communication station A which functions as a stream receiving station. Also in this case, even when the display device A11 does not have a configuration for handling the control right, it is possible to notify the user seeing the display device A11, i.e., the user who uses the controller A1 in controlling a device, that it is impossible to control the device D since the control right cannot be obtained.

In the foregoing example, if the control right for the device D has not been set in the communication station C, the control right is allocated to the controller A1 which has established the connection, that is, the control right is allocated only to a device that has established the first connection. However, the control right is not necessarily given only in case of a single connection, but may be given also in case of three or less connections, or in similar case.

Further, in the communication station C of the foregoing example, the connection establishment request is accepted regardless of whether the control right is given or not, and accepts the reproduction request only when a device having the control right issues the reproduction request. However, a request which occurs in the communication station is not limited to the connection establishment request and the reproduction request. As to other request, the request may be accepted according to content of the request regardless of whether the control right is given or not, or the request may be accepted only when a device having the control right issues the request.

Further, the present embodiment describes the example where the communication station A sends the connection establishment request and the reproduction request by pushing a "reproduction" button on the side of the controller. However, the relationship in which an operation of the user and a command sent by the communication station A correspond to each other is not limited to the foregoing arrangement. For example, it may be so arranged that the connection is established in performing the device list display operation, or it may be so arranged that other operations and the request are combined with each other.

Further, the present embodiment describes the example where a communication station is separately provided from a controller, a display device, and an operated device. However, the present invention is not limited to this system arrangement, and it may be so arranged that: the communication station and the controller are provided as a single device, or the communication station and the display device are provided as a single device, or the communication station and the operated device are provided as a single device. That is, as long as it is so arranged that the one device controls the other device via a communication path, the content of the present embodiment can be applied to a controlled device.

Note that, in FIG. 47 to FIG. 50, as to steps having no relation with a process for obtaining the control right and a process for sending/receiving the stream, description thereof is omitted (in the communication station A, S1306, S1307, S1315, S1317, and in the communication station C, S1413).

Further, the present embodiment is not limited to a process for giving the control right, but can be applied to other process, particularly to a process for releasing the control right. In case of releasing the control right, it is possible to realize the present embodiment by making a specific command (for example, disconnection) and the release of the control right correspond to each other as in the case of giving the control right.

Embodiment 4

Embodiment 3 describes the method in which: a controlled device accepts requests other than the request for obtaining the control right that are sent from a plurality of devices, and gives the control right to a part of the devices whose requests have been accepted. The present embodiment describes a method for handling the control right for the controlled device when there is no device to which the control right has been given.

For example, Embodiment 2 describes operations in terms of the system arrangement of FIG. 1. However, the present embodiment gives description based on a condition under which the control station C "accepts the connection establishment requests sent from a plurality of devices so as to establish the connection with a certain device, but gives the control right only to a first device that has established the connection".

Here, operations are performed in the following order: reproduction of the device D is carried out via the controller A1 (the connection establishment is successfully carried out and the control right is given)→reproduction of the device D is carried out via the controller B1 (the connection establishment is successfully carried out but the control right is not given)→disconnection from the controller A1 is requested (the control right is released). In this case, the controller A1 requests the disconnection from the device D, so that the control right given to the controller A1 is released. However, it is impossible to control the device D via the controller B1 (a stream is displayed in the display device B11 related to the controller B1). A method for preventing this condition is described as follows.

Figure 51:
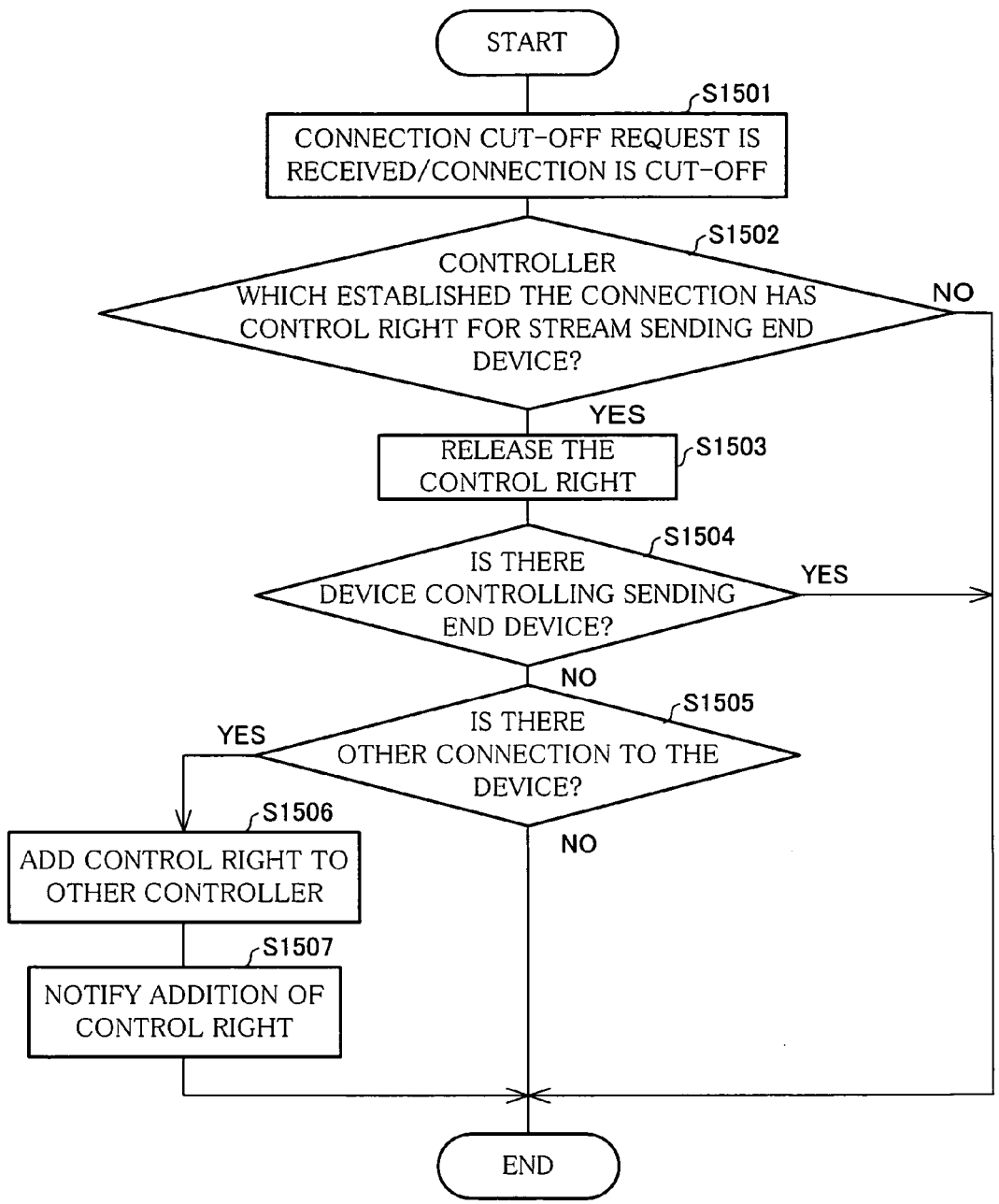
FIG. 51 is a flowchart showing how the video signal sending side communication station operates in receiving a request for disconnection.

A flowchart of FIG. 51 shows how the communication station C operates upon receiving the disconnection request, and further explanation thereof is given with reference to FIG. 2.

Upon receiving the disconnection request by means of the radio section 21, the communication station C notifies the communication station control section 23 of the disconnection request via the packet conversion section 22. The communication station control section 23 carries out the disconnection on the basis of the disconnection request (S1501), and confirms whether the disconnected controller has the control right for the stream sending end device in the connection or not (S1502). When the controller does not have the control right, the process is ended.

When the controller has the control right, the communication station control section 23 requests the device control information management section 24 to release the control right, and the device control information management section 24 updates information of the control information management table managed by the device control information management section 24 itself (S1503).

Further, the communication station control section 23 causes the device control information management section 24 to confirm whether or not there is a device which controls the sending end device in the connection (S1504). When there is the controlling device, the process is ended.

In case where there is not any controlling device, the communication station control section 23 confirms whether other connection with the sending end device is established or not (S1505). If there is no other connection, other device does not use the sending end device, so that the process is ended.

In case where other connection with the sending end device is established, there is a device which receives a stream from the sending end device. However, at a time when the device having the control right releases the control right by the disconnection, other device which merely receives a stream from the sending end device cannot control the sending end device. Thus, when the control right is released, it is preferable to give the control right to any other device which receives a stream from the sending end device at this time.

Then, the communication station control section 23 selects one connection from connections with the sending end device, and gives the control right to a controller which has established the connection (S1506). Further, the communication station control section 23 notifies a receiving end communication station or a receiving end device in the connection that the control right is newly given to the receiving end communication station or the receiving end device (S1507). That is, information indicating that the control right is given to the stream being sent is superposed on a video signal by means of the video signal superposing section (not shown in FIG. 2), and thus superposed information is transmitted to the receiving end device via the packet conversion section 22 and the radio section 21.

Note that, the superposed information transmitted to the controller, to which the control right has been newly given, (more exactly, the superposed information transmitted to a communication station or a display device that is used with the controller) may be transmitted as a command, from the communication station control section 23 via the packet conversion section 22 and the radio section 21 to the receiving end communication station, or may be displayed in the communication station C, or may be transmitted to other communication station and device.

Further, examples of a criterion for selecting a controller to which the control right is newly given in the step S1506 are as follows: whether the connection is kept for the longest time or not; whether the connection is kept for a certain time or not; whether the connection is kept via the same receiving end communication station or not; and the like. However, the criterion for selecting the controller to which the control right is newly given is not limited to them.

Embodiment 5

Each of Embodiments 1 and 2 describes the method for requesting and releasing the control right on the basis of the command given from the communication station A to the communication station C. The present embodiment describes a method in which: the communication station detects a communication condition, so that the control right is requested or released even though the user gives no instruction.

Figure 24:
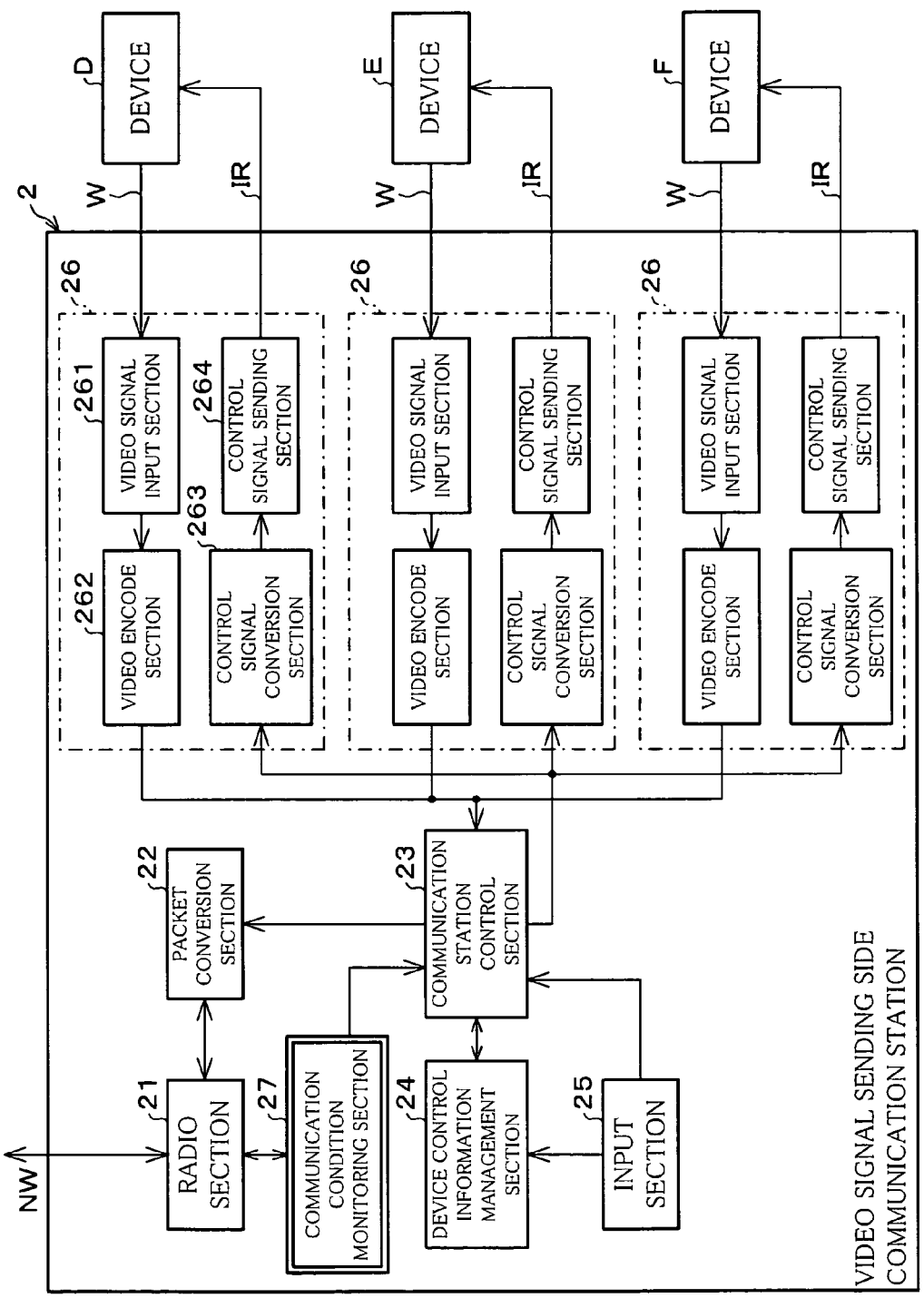
FIG. 24 is a block diagram showing an arrangement of another video signal sending side communication station of the AV system.

The following description explains a method for automatically renouncing the control right in case where a factor such as deterioration of the communication condition stops sending of the stream. In this method, a sending station 2 arranged as shown in FIG. 24 is used instead of the sending station 2 shown in FIG. 2.

The sending station 2 is different from the sending station 2 shown in FIG. 2 in that a communication condition monitoring section 27 is further provided. The communication condition monitoring section 27 which functions as monitoring means has a function for monitoring a condition of a communication, such as sending of a stream, in which a sending operation is performed with a certain band secured (a function for detecting variation of the communication condition). In case where the communication is stopped due to deterioration or the like of the communication condition, the communication condition monitoring section 27 notifies the communication station control section 23 of the stoppage.

A format of a control information management table managed by the device control information management section 24 is different from the format shown in FIG. 5 in that a "stream receiving end" item is further included. The "stream receiving end" is an item for storing a stream receiving end for each device.

As to a VTR 1 which is the device D, the control information management table shows a condition under which: a stream is being sent to the communication station A whose address is "11111", and the control right is given to the controller A1 whose device ID is "444". Further, as to a VTR 2 which is the device F, the control information management table shows a condition under which: a stream is being sent to the communication station B whose address is "22222", and the control right is given to the controller B1 whose device ID is "555". Further, as to a DVD which is the device E, the control information management table shows a condition under which: a stream is not sent, and the control right is not given to the controllers A1 and B1.

Under this condition, a video signal sent from the device D via the analog wiring W is received by the video signal input section 261 of the communication station C, and is converted into digital data by means of the video encode section 262. The communication station control section 23 receives the data, and confirms the control information management table of the device control information management section 23, thereby recognizing that video data sent from the device D is data which should be sent to the communication station A whose address is "11111". Then, a packet whose receiving end address is "11111" is generated, and the video data is incorporated into the packet, and the packet is sent. At this time, the communication condition monitoring section 27 monitors a communication condition of the radio section, and checks whether the communication is stopped or not by detecting (i) whether or not the receiving station 3 responds upon receiving the packet and (ii) stream setting cancellation notification transmitted from a subordinate portion of the radio section.

In case where deterioration of the communication condition stops the data from being sent to the address "11111", the communication condition monitoring section 27 detects this condition, and notifies the communication station control section 23 of the condition. The communication station control section 23 instructs the device control information management section 24 to search the receiving end address "11111" from the control information management table. The control information management table is under a condition shown in FIG. 25, so that the device control information management section 24 notifies the communication station control section 23 that the address is identical to the receiving end address. Then, the communication station control section 23 instructs the device control information management section 24 to delete the receiving end address and the control information of the device D, so that they are deleted from the control information management table. Thus, the control right for the device D is not given to any device.

In case where sending of the stream is stopped, it is possible to automatically revoke (renounce) the control right in this manner. Thus, it is possible to make the sending of the stream and the control right correspond to each other by performing the foregoing procedure.

Note that, the present embodiment describes the example in which: the communication station C which is a sending station of the stream detects that it is impossible to send a stream, and releases the control right of a controller which has set the stream. However, at this time, a station (the communication station C in the present embodiment) which has detected the release of the control right may notify another station (the communication station A) that the control right has been released. Further, it may be so arranged that: in accordance with a condition under which a stream receiving station does not receive the stream, it is determined that the control right has been released. Alternatively, it may be so arranged that: a stream sending station (the communication station C) is notified of (is ordered to carry out) the release of the control right. Alternatively, it may be so arranged that: the stream receiving station (the communication station A) notifies the display device A11 of information concerning the release of the control right. In case where deterioration of the communication condition prevents the stream sending station from notifying the release of the control right to the stream receiving station, it is particularly effective to determine that the control right has been released, by detecting that the stream cannot be received on the side of the stream receiving station. Further, it is effective to notify the user of the release of the control right in the stream sending station or the stream receiving station, so that the user can perform appropriate operations thereafter.

Note that, if the condition under which the stream cannot be received is temporal, it is preferable to release the control right in a certain time after detecting that the stream cannot be sent, in order to prevent unnecessary movement of the control right.

Further, it may be so arranged that: a stream sending station (communication station C) detects a stream which is sent to the stream sending station from each of devices (such as the devices D, E, and F) connected to the stream sending station, and the control right is set between the device or the stream sending station itself and a stream receiving device or a stream receiving station. As to this setting, there is a case where the control right for the stream receiving device or the stream receiving station is given to the stream sending device or the stream sending station. Adversely, there is a case where the control right for the stream sending device or the stream sending station is given to the stream receiving device or the stream receiving station.

Embodiment 6

The present embodiment provides an arrangement which is different from the system shown in FIG. 1 in that the user near the communication station C and the device D can directly control the device D. This system is arranged so as to satisfy a request from the user on the side of the communication station C so that the user near the communication station C or the communication station B is prevented from controlling the device D via the radio network NW. The system is detailed as follows.

Figure 26:
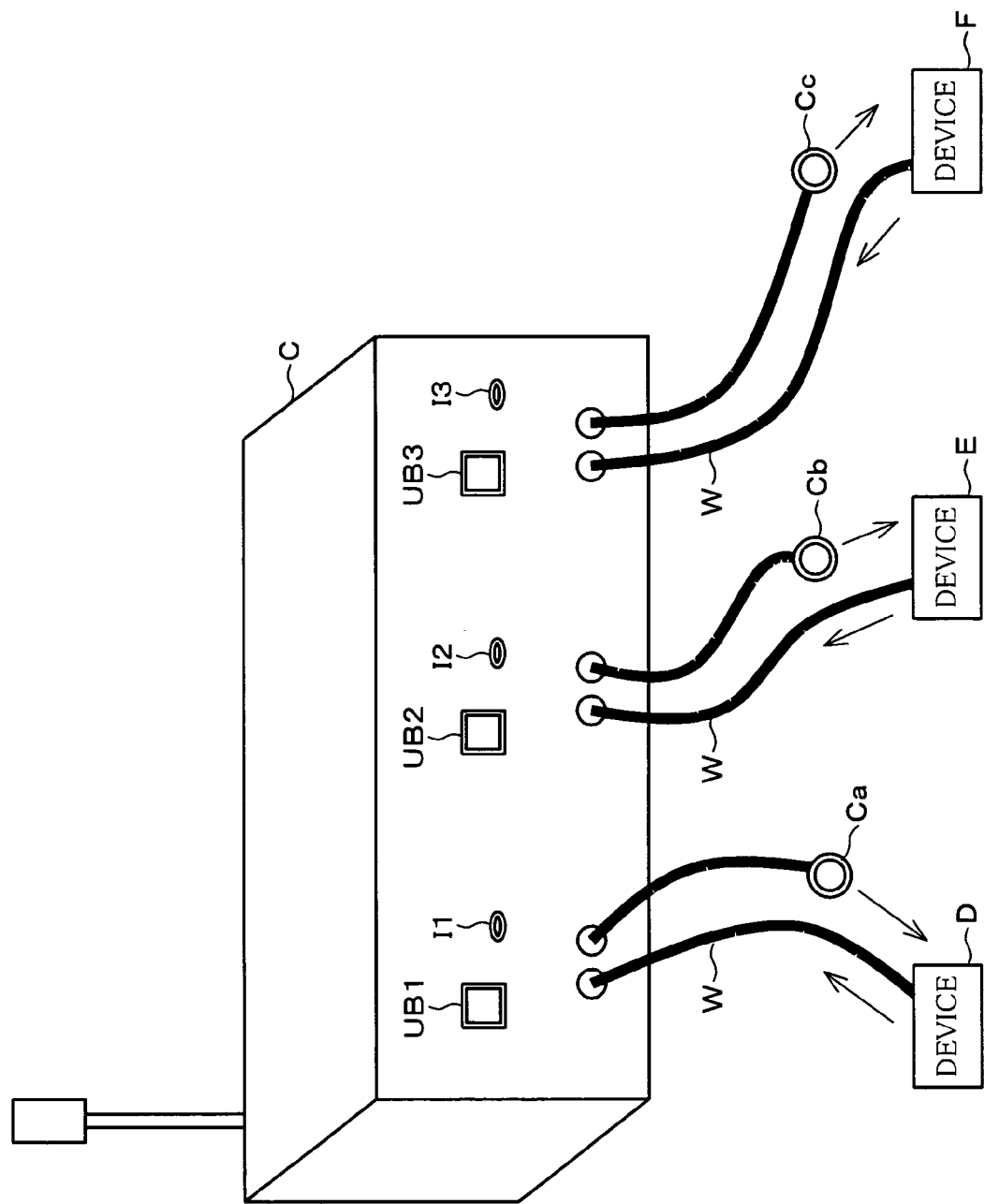
FIG. 26 is a perspective view showing an appearance of a video signal sending side communication station of an AV system according to Embodiment 4 of the present invention.

FIG. 26 shows an appearance of the communication station C. An in-use button UB1 is disposed near a connection terminal of the analog wiring W connected to the device D. When the in-use button UB1 is pushed, it is possible to prevent the device D from being controlled via the radio network. An indicator I1 for indicating such condition is disposed near the in-use button UB1. As to the device E, an in-use button UB2 and an indicator I2 are disposed near the analog connection terminal likewise. Also, as to the device F, an in-use button UB3 and an indicator I3 are disposed near the analog connection terminal likewise.

Figure 27:
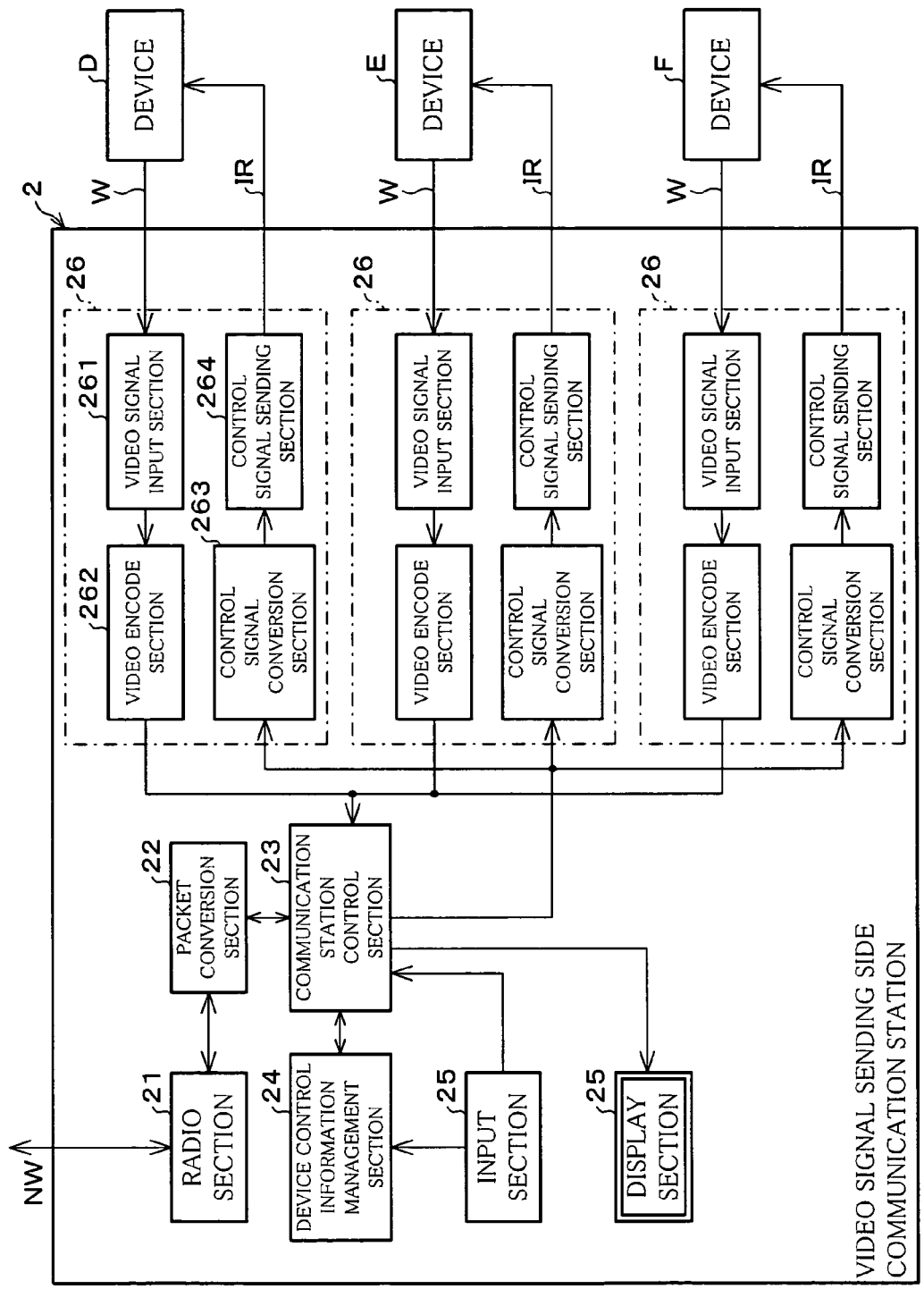
FIG. 27 is a block diagram showing an arrangement of the video signal sending side communication station shown in FIG. 26.

As shown in FIG. 27, the communication station C is different from the communication station C shown in FIG. 2 in that a display section 28 is further provided. The display section 28 includes the indicator I1 and a circuit for lighting the indicator I1, and displays information such as a condition of the communication station in response to instruction given by the communication station control section 23. Further, the in-use button UB1 is included in the input section 25.

The following description explains how the system arranged as described above operates in case where the user near the communication station C pushes the in-use button UB1 for the device D which is disposed in the communication station C so as to prevent other user from operating the device D via the radio network NW.

The input section 25 notifies the communication station control section 23 that the in-use button UB1 for the device D has been pushed. Upon receiving the notification, the communication station control section 23 instructs the device control information management section 24 not to give the control right for the device D. As shown in FIG. 28, the device control information management section 24 writes a specific value indicating that the control right is not given, for example, writes "***" in a device D control information item of the control information management table, and notifies the communication station control section 23 that the writing has been completed.

The communication station C carries out the operations described in Embodiment 1. Thus, storage of the foregoing value causes other communication station to fail to request the control right and carry out the device control command. Thus, it is possible to prevent the device D from being controlled via the radio network NW.

In order to show this condition to the user, the communication station control section 23 instructs the display section 28 to light the indicator I1 corresponding to the device D upon being notified that the writing has been completed. In response to the instruction, the display section 28 lights the indicator I1 corresponding to the device D.

The indicator I1 is lighted, so that the user can recognize that other communication station is prevented from controlling the device D via the radio network.

In the present embodiment, a specific value such as "***" is written in the control information management table so as to indicate that the control right is not given, but an ID for identifying the communication station itself or the device itself (device D) may be written as the foregoing value.

Further, in case where the control right has been already given to other device or other communication station at the time when the in-use button for the device D is pushed, the control right thereof may be cancelled, or it may be so arranged that: the control right thereof is validated, and setting of the control right that has been performed by pushing down the button is invalidated.

Further, in the present embodiment, whether the control right is given or not is indicated by the indicator. However, it may be so arranged that: in case where the control right is newly set or is released, the indicator is made to flash on and off so as to notify the user that the control right has been changed.

Embodiment 7

The present embodiment describes a sequence of a communication performed between the communication stations A/B and the communication station C. This sequence is common between the AV systems of the aforementioned embodiments.

Figure 29:
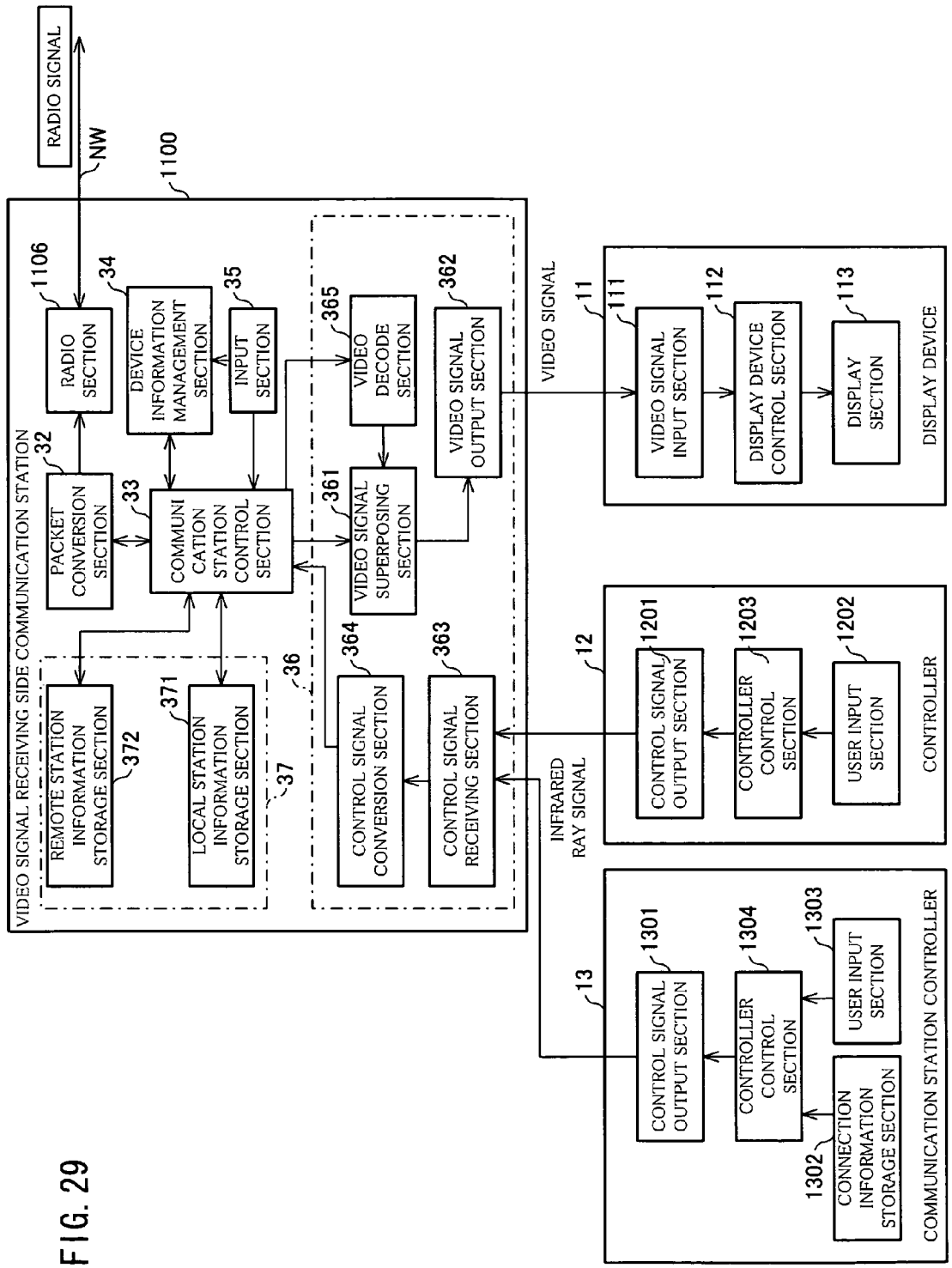
FIG. 29 is a block diagram showing an arrangement of a video signal receiving side communication station according to Embodiment 5 of the present invention.

The receiving station 3 which functions as the communication station A or the communication station B is arranged as shown in FIG. 29.

Note that, the following description explains a communication between the communication station A and the communication station C. However, a similar communication is performed between the communication station B and the communication station C, so that description thereof is omitted.

The receiving station 3 further includes an information storage section 37 which has a local station information storage section 371 and a remote station information storage section 372. The local station information storage section 371 stores (i) an SSID (described later) that the communication station control section 33 has detected from a control signal outputted by the controller 12, (ii) a WEP key (described later) for encoding data, (iii) a communication station user name (described later), (iv) and the like. While, the remote station information storage section 372 stores counterpart station information included in a packet, that the receiving station 3 has received from the sending station 2, as a table corresponding to a communication address of a counterpart station.

The controller 12 of the present system includes a control signal output section 1201, a user input section 1202, and a controller control section 1203.

The control signal output section 1201 is a portion for outputting a control signal outputted by the controller control section 1203, and includes: a circuit for converting the control signal into an infrared ray pulse signal; and a light emission element for emitting the infrared ray.

The user input section 1202 includes: the aforementioned operation buttons 121 to 126; and a conversion circuit for accepting operations performed by the user as inputs and for outputting data (code) indicative of various kinds of instructions and values corresponding to the buttons.

The controller control section 1203 converts the instructions and values, that have been inputted by the user input section 1202, into control signals, and outputs thus converted control signals.

Further, the present system includes not only the controller 12 for controlling the device but also a communication station controller 13 for controlling the receiving station 3. The communication station controller 13 includes a control signal output section 1301, a connection information storage section 1302, a user input section 1303, and a controller control section 1304.

The control signal output section 1302 is a portion for outputting a control signal outputted by the controller control section 1304, and includes: a circuit for converting the control signal into an infrared ray pulse signal; and a light emission element for emitting the infrared ray.

The connection information storage section 1302 includes a memory for storing connection information, such as an SSID value, required in establishing a network connection.

The user input section 1303 includes: operation buttons similar to the aforementioned operation buttons 12e to 12f; and a conversion circuit for accepting operations, performed by the user, as inputs and for outputting data (code) indicative of various kinds of instructions and values corresponding to the buttons.

The controller control section 1304 converts the instructions and values, inputted by the user input section 1303, into control signals, and outputs thus converted control signals. Further, the controller control section 1304 performs an output process of the SSID described later.

Further, the sending station 3 can be controlled by the communication station controller 14. The sending station 2 includes a control signal receiving section 2001 and a control conversion section 2002 that are equal to the control signal receiving section 363 and the control signal conversion section 364 of the receiving station 3.

The communication station controller 14 includes a control signal output section 1401, a user input section 1402, and a controller control section 1403 that are substantially equal to the control signal output section 1202, the user input section 1202, and the controller control section 1203 of the controller 12.

Figure 30:
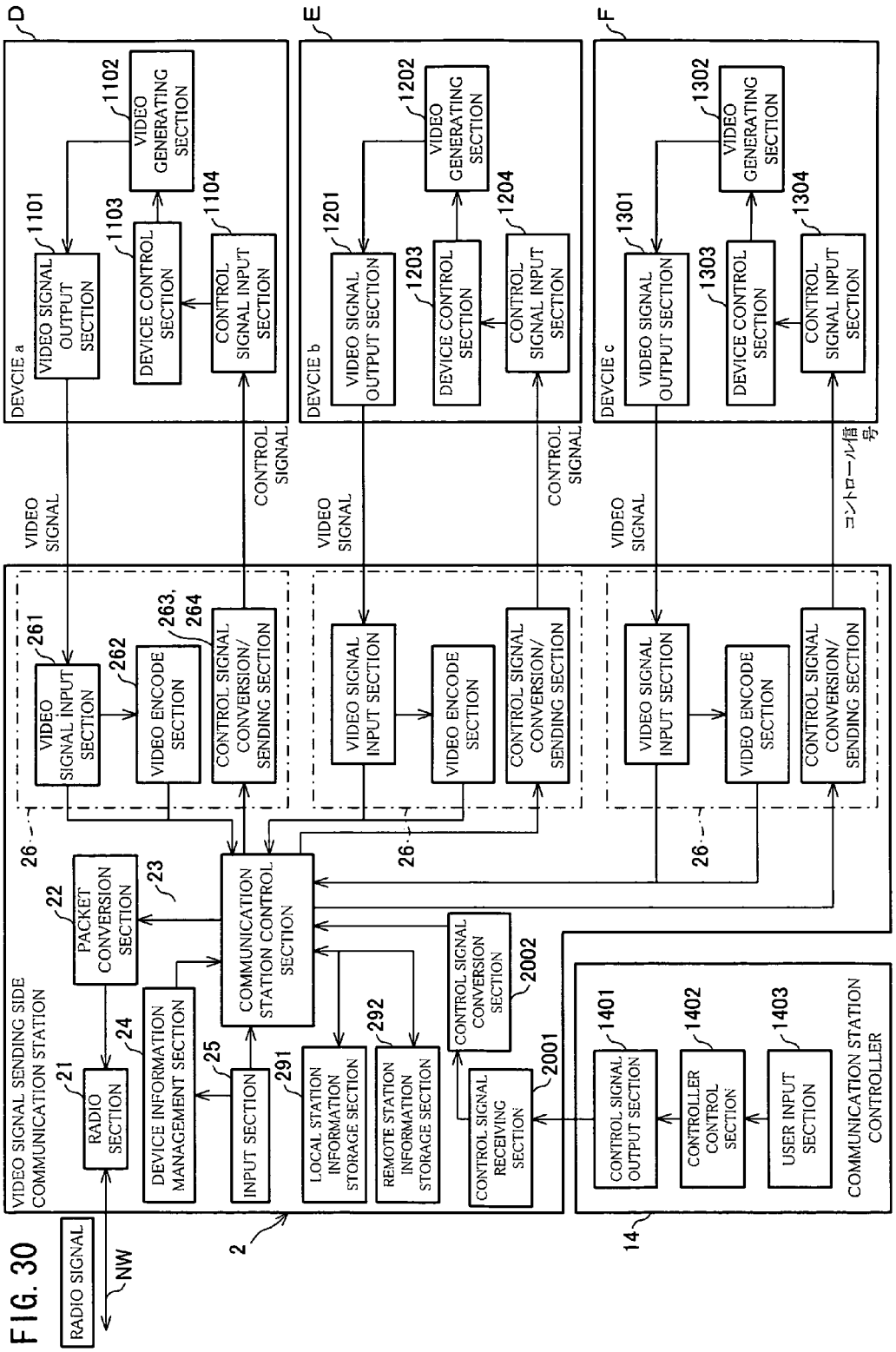
FIG. 30 is a block diagram showing an arrangement of a video signal sending side communication station of the AV system according to Embodiment 5.

A station on the side of the sending station 2 which functions as the communication station C of the present system is arranged as shown in FIG. 30.

The sending station 2 further includes an information storage section 20 which has a local station information storage section 291 and a remote station information storage section 292. The local station information storage section 291 stores the SSID, the WEP key, the communication station user name, information (plug information) of a device managed for each video signal input section 261, and the like. While, the remote station information storage section 292 stores information of all the communication stations that has been obtained by the sending station 2.

Figure 31:
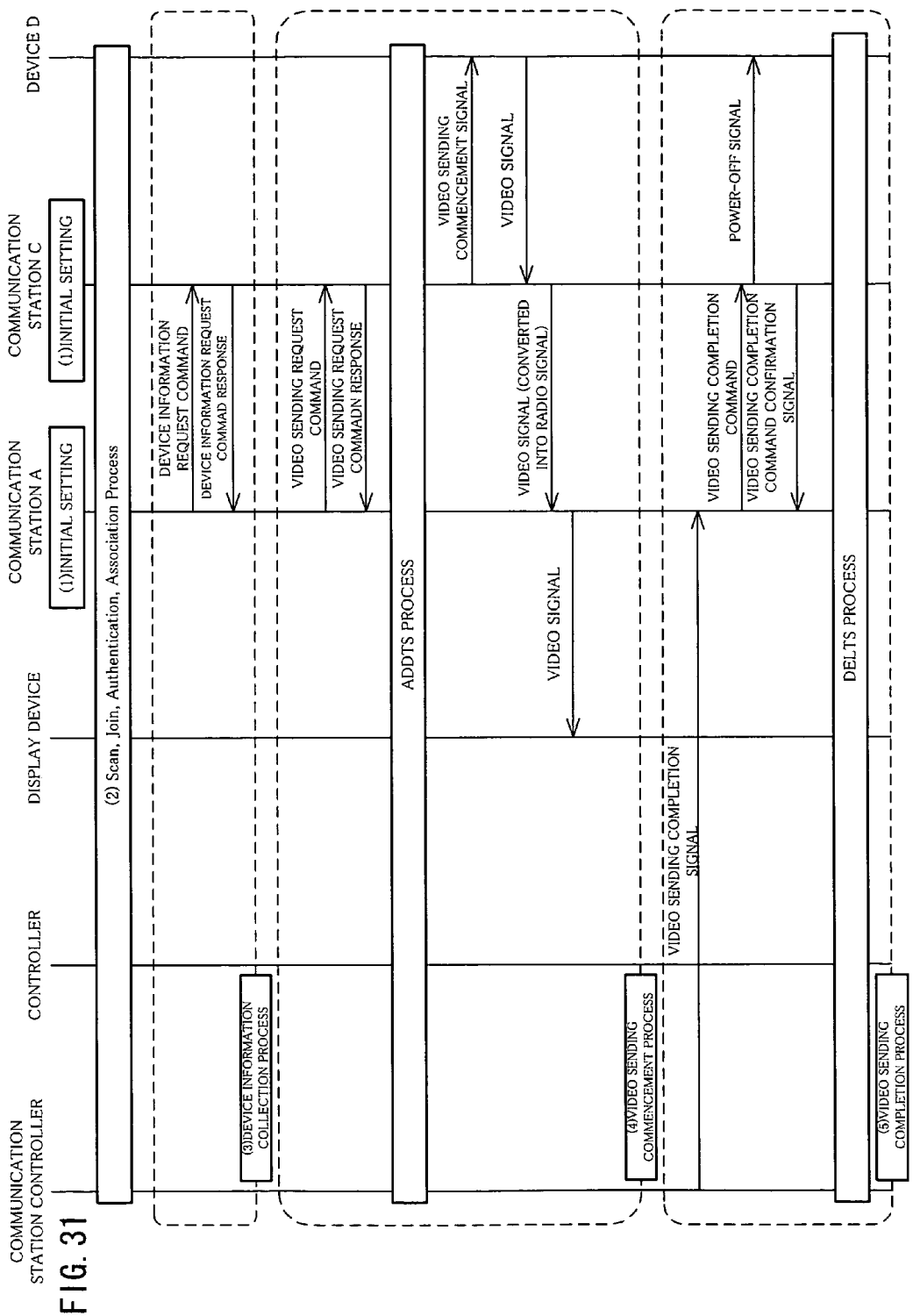
FIG. 31 shows a communication sequence among respective sections in various processes of the AV system of Embodiment 5.

FIG. 31 is a timing diagram (diagram showing an order and contents of messages sent) in a process described as follows. The diagram shows (1) initial setting, (2) Scan, Join, Authentication, Association process, (3) device information collecting process, (4) video sending start process, and (5) video sending completion, in a time series manner. The following description is based on these categories.

First, (1) initial setting in FIG. 31 is described as follows.

The following description explains a procedure based on a condition under which the receiving station 3 of FIG. 29 and the sending station 2 of FIG. 30 are turned ON.

Here, the condition under which the receiving station 3 and the sending station 2 are turned ON is a condition under which: contents of packets received by the radio section 21 of the sending station 2 and the radio section 31 of the receiving station 3 can be analyzed, and the sending station 2 and the receiving station 3 cause the control signal receiving sections 2001 and 363 to receive control signals, and the control signal conversion sections 2002 and 364 can analyze contents of the control signals. The condition may be a standby condition under which a part or all of blocks which are not required in the foregoing operations of the sending station 2 and the receiving station 3 do not operate in order to reduce power consumption. In this case, the blocks are made to operate as required on the basis of determination given by the communication station control sections 23 and 33. An order in which the sending station 2 and the receiving station 3 are turned ON is arbitrarily set. Further, also in case where a plurality of sending stations 2 and a plurality of receiving stations 3 in the radio network NW, an order in which the sending stations 2 and the receiving stations 3 are turned ON is arbitrarily set.

Figure 32:
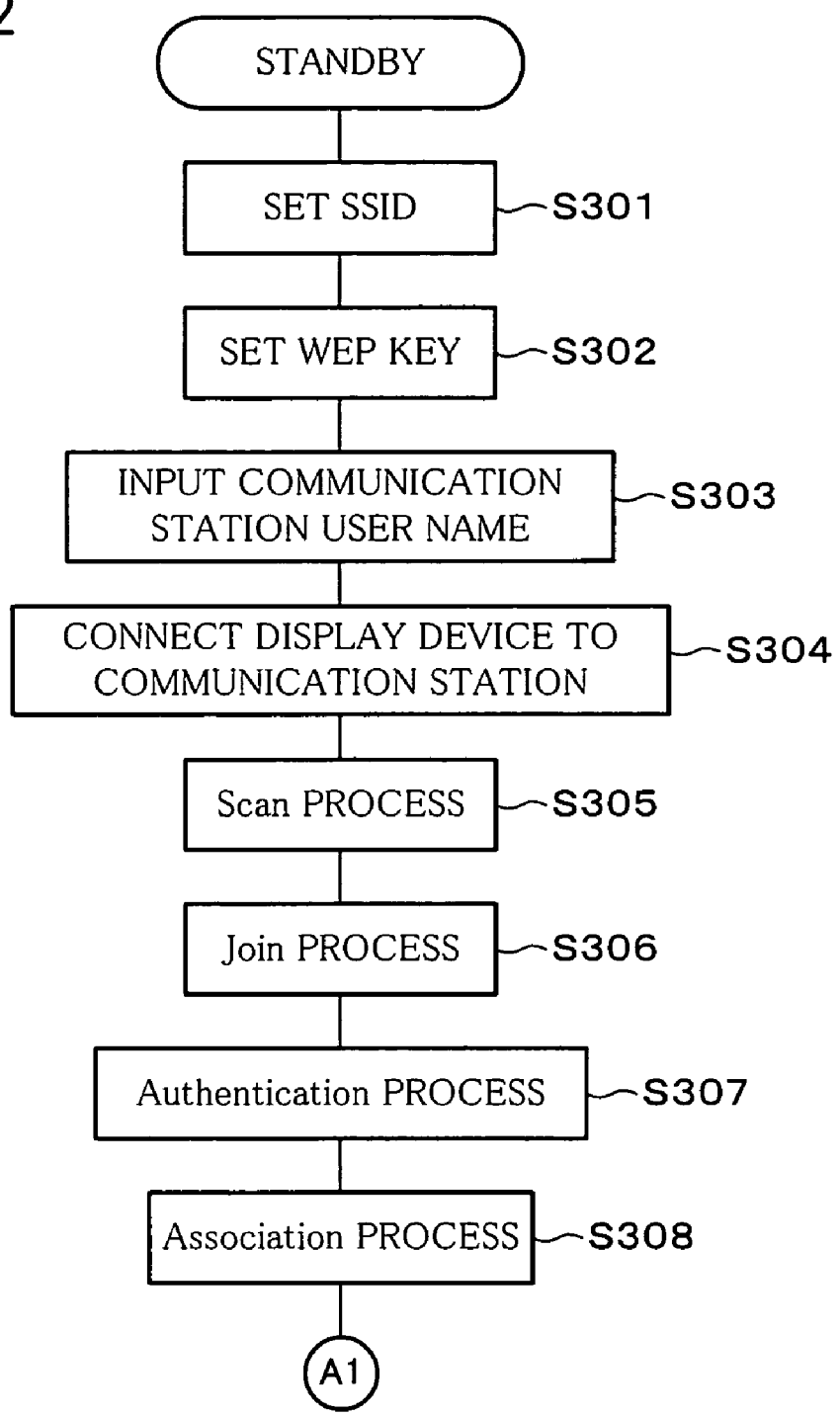
FIG. 32 is a flowchart showing respective procedures of FIG. 31 that are carried out in the video signal receiving side communication station.
Figure 33:
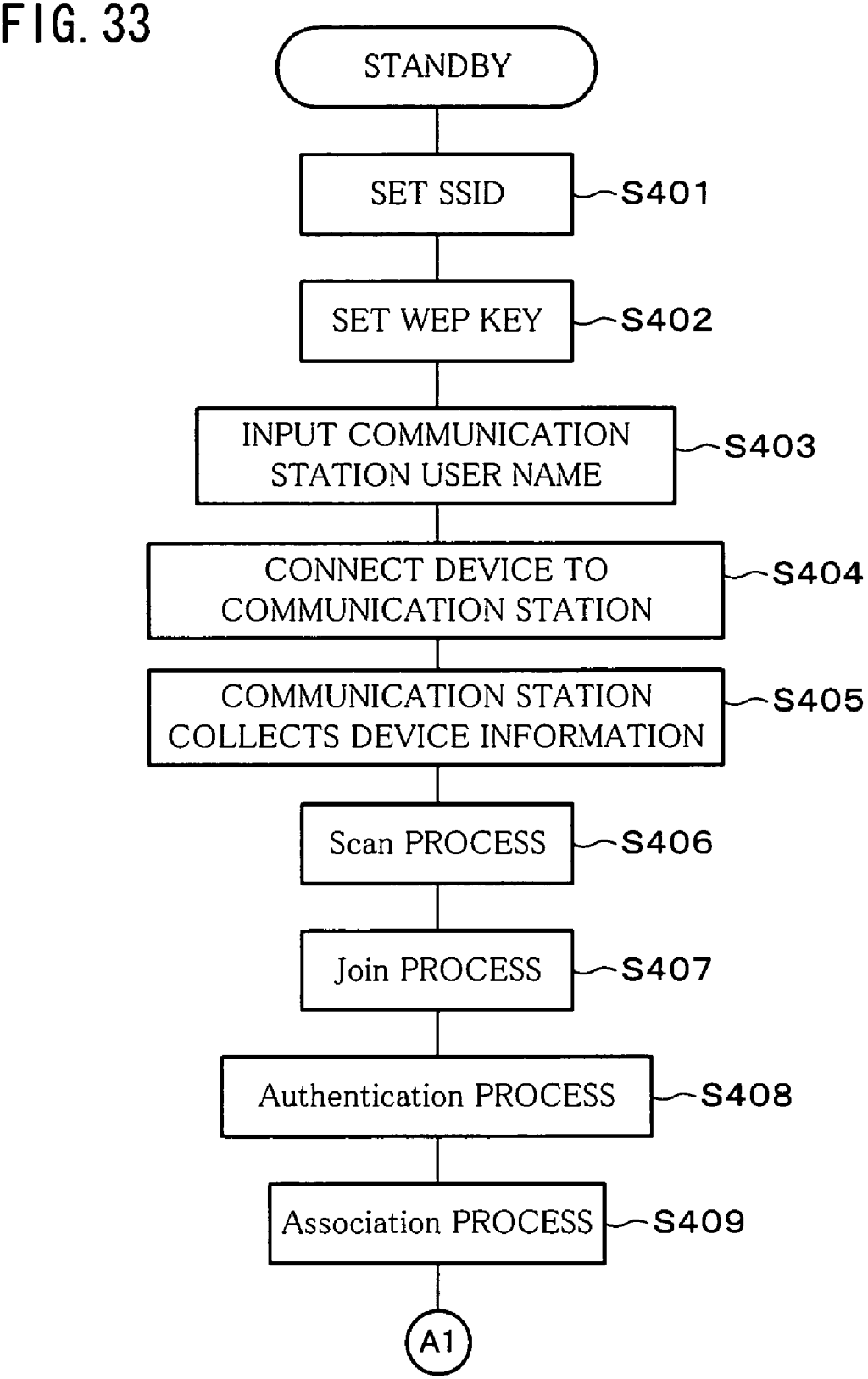
FIG. 33 is a flowchart showing respective procedures of FIG. 31 that are carried out in the video signal sending side communication station.

On the video receiving side, a process is performed in accordance with a procedure shown by a flowchart of FIG. 32. On the video sending side, a process is performed in accordance with a procedure shown by a flowchart of FIG. 33. Note that, in the following description, when both the sending station 2 and the receiving station 3 are commonly mentioned, a reference sign is not given, and they are referred to merely as "communication station".

Before using the system, the user sets various kinds of network parameters in establishing a network and security. In the present embodiment, the foregoing processes are described taking IEEE802.11 as an example.

There is a case where it is necessary to input a network name in order that the user specifies a device group for identifying the communication stations connected to the radio network NW. In IEEE802.11 for example, it is necessary to set the network names each of which is referred to as SSID to the same values as to the communication stations required to be connected to the same radio network NW. In the present embodiment, the SSID is set in accordance with the following method (S301, S401).

First, the SSID value which never fails to vary in different products is stored in the connection information storage section 1302 of the communication station controller 13 in manufacturing a product. In case of setting SSID in the communication station A (see FIG. 1) which is the receiving station 3, the user performs an operation for setting SSID by means of the user input section 1303 of the communication station controller 13 at such a position that it is possible to perform a communication between the control signal receiving section 363 of the communication station A and the control signal output section 1301 of the communication station controller 13. The operation is such that the user pushes an SSID setting button (not shown) provided on the user input section 1303 for example. The controller control section 1304 which has detected the SSID setting operation performed by the user with the user input section 1303 reads SSID, stored in manufacturing the product, by means of the connection information storage section 1302, and converts the read value into a control signal, and causes the control signal output section to output the control signal.

An infrared ray signal that has been outputted from the control signal output section 1301 is received by the control signal receiving section 363 of the communication station A, and is notified to the communication station control section 33. The communication station control section 33 detects the SSID value from the signal, and stores the SSID value in the local station information storage section 371.

In case where the same value as the value that has been set in the communication station A is set as SSID of the communication station C, the user performs an operation for setting SSID by means of the user input section 1303 of the communication station controller 13 at such a position that it is possible to perform a communication between the control signal receiving section 2001 of the communication station C and the control signal output section 1301 of the communication station controller 13. In the communication station C, SSID is stored in the local station information storage section 291 in the same manner as in the communication station A.

Thereafter, a network is established between the communication station A and the communication station C in accordance with a method determined on the basis of IEEE802.11. A process for establishing the network is not detailed here, but it is defined that communication stations which are different from each other in terms of SSID are prevented from communicating with each other. At this time, the communication station A obtains SSID from the local station information storage section 371, and the communication station C obtains SSID from the local station information storage section 291, so that the communication station A and the communication station C have the same SSID in performing the process for establishing the network, thereby connecting the communication station A and the communication station C to the same network.

In case of establishing another network at the same time, when the user performs the aforementioned process for setting SSID by using another controller, SSID stored in the connection information storage section 1302 of each controller varies in different products, so that another SSID is set. Thus, this arrangement prevents such disadvantage that: a plurality of networks use the same SSID, so that cross talk occurs in communications.

Further, the foregoing example describes a process for establishing a network between two communication stations.

However, by performing the operation for setting SSID with respect to all the communication stations required to be connected to the same network with the same controller, it is possible to connect all the communication stations to the same network. In this case, as long as SSID is set with respect to all the communication stations by using the same controller, SSID may be set with respect to any communication station by using any controller.

In case of encoding data before sending the data for fear of eavesdropping in receiving the data via a network, a key used to encode the data must be common between the sending station 2 and the receiving station 3. For example, IEEE802.11 uses a WEP (Wired Equivalent Privacy) encoding method. In this encoding method, the sending station 2 encodes data by referring to a predetermined value as a key, so as to send the data. The receiving station 3 decodes the data by referring to a predetermined value as a key. When the data encoded by using a certain key is decoded by using the same key, original data can be restored. However, when the encoded data is decoded by using a different key, original data cannot be restored. Thus, when data is encoded by using a common key between the sending station 2 and the receiving station 3, the data is not eavesdropped by a third parson.

In this case, the present embodiment uses the following method similar to the aforementioned SSID setting method in order to use a common key between the sending station 2 and the receiving station 3.

First, a WEP key value which never fails to vary in different products is set and stored in the connection information storage section 1302 of the communication station controller 13 in manufacturing products. In case of setting the WEP key in the communication station A, the user performs an operation for setting the WEP key by means of the user input section 1303 of the communication station controller 13 at such a position that it is possible to perform a communication between the control signal receiving section 363 of the communication station A and the control signal output section 1301 of the communication station controller 13. The operation is such that the user pushes a WEP key button (not shown) provided on the user input section 1303 for example. Upon detecting the operation for setting the WEP key that has been performed by the user with the under input section 1303, the controller control section 1304 reads the WEP key, stored in shipping the products, from the connection information storage section 1302, and converts the read value into an infrared ray signal, and causes the control signal output section 1301 to output the signal.

The infrared ray signal is received by the control signal receiving section 363 of the communication station A, and the received signal is converted into a control signal by means of the control signal conversion section 364, and is notified to the communication station control section 33. The communication station control section 33 detects the WEP key value from the signal, and stores the WEP key value in the local station information storage section 371 (S301).

In case where the same value as a value that has been set in the communication station A is set as the WEP key of the communication station C, the user performs an operation for setting the WEP key by means of the user input section 1303 of the communication station controller 13 at such a position that it is possible to perform a communication between the control signal receiving section 2001 of the communication station C and the control signal output section 1301 of the communication station controller 13. In the communication station C, the WEP key is stored in the local station information storage section 291 in the same manner as in the communication station A (S401). Thereafter, in case where it is necessary to encode data in sending the data from the communication station C to the communication station A for example, when the data is sent after encoding the data by using the WEP key that the communication station C has obtained from the local station information storage section 291, the communication station A can restore the data by decoding the data by using the WEP key obtained from the local station information storage section 371.

Under this condition, other communication station which has not set the WEP key by means of the communication station controller 13 cannot restore the data, it is possible to perform a communication between the communication stations C and A with the security kept.

In case of encoding data by using the WEP key at the same time, the WEP key stored in the connection information storage section 1302 of each controller varies in different products. Thus, the user performs the operation for setting the WEP key by using another controller, so that another WEP key is set. As a result, also in case where a plurality of combinations of the sending station 2 and the receiving station 3 are connected to the network, it is possible to perform communications with the security kept.

Further, the present embodiment describes the process in using a common WEP key between two communication stations. However, it may be so arranged that: the operation for setting the WEP key is performed by means of the same controller with respect to all the communication stations required to share the same WEP key, so that the WEP key is shared by all the communication stations. In this case, as long as the WEP key is set by means of the same controller with respect to all the communication stations, a controller of any communication station may be used to set SSID.

The present embodiment describes the example where setting of SSID and setting of the WEP key are performed separately from each other. However, it may be so arranged that: the user carries out the setting of SSID and the setting of the WEP key by performing a single button operation as long as SSID and the WEP key are sequentially sent by using a single button provided on the user input section 1303 of the communication station controller 13 as a trigger. In the system using IEEE802.11 as a network, all the items that should be set are as described above. However, in a system using other network, in case where it is necessary to set a parameter for establishing a network and security, the parameter is set in advance here.

The user inputs a communication station user name in order to specify a communication station that is to be connected or in order to make it easier to identify a communication station connected to his or her communication station (S303, S403). The communication station user name is a value or a character sequence having no meaning, and is a communication station nickname or the like, such as "communication station for 2nd floor child's room", which is a user-friendly name. For example, in case of inputting a communication station user name of the communication station A, the user performs character sequence input operations by using the user input sections 1303 and 1403 of the communication controllers 13 and 14. This operation is converted into control signals in the control signal output sections 1304 and 1403, and are outputted. When the control signal receiving sections 363 and 2001 of the communication stations A and C receive the signals, the communication station control sections 33 and 23 analyze the received signals, and convert the analyzed signals into the communication station user names of character sequences or the like, and store the communication station names in the local station information storage sections 371 and 291.

Note that, it is preferable to register the communication station user name in starting up the communication station for the first time, but the registration may performed at other timing. Further, in case where the communication station user name is not registered, a value of a default set in manufacturing a product is used to perform a communication.

Next, the user connects the communication station A to the display device 11, the controller 12, and the communication station controller 13 (S304).

In the present embodiment, as to the receiving side, a condition under which a video signal can be transmitted from the video signal output section 362 of the communication station A to the video signal input section 111 of the display device 11 is completion of connection between the communication station A and the display device 11. The connection is based on a wired connection in the present embodiment, but the connection may be based on a wireless connection. Further, in the present embodiment, the controller 12 and the communication station controller 13 are described as remote controllers using infrared ray signals, so that it is not particularly necessary to perform (i) connection between the control signal output section 1301 of the controller 12 and the control signal receiving section 363 of the communication station A and (ii) connection between the control signal output section 1301 of the communication station controller 13 and the control signal receiving section 363.

However, in case where it is necessary to perform any connection process between the controller and the communication station, the connection process is performed here. In case where the controller is connected to the communication station via a wired communication for example, the connection process is performed by connecting the controller to the communication station via a cable.

Further, the user connects the receiving station 3 to a device. In the present embodiment, the communication station C and the devices D to F are connected to each other (S404). A condition under which a video signal can be transmitted from the video signal output section 1101 of the device D to the video signal receiving section 261 of the communication station C and a control signal can be transmitted from the control signal sending section 264 of the communication station C to the control signal input section 1104 of the device D is completion of connection between the communication station C and the device D. Connection of the communication station C and the device E and connection of the communication station C and the device F are performed in the same manner. An order of the connection processes performed with respect to the devices D to F on the side of the communication station C is arbitrarily set, and an order of the connection processes performed with respect to the devices (the controller 12 and the communication station controller 13) on the side of the communication station A is arbitrarily set.

In the communication station C, information of devices connected to the communication station C are collected and stored in order to respond to any subsequent inquiry from other communication station (S405). In the present embodiment, information of the devices are managed for each video signal input section 261, and the information is referred to as plug information. The plug information is such that an entry is prepared so as to correspond to the video signal input section 261 installed in each communication station, and information of a device connected to the video signal input section 261 is referred to such as plug information "1". Further, a number of the video signal input section 261 and a number of the plug information are referred to as plug IDs. Examples of contents of the plug information include a device user name described later, a device type of a connected device, a method for encoding a video inputted from the device, a bit rate, information indicative of whether the device is transmitting a video to any communication station or not, and the like. Further, in case where the device is not connected to the video signal input section 261, the plug information is blank.

The device user name included in the plug information is neither a value nor a character sequence having no meaning, but is a user-friendly term, such as "VTR made by S company" which indicates a device. For example, in case of inputting the device user name of the device D connected to the communication station C, the user performs a character sequence input operation by using the user input section 1403 of the communication station controller 14. The operation is converted into a control signal in the controller control section 1402, and the converted control signal is outputted from the control signal output section 1401. When the control signal receiving section 2001 receives the control signal, the communication station control section 23 analyzes the received control signal, and converts the analyzed control signal into the device user name such as a character sequence, and stores the device user name in the local station information storage section 291 as the plug information.

Note that, in starting up the communication station for the first time, it is preferable to register the device user name after connecting the device to the communication station, but the registration may be performed at other timing. Further, in case where the device user name is not registered, a value of a default that was set in manufacturing a product is used to perform a communication. As the default value, a number corresponding to each video signal input section, for example "input 1", may be inputted.

The device type included in the plug information is information constituted of a value or a character sequence by which the user identifies a type of the device. The information may be specified with the character sequence such as "VTR", or may be a numerical value uniquely determined throughout the communication stations (for example, a value 1 means "VTR" or in a similar manner). The information is inputted by using the communication station controller 14 basically in the same manner as in the device user name, but may be automatically obtained by the communication station C.

In the present embodiment, a video inputted from the device is an analog signal, the analog signal is converted into a digital signal by the video encode section 262. Thus, the encoding method and the bit rate that are included in the plug information are determined in accordance with performance of the video encode section 262. When the communication station control section 23 of the communication station C determines that it is necessary to store the plug information, the communication station control section 23 orders the video encode section 262 to notify (i) the encoding method in encoding the inputted video signal into a digital signal and (ii) the bit rate value, and stores the notified information is stored in the local station information storage section 291 as the plug information.

Next, the following description explains (2) Scan, Join, Authentication Association process in FIG. 31.

After completing the initial setting, each communication station performs an operation for establishing a network at an arbitrary timing. As a trigger for commencing a process of establishing a network, any operation performed by the user may be regarded as the trigger, or the process may be automatically commenced in accordance with judgment of each communication station. In the present embodiment, the description is given in terms of the network establishment process using IEEE802.11. Further, a network path may be formed by using a wireless communication or may be formed by using a wired communication. Further, a communication protocol may be a protocol other than IEEE802.11.

A communication station which tries to make connection with a network performs a process referred to as "scan" in order to find a network which exists around the communication station (S305, S406). When the "scan" is performed, information such as SSID is sent back from an Access Point (hereinafter, referred to as "AP"), which is a representative terminal in each network, as to all the networks existing around the communication station.

Then, it is possible to perform a process referred to as "join" with respect to only a network which satisfies conditions such as "having the same SSID as SSID set in the communication station" (S306, S307). The "join" is a process for asking the AP to allow the communication station to enter into the network.

When the communication station is allowed to enter into the network, this condition is sent back from the AP to the communication station, so that it is possible to perform a process referred to as "Authentication" (S307, S408). Here, in case of transmitting data after the AP encoded the data in accordance with WEP, whether or not a WEP key of the AP and a WEP key of a communication station that is to be connected to the network are identical to each other is confirmed. Here, in case where both the WEP keys are different from each other, the communication station cannot be connected to the network basically. Thus, it is necessary to make the WEP key of the AP and the WEP key of the communication station that is to be connected identical to each other in accordance with the foregoing method.

Lastly, a process referred to as Association is performed in order to register information of the communication station itself with respect to the AP (S308, S409). At a time of completion of the process, the communication station can send and receive data in the network.

Figure 35:
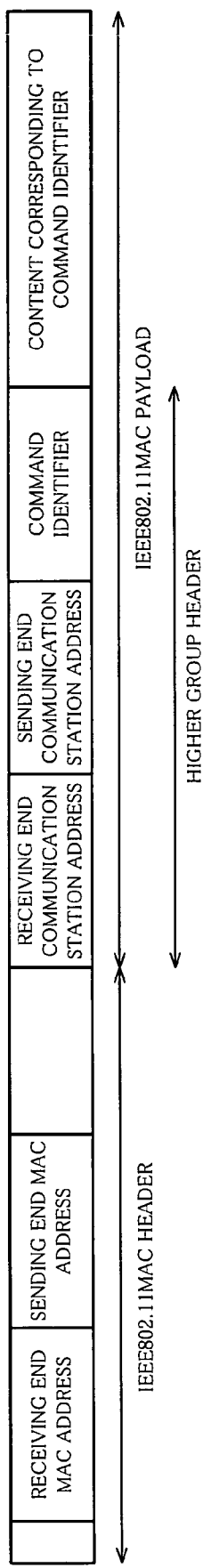
FIG. 35 shows an arrangement of a packet used in case where the video signal receiving side communication station of the AV system of Embodiment 5 obtains information of the video signal sending side communication station.

Subsequently, in performing a communication between communication stations, two addresses, i.e., a MAC address and a communication station address are used. The MC address is a communication station address used in a Medium Access Control group in an OSI reference model, and is used to define a sending end and a receiving end of radio data in the radio section 21 and the radio section 31. The MAC address is given to each product in manufacturing the product, and has to be an only one address all over the world. The communication station address is an address which is defined in a group whose level is higher than the MAC group, and is an address which is defined so as to identify each communication station without being aware of any difference between plural MAC groups in such a network that data transmission is performed through the plural MAC groups (for example, in such a network that: IEEE802.11 is used as a wireless connection MAC group, and Ethernet (registered trademark) is used as a MAC group protocol in a wired connection part for connecting the wireless connection part to an external network). In the present embodiment, such addresses are used to define a sending end and a receiving end of a command in the communication station control section 23 and the communication station control section 33. FIG. 35 shows an example of a packet including the MAC address and the communication station address.

Next, (3) the device information collection process in FIG. 31 is described as follows.

Figure 34:
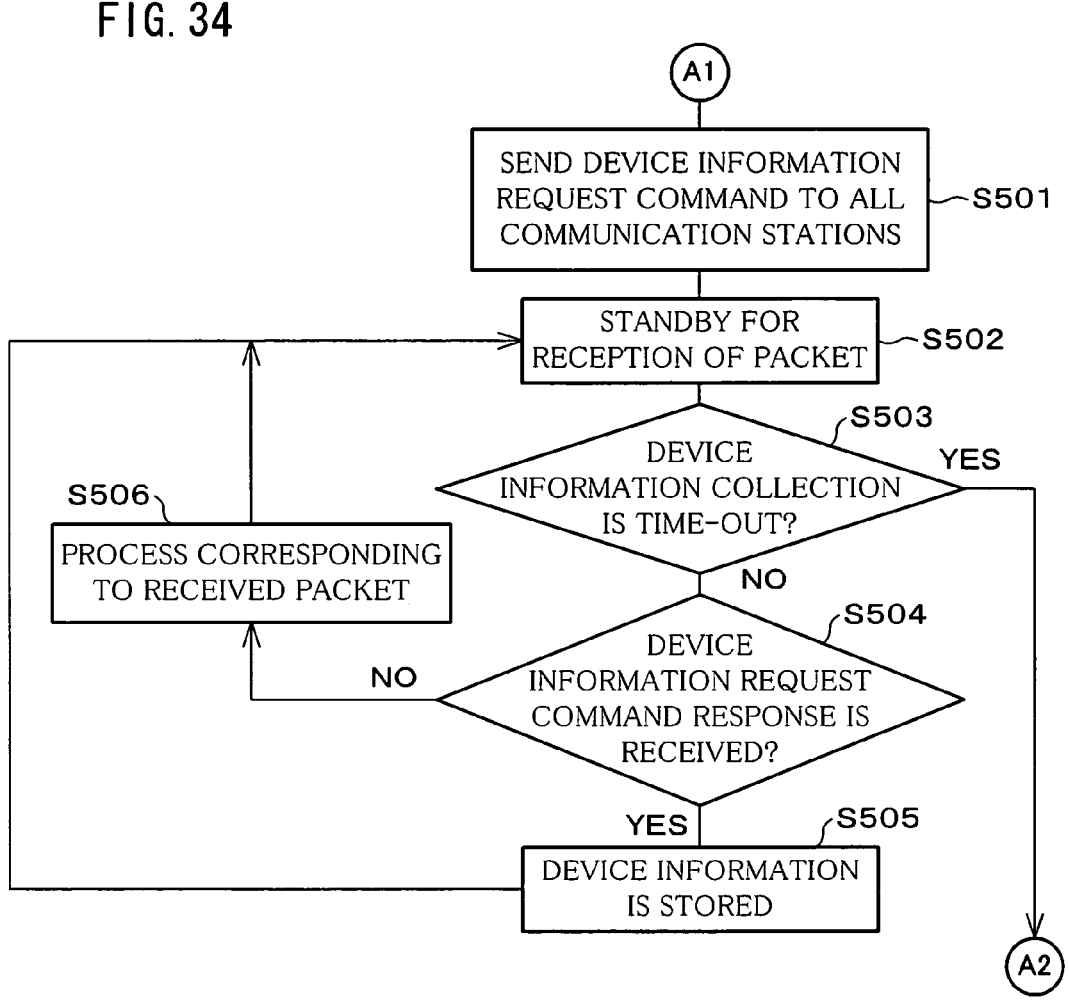
FIG. 34 is a flowchart showing a procedure of a device information collection process of FIG. 31.

The device information collection process is performed in accordance with a procedure of a flowchart shown in FIG. 34.

In order to specify a device for receiving a video, each communication station collects information of (i) all the communication stations existing in the network and (ii) devices connected to the communication stations. A basic procedure is such that: a communication station which requires information sends device information request commands to all the communication stations, and communication stations which have received the device information request commands send back information thereof.

The following description explains a process at a time when the communication station A on the receiving side of a video obtains information of the communication station C.

First, the communication station control section 33 orders the packet conversion section 32 to generate a packet shown in FIG. 35. The packet conversion section 32 incorporates an identifier indicative of the device information request command and a communication station address of the communication station itself, that has been obtained from the local information storage section 371, into the foregoing packet. Further, as a receiving end address of the packet, each of the MAC address and the communication station address specifies addresses corresponding to all the communication stations. A packet generated by the packet conversion section 32 is sent via the radio section 31 (S501).

In the radio section 21 of the communication station C, a packet is received under such condition that the radio section is ready to receive the packet. When the packet conversion section 22 recognizes that the packet has been sent from the receiving end MAC address to the communication station C, the packet conversion section 22 obtains an identifier of the device information request command, the receiving end communication station address, and the sending end communication station address, that are included in the packet, and notifies them to the communication station control section 23. When the communication station control section 23 recognizes that the command has been sent to the communication station C in accordance with the identifier of the device information request command and the receiving end communication station address, the communication station control section 23 orders the packet conversion section 22 to generate a packet including an identifier indicative of the device information request command and information obtained from the local station information storage section 291. Then, the packet generated by the packet conversion section 22 is sent from the radio section 21. At this time, examples of the information included in the packet include: a local station MAC address and a local station communication station address; a communication station user name; all plug information of the communication station itself (except for plug of a device which is not connected to the video signal input section 261); information indicative of whether the communication station itself is HC (described later) in IEEE802.11 or not; and the like.

When a packet is received in the radio section 31 of the communication station A under such condition that the radio section 31 is standby for receiving the packet (S501), the packet conversion section 32 recognizes that the packet has been sent to the communication station A in accordance with a receiving end MAC address. Further, the packet conversion section 32 obtains all the other information of a counterpart station, and notifies the information to the communication station control section 33. When the communication station control section 33 recognizes that the command has been sent to the communication station A in accordance with an identifier of a device information request command response and a receiving end communication station address (S504), and stores the command in the remote station information storage section 372 as a table in which all the information of the counterpart station that has been notified by the packet conversion section 32 and a communication station address of the counterpart station are related to each other (S505). While, in case where the identifier of the device information request command response and the receiving end communication address are not recognized, a process according to the received packet is performed (S506), and the step returns to the step S502.

The device information request command is sent to all the communication stations in the network, so that a response to the device information request command is performed by all the communication stations in the network as in the communication station C. Thus, the communication station A can obtain information of all the communication stations in the network and information of devices connected to the communication stations. At this time, the communication station control section 33 of the communication station A cannot recognize whether or not the responses to the device information request command have been received from all the terminals in the network. Thus, after a certain time has passed, collection of the device information is regarded as being completed, and responses to the device information request command that are received thereafter are ignored (S503).

Note that, the process performed on the video receiving side is described here, but it is also possible to obtain information of other communication station and other device by performing the same process on the video sending side.

Next, (4) the video sending commencement process in FIG. 31 is described as follows.

Figure 36:
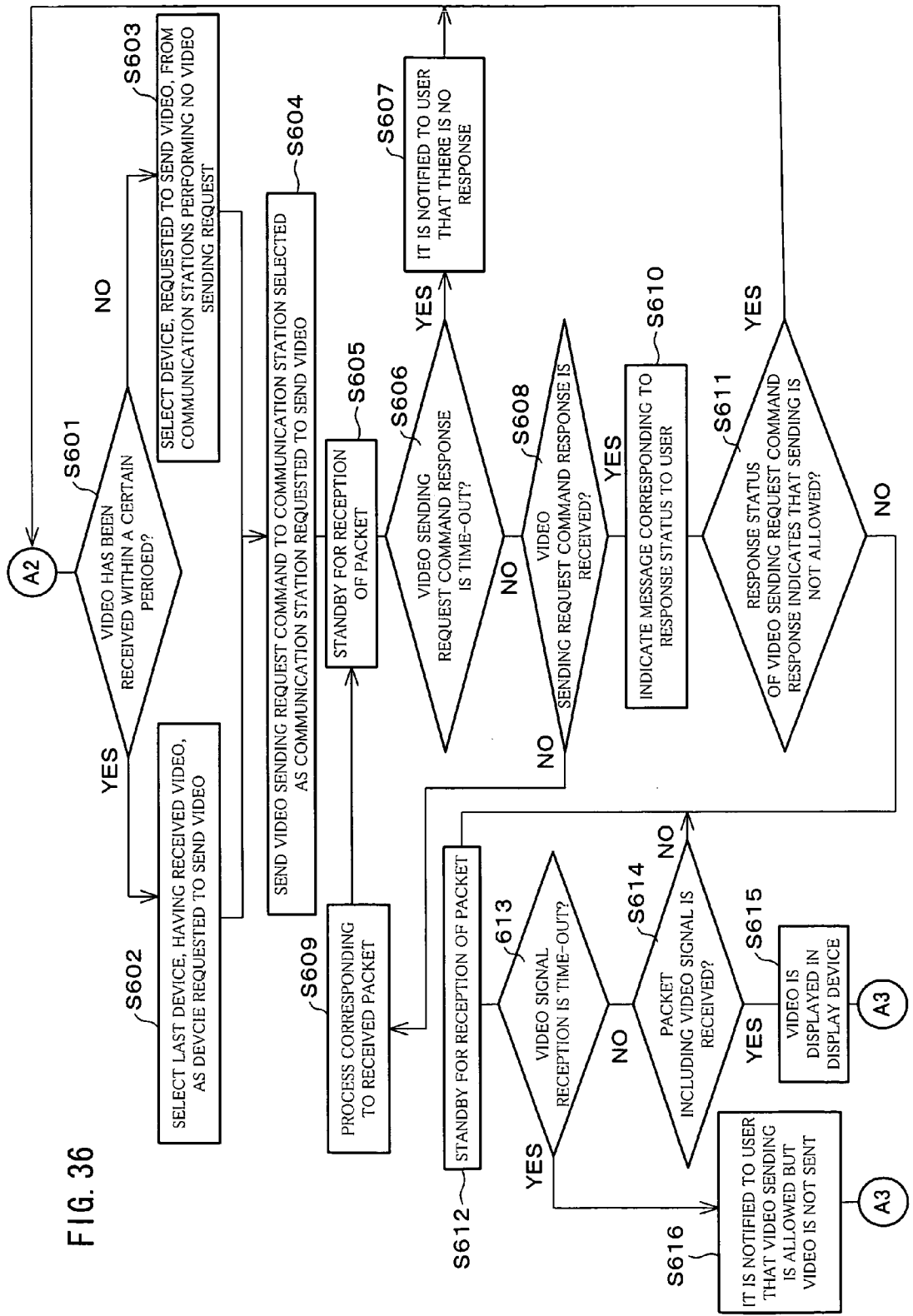
FIG. 36 is a flowchart showing a procedure in which a video signal sending commencement process is carried out in the video signal receiving side communication station of the AV system of Embodiment 5.
Figure 37:
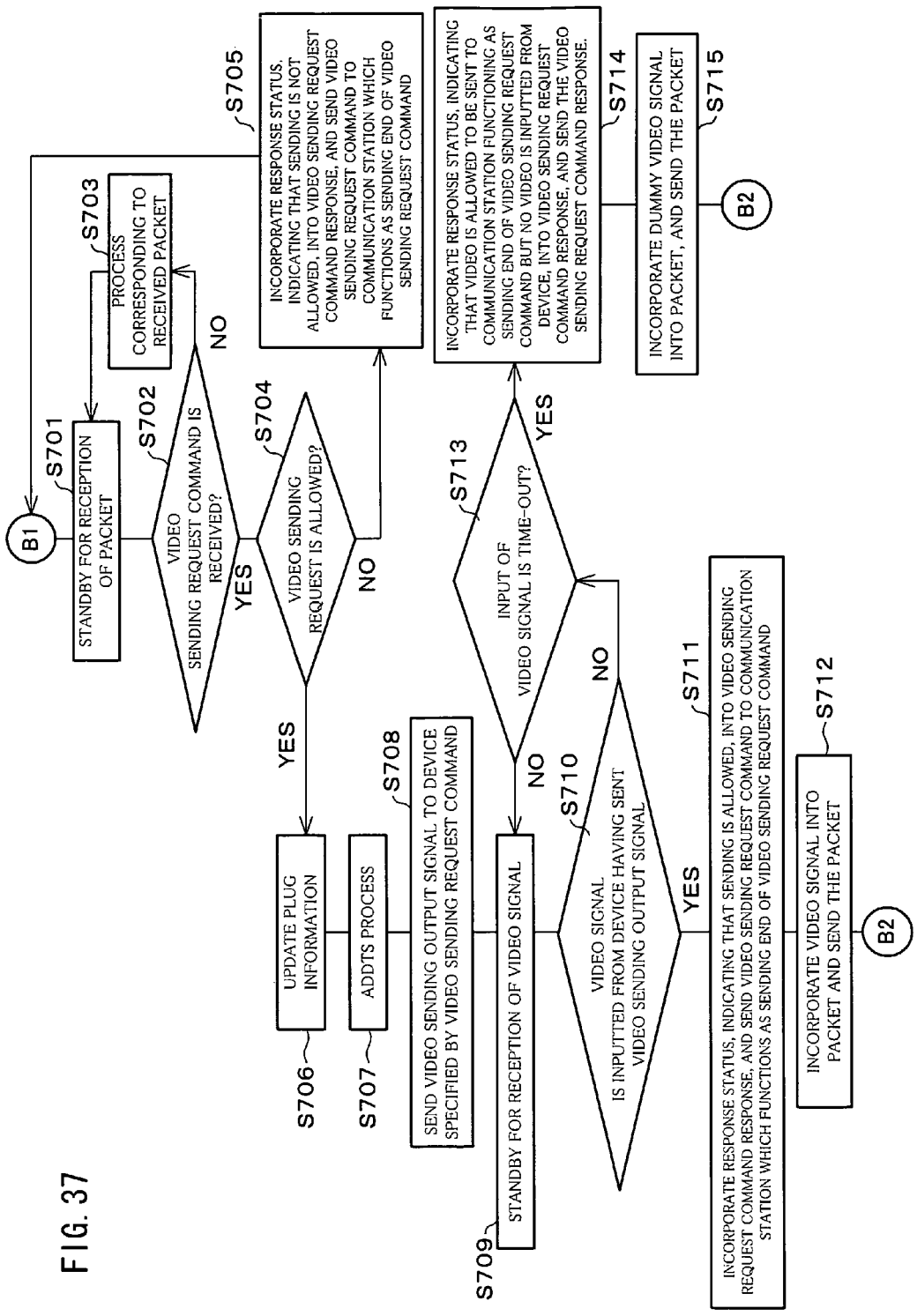
FIG. 37 is a flowchart showing a procedure in which the video signal sending commencement process is carried out in the video signal sending side communication station.

As to the video sending commencement process, the video receiving side performs operations in accordance with a procedure of a flowchart shown in FIG. 36, and the video sending side performs operations in accordance with a procedure of a flowchart shown in FIG. 37.

When information of all the communication stations and devices in the network is obtained, a communication station automatically determines a combination of a communication station and a device each of which functions as a receiving end of a video. A basic procedure thereof is as follows. The communication station A confirms whether the communication station A itself has received a video from any communication station or not (S601). In case where the communication station A has received videos from any communication stations, the communication station A asks a communication station, with which the communication station A had last connection, to send a video (S602). While, in case where the communication station A has received no video from any communication station, the communication station A determines a counterpart communication station, from which a video is to be newly received, in accordance with a specific rule (S603).

The following description specifically explains a case where the communication station A on the video receiving side asks the communication station C to send the video. In case where the communication station A has received a video from any communication station, the local station information storage section 371 stores a counterpart communication station address that has been lastly received, a MAC address, a communication station user name, a plug ID, plug information, and the like, as video receiving counter part communication station information. In case where a video has not been received from any communication station, or in case where a communication station from which a video has been received disappears from the network, or in case where a certain time has passed since a video had been received, or in similar case, the video-receiving counterpart communication station information disappears. Further, in case where the plug information indicates that a device cannot be used, the device is not selected.

The communication station control section 33 of the communication station A confirms whether the video-receiving counterpart communication station information is stored in the local station information storage section 371 or not. In case where the information is stored, the following process is omitted, and the communication station control section 33 asks a counterpart, defined by a communication station address, a MAC address, and a plug ID that are stored therein, to send the video (S604). In case where the video-receiving counterpart communication station information is not stored, the combination previously stored in the remote station information storage section 372, i.e., the combination of a counterpart communication station and a device, from which a video is to be newly received in accordance with all the communication station information that had been obtained, is selected, and sending of the image is requested (S604).

Examples of the selection method includes: a method in which a communication station whose MAC address is a minimum value in terms of a numerical value is selected and a device defined by a smallest plug ID in the communication station is selected; and the like. Further, it can be so arranged that: at this time, whether the communication station itself can decode the sent video or not is determined in accordance with information such as the encoding system and the bit rate that are indicated by the plug information, and a video determined as not being decodable is not selected.

Note that, the example where the communication station A on the video receiving side requests the communication station C on the video sending side to establish a communication is described above. However, it may be so arranged that: adversely, the communication station C on the video sending side requests establishment of the communication. The example where any combination of a communication station and a device is automatically selected even when the user does not demonstratively specify the combination is described above. However, it can be so arranged that: any combination of a communication station and a device is not selected until the user selects the combination.

When a counterpart for receiving a video is determined, sending of the video is requested. In accordance with the aforementioned method, the communication station A determines the communication station C as a counterpart for receiving the video. Specific example of a process in which the communication station A requests the communication station C to send the video is described as follows.

The communication station control section 33 of the communication station A orders the packet conversion section 32 to generate a packet. At this time, the packet is made to include an identifier indicating that the packet is a video sending request command, a communication station address of the communication station itself, a plug ID connected to a device selected as a counterpart for receiving the video, and a communication address of a communication station connected to the device. Further, as a MAC address of a receiving end of the packet, a MAC address of a previously selected communication station is obtained from the remote station information storage section 372, and is appointed. The generated packet is outputted from the radio section 31.

In the communication station C, when the packet is received (S702) under such condition that the radio section 21 is standby for receiving the packet (S701) and the packet conversion section 22 recognizes that the packet has been sent from the receiving end MAC address to the communication station C, the communication station C obtains a video sending request command identifier, a receiving end communication station address, a plug ID corresponding to a device required to send a video, and a sending end communication station address, and the like, all of which are included in the packet (S702), and notifies them to the communication station control section 23. When the communication station control section 23 recognizes that the packet has been sent to the communication station C and recognizes meaning of the command in accordance with the video sending request command identifier and the receiving end communication station address, the communication station control section 23 determines whether or not to allow a video to be sent from a device specified by the plug ID to a sending request source (S704). Examples of a determination reference are as follows: whether the device is being used or not; whether the device is turned ON or not; whether a video signal is inputted from the device or not; and the like. The determination is made in accordance with any one of these determination references.

At this time, if necessary, the plug information of a device allowed to send a video is updated. Examples of the information which has to be updated includes: information indicative of whether the device is being used or not; a communication station address and a MAC address of a communication station to which a video of the device is sent; and the like.

Further, in case where the device is not allowed to send a video as a result of the determination, the communication station control section 23 generates a similar packet, responding to the video sending request command, which includes information indicative of a reason for which the device is not allowed to send the video, and sends the packet from the radio section 21 (S705), and the step returns to the step S701. In the present embodiment, as to the information indicative of reason for which the device is not allowed to send the video, its value and meaning thereof are defined in advance in all the communication stations (for example, a value 1 is made to have such meaning that "since the specified device is being used, the device is not allowed to send the image"). Further, a value within the range means that the device is allowed to send the video. Further, such value is referred to as a response status.

In case where another user is on the side of the communication station C and the user is using the device D and the user wants other user not to be allowed to send a video from the device D, it may be so arranged that: the user on the video sending side performs an operation with the user input section 1403 of the communication station controller 14 which serves as a controller of the communication station C, so as to specify the foregoing condition. The operation is an operation such as "a non-sending mode button of the device D (VTR 1) is pushed". The controller control section 1402 which has detected an input from the user input section 1403 generates a non-sending mode setting signal, and the control signal output section 1401 outputs the non-sending mode setting signal. When the control signal receiving section 2001 of the communication station C receives the signal, the communication station control section 23 detects that the signal is the non-sending mode setting signal, and updates plug information, corresponding to a specified device, which is selected from sets of plug information stored in the local station information storage section 291 (S706). Thereafter, when the request for video sending is transmitted from other communication station, whether or not to allow a video to be sent in accordance with the updated plug information, so that the request for video sending with respect to the device specified by the user on the video sending side is refused.

The communication station on the video sending side commences sending of a video at an arbitrary timing thereafter.

The following description explains a procedure performed before the communication station C commences sending of a video from the device D to the communication station A in the present embodiment.

The present embodiment uses a communication range assurance system, based on IEEE802.11, by which transmission is performed at a predetermined bit rate while preventing other communication station from butting in the transmission in a radio path when transmitting a video. In the range assurance based on IEEE802.11, a packet of data is referred to as a stream. For each stream, the sending station 2 or the receiving station 3 of the stream registers a bit rate etc., required in the transmission, into a communication station, referred to as HC (Hybrid Coordinator), which performs the range management. The HC considers conditions of all the streams. Thereafter, the HC gives a sending right to each communication station, so that each communication station can perform a communication only in a period in which the communication station has the sending right. The HC manages the sending rights so as to correspond to conditions of the streams, thereby assuring the communication ranges given to the respective streams.

The communication station control section 23 of the communication station C on the video sending side considers conditions of the device D and the communication station C itself. When the communication station control section 23 judges that it is possible to commence sending of a video, the communication station control section 23 orders the packet conversion section 22 to generate an ADDTS-request packet. Although contents of the signal is not detailed here, the signal is based on a draft of IEEE802.11e. It is necessary that the signal includes (i) a MAC address of the sending station 2 and the receiving station 3 of the stream and (ii) information such as a bit rate etc. (referred to as stream information) required in sending a data sequence which is to be transmitted as a stream.

As a sending station address of the stream, a MAC address thereof that has been obtained from the local station information storage section 29 is specified. As a receiving station address of the stream, a MAC address of a communication station receiving videos that has been stored in the local station information storage section 292 as plug information is specified. Further, information such as a bit rate etc., stored as the plug information, that has been notified by the video encode section 262, is specified as stream information. Insufficient information at this time is complemented by proper values. Further, it is necessary that a sending address of the ADDTS-request packet is the HC. Any one of communication stations in the network is the HC, and which communication station is the HC has been confirmed in collecting the aforementioned communication station information, and a MAC address of the HC that has been obtained at the time is specified. The generated ADDTS-request packet is sent via the radio section 21. In the present embodiment, the sending station 2 registers the stream information for assuring the communication range into the HC, but the receiving station 3 may register the stream information.

When a communication station which functions as the HC receives the ADDTS-request packet, the packet is exchanged between the sending station 2 and the receiving station 3 of the stream and the HC several times, so that preparation for the range assurance is made. This operation is based on a draft of IEEE802.11e, and description thereof is omitted here.

After making the preparation for transmission of the stream among the sending station 2, the receiving station 3, and the HC, the sending station 2 of the stream triggers, so that the HC commences addition of the sending right to a stream sending station. The communication station control section 23 of the communication station C completes the ADDTS process (S707). When it is detected that preparation for transmission of the stream has been made, the communication station control section 23 orders the control signal conversion section 263 to output a video output commencement signal to the device D (S708).

At this time, in order to output the video output commencement signal to the device D, it is necessary that the communication station C stores the video output commencement signal of the device D in advance. In the present embodiment, the signal is stored as follows.

The user brings both (i) the communication controller 14 of the communication station C and (ii) the controller 12 for controlling the device D to such a position that control signal output sections 1401 and 1201 of the respective controllers can input control signals to the control signal receiving section 201 of the communication station C. Under the condition, at first, the user performs operations for (a) commencing storage of the video output commencement signal and (b) specifying a plug ID corresponding to a device targeted in storing the video output commencement signal, by using the user input section 1403 of the communication station controller 14. The operations are such that: for example, a "remote control learning button" is pushed, and an "input 1 button" is pushed. These functions may be incorporated in a single button. When detecting the operations in the user input section 1403, the controller control section 1402 causes the control signal output section 1401 to output a control signal storage commencement signal and a plug ID specifying signal.

When the control signal receiving section 2001 of the communication station C detects that these signals have been received, the communication station control section 23 enters into a video output commencement signal storage mode. At this time, it may be notified to the user that the communication station control section 23 has entered into the video output commencement signal storage mode. The notification may be performed as follows: for example, an LED provided on the communication station C (the LED may be provided on the aforementioned display section 28 (see FIG. 27) is lighted.

Next, the user performs an operation for commencing the video output of the device D by using the user input section 1202 of the controller 12. The operation is such that: when the device D is a VTR for example, a power button 12*a* or a reproduction button of an operation button group 12*f* is pushed. After detecting the operation in the user input section 1202, the controller control section 1203 causes the control signal output section 1202 to output the video output commencement signal.

When detecting that the video output commencement signal has been inputted during the video output commencement signal storage mode, the control signal receiving section 2001 of the communication station C performs a process in which the communication station control section 23 converts the signal into a signal which can be stored in the local station information storage section 291 (for example, when the control signal is an infrared ray signal, the control signal is sampled so as to convert the signal into a digital signal, or a similar process), and the control signal receiving section 2001 notifies the video output commencement signal to the communication station control section 23.

The communication station control section 23 stores the video output commencement signal, notified by the control signal receiving section 2001, in the local station information storage section 291 as plug information corresponding to a plug ID that has been specified by the communication station controller 14.

When the storage of the video output commencement signal is completed, the user uses the controller 14 again so as to notifies the communication station C that the storage of the video output commencement signal is completed. The communication station control section 23 ends the video output commencement signal storage mode upon receiving the signal, thereby ending the storage of the control signal that has been performed by means of the controller 12.

In case where it is necessary to output the video output commencement signal to the device D thereafter, the communication station control section 23 causes the local station information storage section 291 to retrieve plug information of the device D from the plug ID, and to extract the video output commencement signal from the plug ID, so as to output the signal to the control signal sending section 264.

Such operation is performed with respect to all the devices connected to the communication station C, so that the communication station C can output the video output commencement signal to all the devices.

Note that, in case where an irrelative packet is received during the video output commencement signal storage mode, the packet may be ignored.

When the video output commencement signal from the communication station C is received by the control signal input section 1104 of the device D, the device control section 1103 analyzes the control signal and then recognizes that the control signal is the video output commencement signal, and orders the video generating section 1102 to generate a video. The video generating section 1102 accordingly generates the video, and sends a video signal to the video signal input section 261 of the communication station C via the video signal output section 1101.

In the communication station C, the communication station control section 23 is standby for input of the video signal till then (S709). Upon detecting that the video signal from the device D has been inputted to the video signal input section 261, the communication station control section 23 judges that the video signal input section 261 succeeded in receiving the video signal from the device D which has sent the video output commencement signal (S710). At this time, the video encode section 262 encodes the inputted video signal, and the encoded video signal is stored in the video encode section 262 until transmission of the signal as a packet is completed (in case of resending the video, the video is stored until the resending is completed). The video may be stored in the communication station control section 23.

In case where the video signal is not inputted to the video signal input section 261 of the communication station C even though a certain time has passed (timeout) after outputting the video output commencement signal from the control signal sending section 264 (S710), the communication station control section 23 judges that the video signal input section 261 fails to receive the video signal (S713), and becomes standby for input of the video signal again (S709).

When the video signal input section 261 succeeds in receiving the video signal, the communication station control section 23 orders the packet conversion section 22 to generate a packet including an identifier indicating that the identifier is a video sending request command response. At this time, not only a local communication station address, a plug ID for allowing a video to be sent, and the like, but also information indicating that the communication station succeeded in sending the video is incorporated in the packet. Further, as a receiving end MAC address of the packet, a MAC address of a communication station which has sent a video sending request is obtained from the remote station information storage section 292, and is then specified. The generated packet is sent via the radio section 21 (S711).

When the video signal input section 261 fails to receive the video signal, the communication station control section 23 orders the packet conversion section 22 to generate a packet including an identifier indicating that the identifier is a video sending request command response. At this time, not only a local communication station address, a plug ID for allowing a video to be sent, and the like, but also information, indicating that the video is allowed to be sent but the communication station failed to send the video, is incorporated in the packet. Further, as a receiving end MAC address of the packet, a MAC address of a communication station which has sent a video sending request is obtained from the remote station information storage section 292, and is then specified. The generated packet is sent via the radio section 21 (S714).

When the success or the failure in inputting the video signal is determined, the communication station control section 23 requests the HC to commence addition of the sending right. A method thereof is based on a draft of IEEE802.11e, and detailed description thereof is omitted.

When the communication station C which is a sending station of a stream request the HC to commence addition of the sending right, the HC sends a packet, indicative of addition of the sending right, to the MAC address of the communication station C. The packet includes information indicative of a period in which the communication station C has the sending right.

In case where the video signal input section 261 succeeded in receiving the video signal, when the packet indicative of addition of the sending right is received by the radio section 21 of the communication station C, it is notified to the communication station control section 23 via the packet conversion section 22 that the sending right has been given to the communication station C. At this time, also information indicative of a period in which the communication station C has the sending right included in the packet is notified. The communication station control section 23 retrieves a certain amount of each encoded video signal stored in the video encode section 262, and orders the packet conversion section 22 to generate a packet in which the retrieved video signal is incorporated. At this time, the packet includes an identifier indicating that the video signal is being transmitted, and is set so that it is possible to identify that the packet includes the video signal when the packet is received by the receiving side. Further, in order that the receiving side specifies the sending end of the video signal, a local communication station address and a plug ID of a device inputting the video signal are incorporated in the packet. A receiving end communication station address of the packet and a receiving end MAC address are obtained from the remote station information storage section 372, and is then set. The packet is sent via the radio section 21 (S712).

In case where the video signal input section 261 failed to receive the video signal, when the sending right is given, the communication station control section 23 generates a dummy video signal, and retrieves a certain amount of each signal obtained by encoding the dummy video signal, and orders the packet conversion section 23 to generate a packet in which the retrieved video signal is incorporated. The packet is sent via the radio section 21 (S715).

The dummy video may be a blue back. A video encoding system, a bit rate, and the like, are the same as in the registration of the ADDTS process. It may be so arranged that not the communication station control section 23 but the video encode section 262 generates the dummy video. On the receiving side, the dummy video is received and displayed in the display device 11. However, the displayed video is a blue back, so that the user recognizes that the video is not appropriately received.

Up to here, a process on the side of the video sending station reaches the step "B2" in FIG. 37.

Subsequently, the following description explains a process in case where the video sending request command response is received on the receiving side.

In the radio section 31 of the communication station A, when a packet is received by a certain time has passed (timeout) after sending the video sending request command (S606, 608) while being standby for reception of the packet (S605), the packet conversion section 32 recognizes that the packet has been sent from the MAC address to the communication station A. While, when the video sending request command response is not transmitted within a predetermined time in the step S606, it is notified to the user that there is no response (S607).

Further, the packet conversion section 32 obtains (i) an identifier of the video sending request command response that is included in the packet, (ii) a receiving end communication station address, (iii) a sending end communication station address, (iv) a plug ID in accordance with which the video sending is requested, (v) a response status, (vi) a sending end communication station address, (vii) and the like, and notifies them to the communication station control section 33. The communication station control section 33 recognizes that the packet has been sent to the communication station A and recognizes meaning of the command in accordance with the identifier of the video sending request command response and the receiving end communication station address. The communication station control section 33 interprets meaning of the response status, and orders the video signal superposing section 361 to superpose a message, corresponding to the meaning, onto the video signal.

The video signal on which the message has been superposed is inputted from the video signal output section 362 to the video signal input section 111 of the display device 11, and is displayed in the display section 113 via the display device control section 112, so as to be indicated to the user (S610). At this time, it is possible to automatically request another communication station and another device to send a video besides displaying an error. Further, in order to show the user an error message, a character string or an icon indicative of the error may be displayed in the display section 113 of the display device 11 connected to the communication station A on the video receiving side, or an LED or an LCD for indicating the error may be provided on the communication station A.

In case where the response status is a value indicating that a video is not allowed to be sent (S611), the communication station A is standby for the user to input another command. Note that, also in case where no response is given to the video sending request command within a predetermined time (S607), an error message is shown to the user. In this case, it is preferable that a counterpart communication station displays an easily understandable message indicating that: the communication station A failed to request the video sending for a reason different from a reason in case where a video is not allowed to be sent. For example, it is possible to display such a message that "there is no response for the packet" and the like.

In case where the response status is a value indicating that a video is allowed to be sent, the communication station A is standby for reception of a video, and waits for the video (packet) to be sent (S612).

In case where the packet including a video signal is not received after a certain time has passed (S613), it is notified to the user that a video has been allowed to be sent but a video signal has not been set, and the communication station A is standby for the user to perform any operation (S616). Here, the communication station A is under a condition of "A3" shown in FIG. 36.

A process in case where a video is appropriately received is described as follows. In the radio section 31 of the communication station A, a packet is received (S614). In the packet conversion section 32, it is recognized that the packet has been sent from the MAC address to the communication station A. Then, the communication station A obtains (i) an identifier indicating that the packet includes a video signal, (ii) a receiving end communication station address, (iii) a sending end communication station address, (iv) a plug ID of a sending end, and (v) the video signal, and notifies them to the communication station control section 33. The communication station control section 33 recognizes that the packet has been sent to the communication station A and the video signal has been received in accordance with (a) the identifier indicating that the packet includes the video signal and (b) the receiving end communication station address. Then, the communication station control section 33 sends the signal to the video decode section 365. The video decode section 365 decodes the received video signal into a form which can be displayed in the display device 11.

At this time, the communication station control section 33 further retrieves information stored in the remote station information storage section 372 by using the sending end communication station address and the plug ID as keys, so as to obtain information such as a communication station user name or a device user name of the sending end communication station, and the like. If necessary, the video signal superposing section 361 superposes the information onto a video, decoded by the video decode section 365, as a character string or an icon. As a video superposed at this time, it is possible to superpose letter information such as a communication station user name or a device user name of the video sending end communication station. After the letter information and the like is superposed onto the decoded video signal, the signal is inputted to the video signal input section 111 of the display device 11 via the video signal output section 362.

In the display device 11, the display device control section 112 causes the display section 113 to display a video in accordance with the video signal inputted from the video signal input section 111 (S615). Thus, the user can browse a video transmitted from the communication station C. Here, the communication station A is under a condition of "A3" shown in FIG. 36.

Subsequently, a process in case where the user operates a device by using a controller is described as follows.

In the present embodiment, the user on the video receiving side operates the controller 12, so that the control signal is transmitted to the device D on the video sending side, thereby operating the device D. The following description explains a specific process thereof.

The user performs a desired operation by using the user input section 1202 of the controller 12 at an arbitrary timing after making preparation for transmission of a stream among a sending station of the stream, a receiving station of the stream, and the HC. The operation is such that: when the controller 12 is a remote controller of a VTR for example, a fast-forward button is pushed. The following description explains a process for performing a fast-forward operation as an example of a process for transmitting the user's operation to the device. Upon detecting the operation performed in the user input section 1202, the controller control section 1203 generates a fast-forward commencement signal, and outputs the signal from the control signal output section 1201.

Note that, it is preferable that: it is notified to the user that the preparation for transmission of the stream has been made among the sending station 2 of the stream, the receiving station 3 of the stream, and the HC, and the user operates the controller 12 thereafter. However, in case where the user operates the controller 12 before making the preparation for transmission of the stream, it is possible to give a response such as an error message or the like. In case where it is difficult to display the error message, a system may be arranged so that: the user recognizes failure in the operation by seeing that no video is displayed, and the user operates the controller 12 again.

Upon receiving the fast-forward commencement signal, the control signal receiving section 363 of the communication station A performs a process for converting the signal into a transmissible signal as a packet (for example, when a control signal is converted into an infrared ray signal, the infrared ray signal is sampled so as to be converted into a digital signal), and notifies the process to the communication station control section 33. The communication station control section 33 orders the packet conversion section 32 to generate a packet which includes (i) an identifier indicating that the packet includes a fast-forward commencement signal and (ii) the converted fast-forward commencement signal that has been notified by the control signal receiving section 363. At this time, a MAC address of a video sending end communication station is specified as a packet receiving end MAC address including a communication station address of the communication station A, a communication station address of a video sending end communication station, a plug ID of a video sending end, and the like. The information is obtained from the remote station information storage section 292.

In the radio section 21 of the communication station C, the packet is received. In the packet conversion section 22, it is recognized that the packet has been sent from the MAC address to the communication station C. Then, the communication station C obtains (i) an identifier indicating that the packet includes the fast-forward commencement signal, (ii) the converted control signal, (iii) the sending end communication station address, (iv) and the like, and notifies them to the communication station control section 23. The communication station control section 23 recognizes that the received packet has been sent to the communication station C, and recognizes what the packet indicates, in accordance with (a) the identifier indicating that the packet includes the fast-forward commencement signal and (b) the receiving end communication station address. Then, the communication station control section 23 orders the control signal sending section 264 corresponding to the device specified with the plug ID to output the converted fast-forward commencement signal notified by the packet conversion section 22. The control signal sending section 264 converts the converted fast-forward commencement signal into a signal which can be outputted as a control signal (for example, a signal which has been digitally sampled is restored to an infrared ray signal), and outputs the fast-forward commencement signal.

When the control signal input section 1104 of the device D receives the control signal, the signal is analyzed. Then, the device control section 1103 controls the whole device D as indicated by the control signal.

Next, a video sending completion process (5) in FIG. 31 is described as follows.

Figure 38:
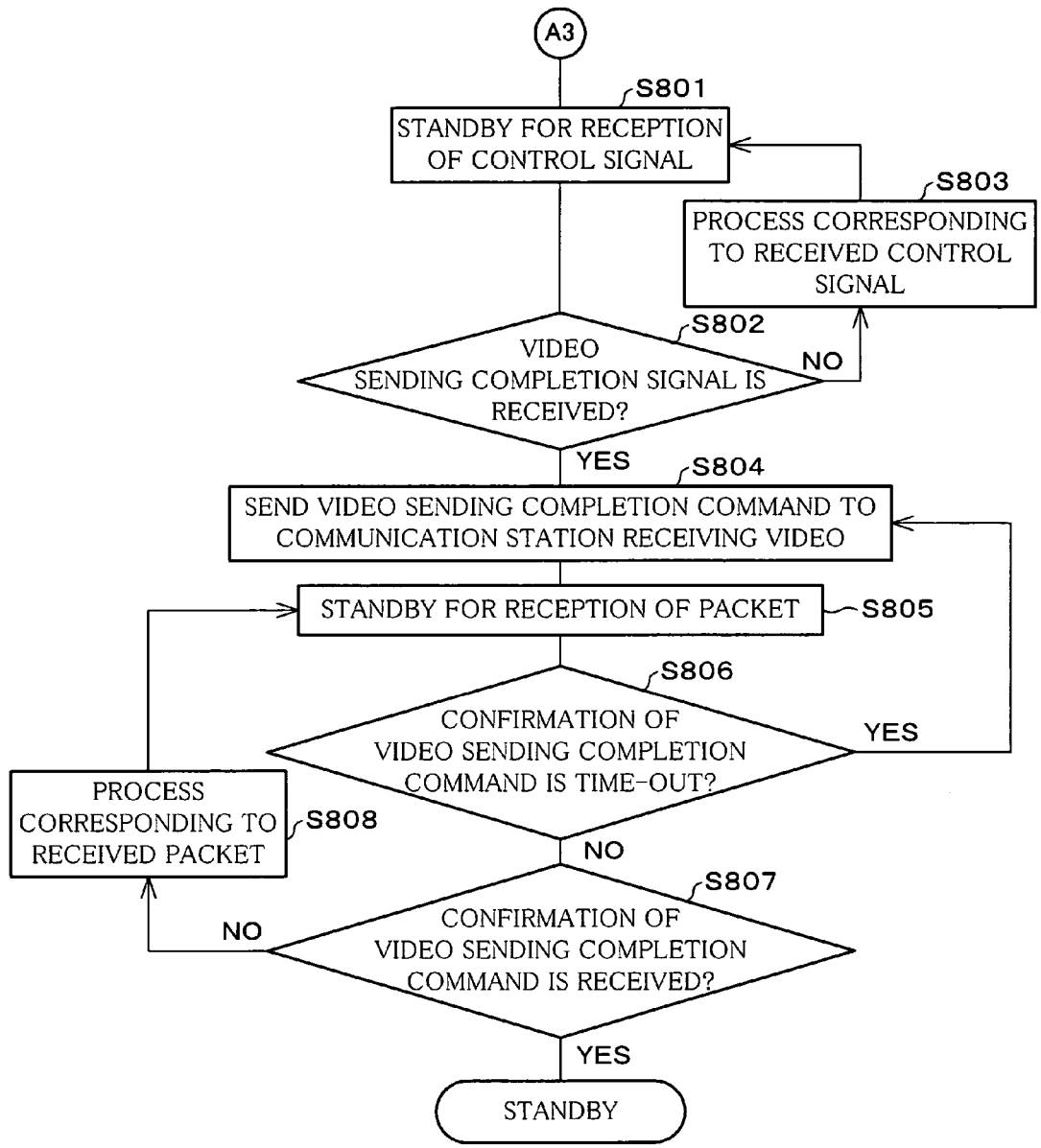
FIG. 38 is a flowchart showing a procedure in which a video signal sending completion process is carried out in the video signal receiving side communication station of the AV system of Embodiment 5.
Figure 39:
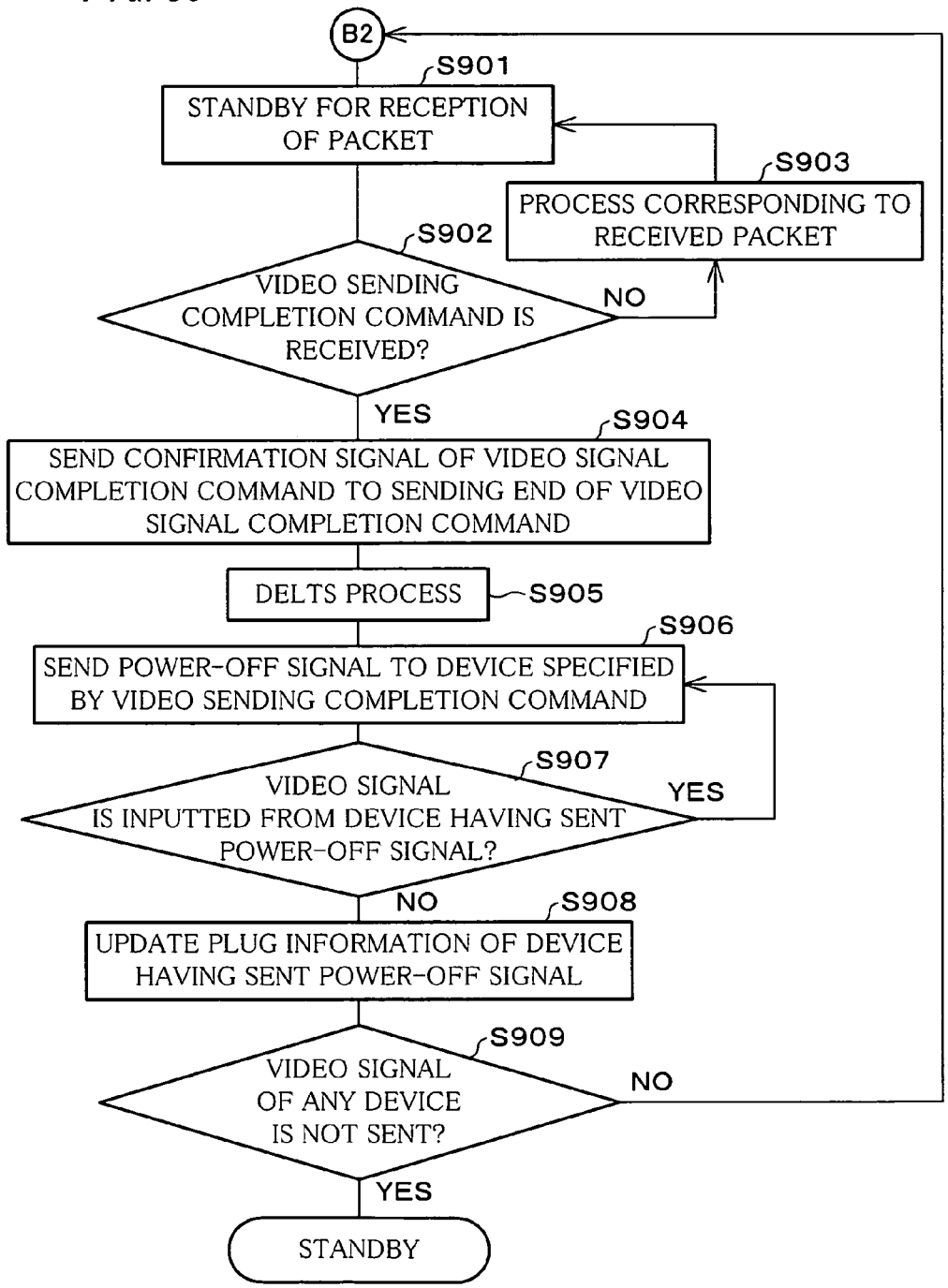
FIG. 39 is a flowchart showing a procedure in which the video signal sending completion process is carried out in the video signal sending side communication station.

As to the communication station A, the video sending completion process is performed in accordance with a procedure of a flowchart shown in FIG. 38. As to the communication station C, the video sending completion process is performed in accordance with a procedure of a flowchart shown in FIG. 39.

In case of completing the transmission of the video while displaying the video, the user operates the user input section 1203 of the controller 12 which is a controller of the communication station A, so as to give an instruction for completing the transmission of the video. The operation is specifically such that: a "communication station power-off button" provided on the controller 12 is pushed, or a similar operation is performed.

Upon detecting the operation performed by the user input section 1203, the controller control section 1204 orders the control signal output section 1201 to output a video transmission completion signal.

The communication station A is standby for the control signal to be inputted (S801). Under the condition, when the control signal is received by the control signal receiving section 363, it is judged whether the control signal is the video sending completion signal or not (S802). When the control signal is not the video sending completion signal, a process corresponding to the control signal is performed (S803), and the step returns to the step S801. When the control signal is the video sending completion signal, the communication station control section 33 recognizes that the user requests completion of the video transmission, and orders the packet conversion section 32 to generate a packet including an identifier indicative of a video sending completion command, so as to send the packet via the radio section 31 (S804). At this time, a communication station address, a MAC address, and a plug ID of a communication station which should complete the video transmission are obtained from the remote station information storage section 372, and are included in the packet.

In case where the packet does not include the video sending completion command under such condition that the communication station C is standby for the packet to be received (S901), a process corresponding to the packet is performed, and the step returns to the step S901. While, in case where the packet including the video sending completion command is appropriately received, the communication station control section 23 resends a confirmation packet so as to notify the foregoing condition to the communication station (S904).

When the communication station A is standby for the packet to be received (S805), the communication station A recognizes that the video sending completion command is notified to the communication station C by confirming that the confirmation packet is received. Further, in case where the confirmation packet is not resent back after a certain time has passed (timeout), the communication station A recognizes that the packet including the video sending completion command has not been appropriately received by the communication station C (S806), and it is possible to perform a process such as resending of the packet including the video sending completion command or a similar process until the confirmation packet is received from the communication station C (S808). At this time, when no video is received from any other communication station, it is possible to make the communication station A standby by causing the communication station control section 33 to stop operations of an unnecessary block so as to suppress the power consumption. However, as described above, when the communication station C is completely turned off, it is impossible to respond to a packet from other device. Thus, it is not preferable to completely turn off the communication station A.

In the radio section 21 of the communication station C, the packet is received. In the packet conversion section 22, it is recognized that the packet has been sent from the MAC address to the communication station C. Then, the communication station C obtains (i) an identifier indicative of the video transmission completion command, (ii) a receiving end communication station address, (iii) a plug ID corresponding to a device required to complete the video transmission, (iv) and the like, so as to notify them to the communication station control section 23. The communication station control section 23 recognizes that the received packet has been sent to the communication station C, and recognizes what the command included in the packet indicates, in accordance with (a) the identifier indicative of the video sending completion command and (b) the receiving end communication address. Then, the communication station control section 23 stops the subsequent transmission of the packet including the video signal. Further, the communication station control section 23 orders the HC to release a band secured for the video whose transmission has been stopped.

Note that, detailed description of the process is omitted here, but the process is based on a process, referred to as DELTS, which is defined in a draft of IEEE802.11e (S905). When the DELTS process is completed, the HC gives a sending right to a specified sending station of a stream. Depending on cases, the HC reallocates a band, which has been used in a released stream, for transmission of another stream.

Originally, before giving an instruction for stopping the video transmission by the controller 12, the user should perform an operation showing that the user has finished using the device, for example, that the device is turned off, with respect to the device D sending a video, by operating the controller 12. However, in case where the instruction for completing the video transmission is given by means of the controller 12 without performing the foregoing operation, the communication station C on the video sending side may automatically perform the operation such as turning off the device D. In order to realize this, it is possible to adopt a method in which the communication station control section 23 causes the control signal sending section 264 to output a power-off signal to the device D when the communication station C receives the packet indicative of the video transmission completion command from the communication station A (S906). The power-off signal is received by the control signal input section 1104 of the device D, and is recognized by the device control section 1103, and the device control section 1103 turns off the device D or performs a similar operation.

Further, upon confirming that the video signal has not been inputted from the device D to which the power-off signal has been sent (S907), the communication station control section 23 updates the plug information so that the device can be used by other terminal (S908). Thus, the device which has sent the video can be used by other communication station.

At this time, in case where no video is transmitted to any other communication station (S909), it is possible to make the communication station C standby by causing the communication station control section 23 to stop operations of an unnecessary block so as to suppress the power consumption. However, as described above, when the communication station C is completely turned off, it is impossible to respond to a packet from other device. Thus, it is not preferable to completely turn off the communication station C.

Figure 40:
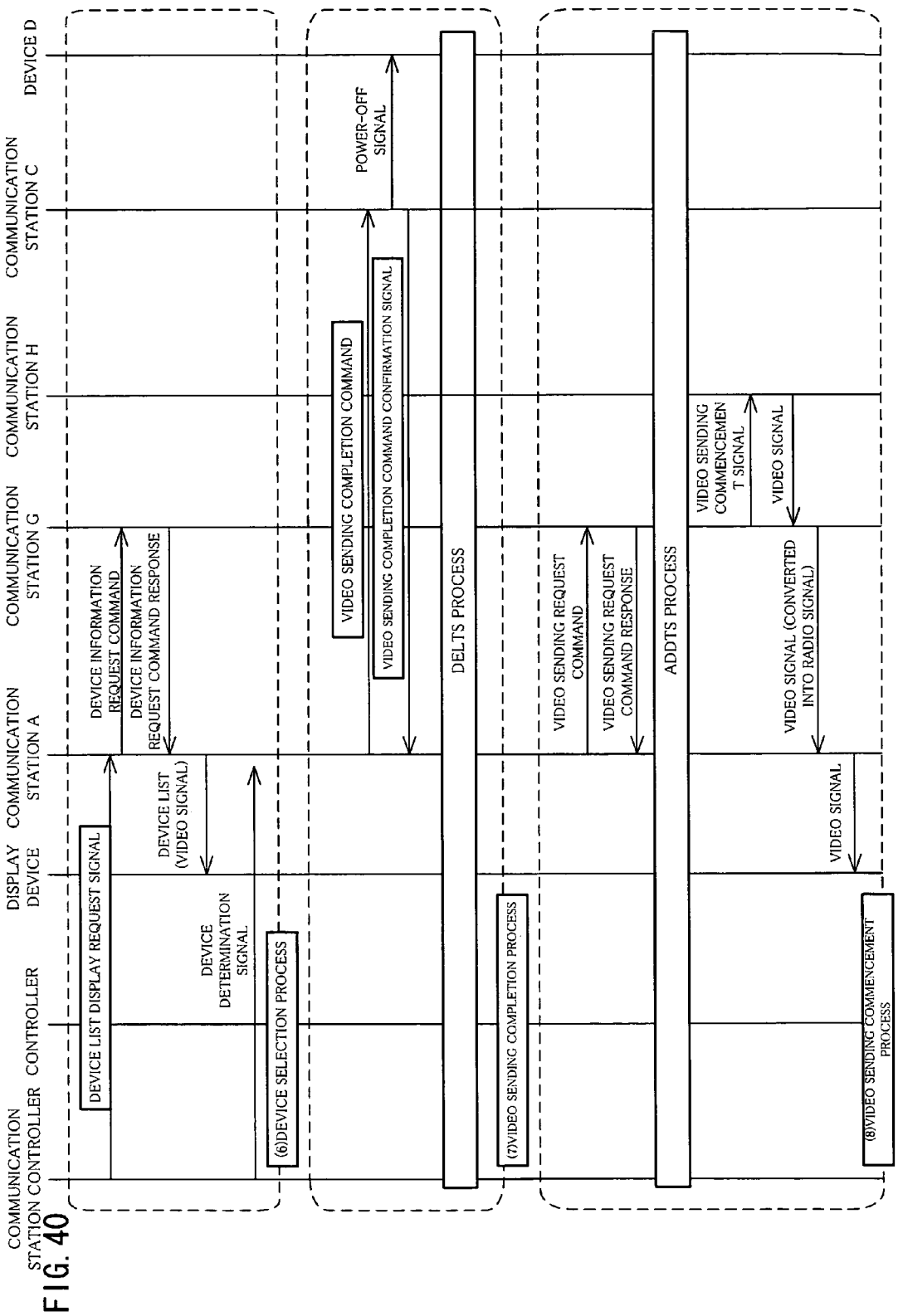
FIG. 40 shows a communication sequence among the respective sections in a device selection process, the video signal sending completion process, and the video signal sending commencement process, that are carried out in the AV system of Embodiment 5.
Figure 41:
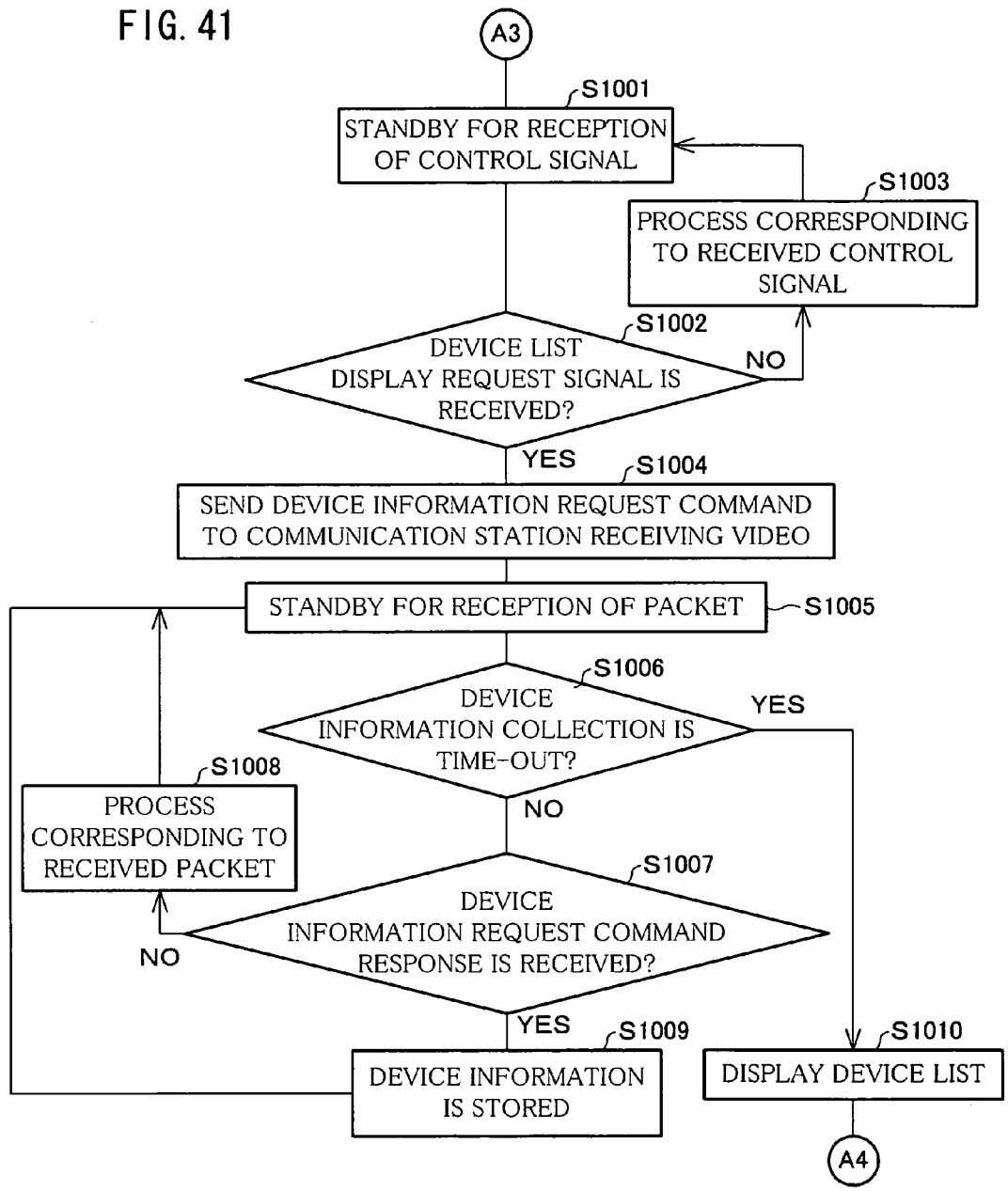
FIG. 41 is a flowchart showing a procedure in the device selection process.
Figure 42:
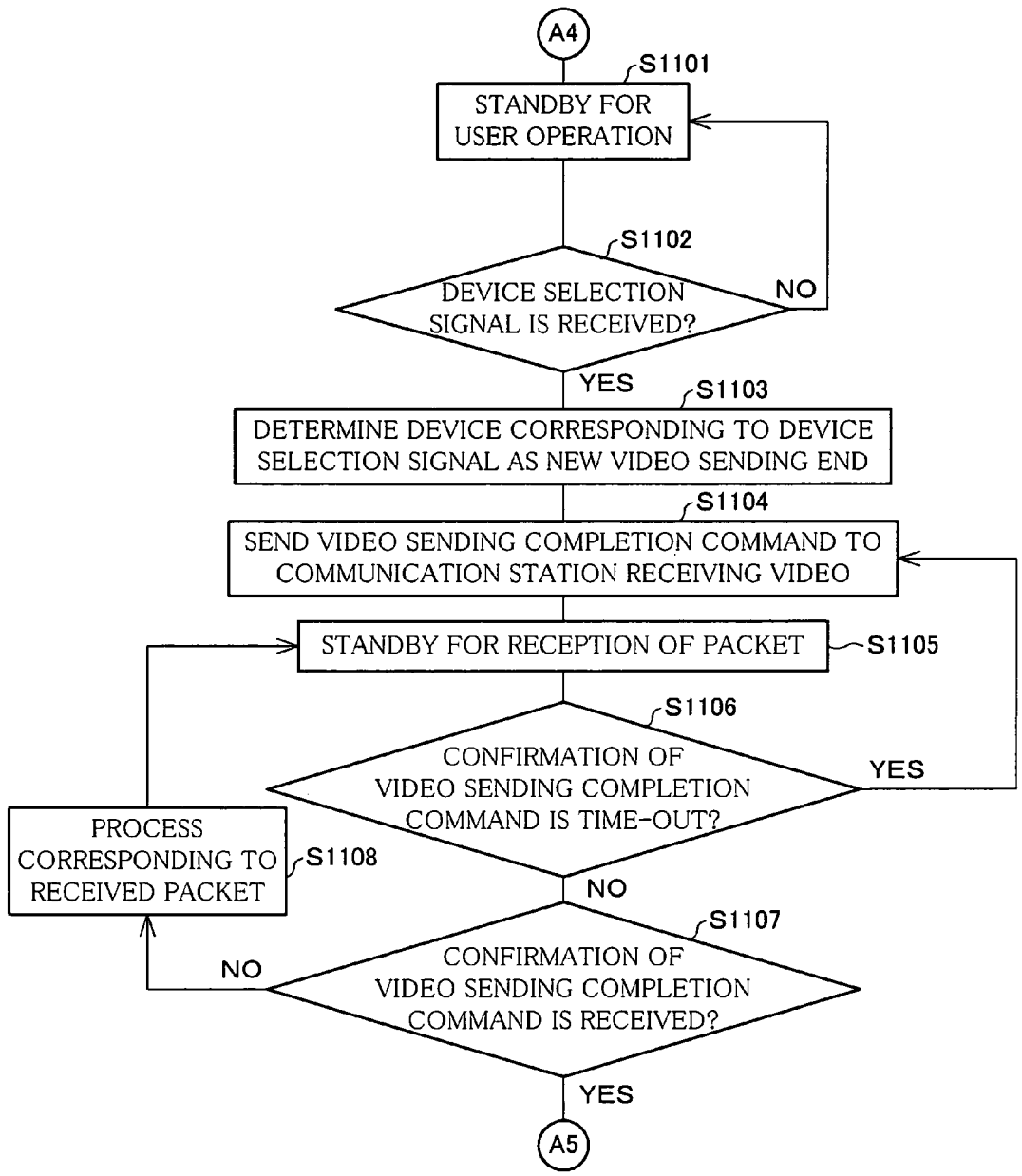
FIG. 42 is a flowchart showing another procedure in the device selection process.
Figure 44:
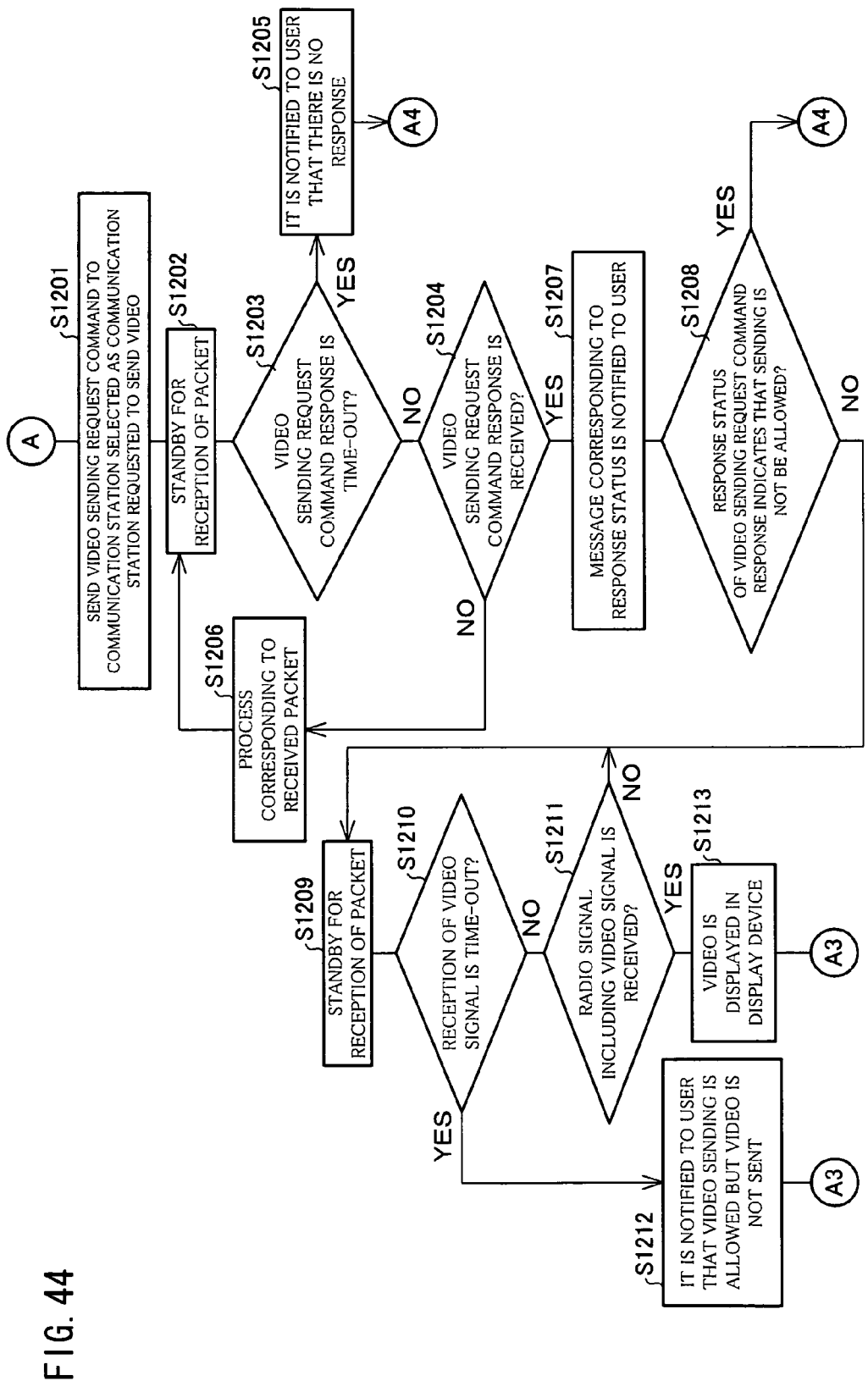
FIG. 44 is a flowchart showing another procedure in the video signal sending commencement process.

Further, the following description explains (6) a device selection process, (7) a video sending completion process, and (8) a process for performing a video sending commencement process, in a time series manner, with reference to FIG. 40.

First, (6) the device selection process in FIG. 40 is described.

Here, a process in which the user changes a device of a video sending end is described. Further, as to the communication station A, the process is performed in accordance with a procedure of a flowchart shown in FIG. 36, FIG. 41, and FIG. 42.

In case of changing a device of a video sending end while displaying the video, the user operates the user input section 1303 of the controller 13 which is a controller of the communication station A. The operation is such that: for example, a "device list button" of the controller 13 is pushed, or a similar operation. Upon detecting the operation performed in the user input section 1303 of the controller 13, the controller control section 1304 generates a device list display request signal, so as to output the signal from the control signal output section 1301.

When the device list display request signal is received (S1002) by the control signal receiving section 363 of the communication station A while being standby for the control signal to be inputted (S1001), meaning of the signal is analyzed by the communication station control section 23, and the communication station control section 33 recognizes that the user desires the device list to be displayed.

The communication station control section 33 collects information of all the communication stations in the network and information of devices connected to the communication stations in the same manner as in the startup of the communication stations. A basic procedure thereof is as follows: a communication station which requires information transmits a device information request command to all the communication stations, and a communication station which has received the device information request command resends information of the communication station (S1004 to S1009).

Upon detecting that information of the communication stations are stored in the remote station information storage section 372 and collection of the device information is completed, the communication station control section 23 obtains necessary information from the remote station information storage section 372, and orders the video signal superposing section 361 to superpose the information. At this time, information displayed in the device list may include (a) a communication station user name, (b) a device user name, (c) an operational condition of the device (whether the device is used by another user or not, etc.), (d) a type of the device, a content name (for example, a file name of an HDD recorder, or a similar name) in case where the device can display a plurality of contents, (e) and the like.

The video signal on which the display list has been superposed is outputted from the video signal output section 362 of the communication station A and is inputted to the display device control section 112 via the video signal input section 111 of the display device 11, and is displayed in the display section 113, so that the user can browse the display list (S1010). At this time, the display section 113 displays a device selection video as shown in FIG. 43. Further, when the video is being displayed, the device list is superposed on the video so as to be displayed. When the video is not being displayed, mere the device list is displayed. Here, the communication station A is under a condition of "A4" in flowcharts of FIG. 41 and FIG. 42.

The user operates the user input section 1303 of the controller 13 while seeing the display section 113 of the display device 11, and selects a desired device from the device list (S1101 to S1103). The user input section 1303 notifies the controller control section 1304 of a selected device, and the controller control section 1304 sends a device determination signal from the control signal output section 1301 to the communication station A.

Next, (7) the video sending completion process in FIG. 40 is described.

Figure 45:
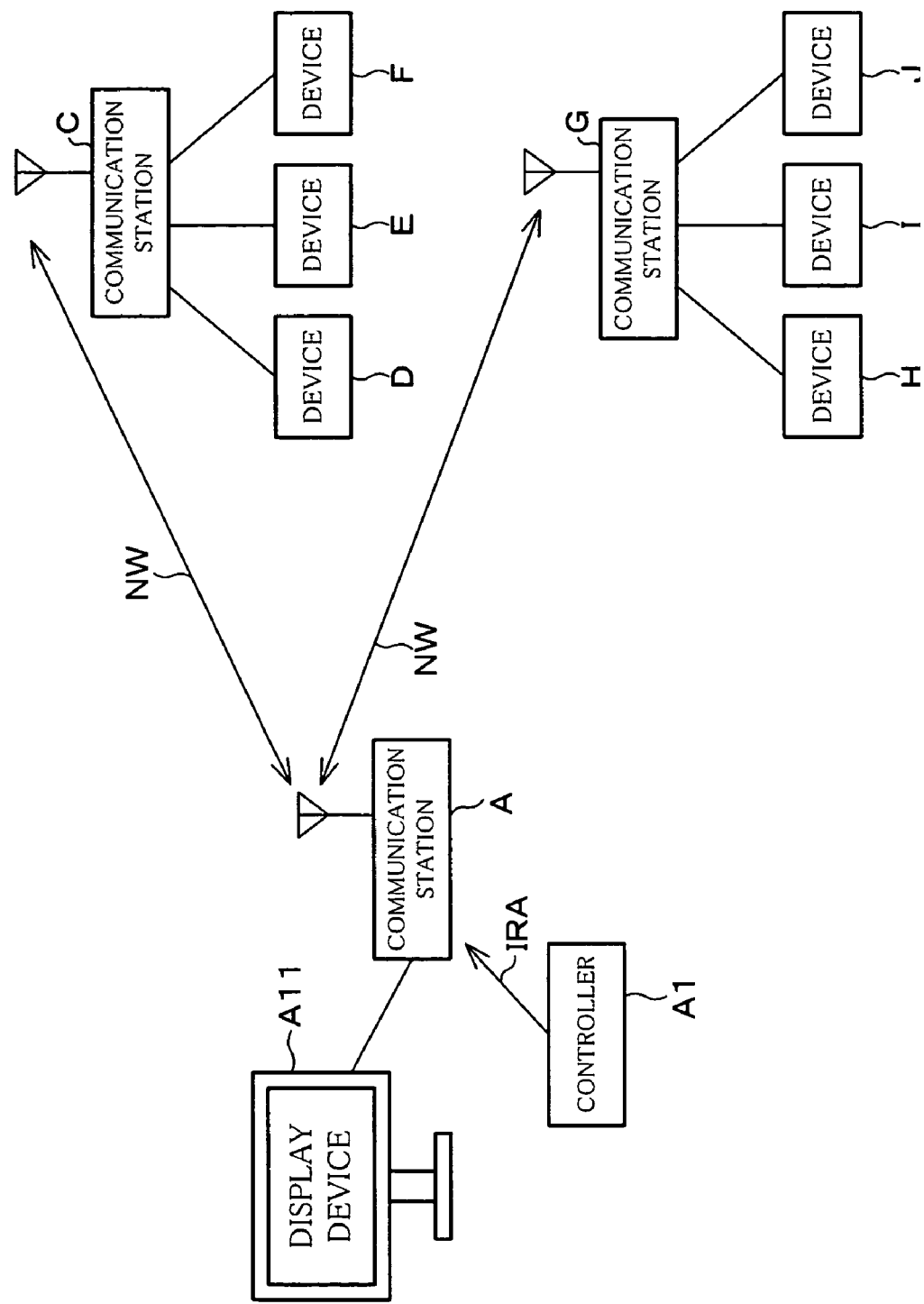
FIG. 45 is a block diagram showing an arrangement of an AV system in which it is possible to switch the video signal sending side communication station by carrying out the video signal sending commencement process.

With reference to FIG. 40 and FIG. 45, the following description explains a process performed from a time when the user finishes selecting a device from the device list to a time when a video of the selected device is displayed. FIG. 45 shows an example where there are two communication stations (a communication station C and a communication station G) in the network as the sending side communication stations and each of the communication stations has a plurality of devices. When a video of the device D connected to the communication station C is displayed, a controller A1 which is a controller of the communication station A is used to operate a device list displayed in the display device A11, so that a device H out of devices H to J connected to the communication station G is selected by the user as a new video sending end device.

First, the communication station A which has received the device determination signal causes the communication station C, which has been a video sending end, to stop sending a video (S1104 to S1107). A procedure thereof is the same as in the case of completing the transmission of a video while displaying the video, and the communication station A sends a packet indicative of a video sending completion command to the communication station C (S1104), and the communication station C which has received the command sends a power-off signal to the device D, and sends a packet which includes a video sending completion command confirmation signal. Thereafter, the DELTS process is performed so that the communication station C releases the secured band. Here, the communication station A is under a condition of "A5" shown in FIG. 42 and FIG. 44.

Next, (8) the video sending commencement process in FIG. 40 is described. The communication station A on the receiving side performs a process based on a flowchart shown in FIG. 44. The communication station C and the communication station G on the sending side perform the same processes as in the flowchart shown in FIG. 37, so that description thereof is omitted.

Here, the communication station G which has been newly selected as a video sending end by the user is made to begin sending a video (S1201 to S1213). The process is performed in the same manner as in the case where the communication station G automatically determined by a sending station at the time of startup of the communication station is made to begin sending a video, and the communication station A on the video receiving side sends a packet indicative of a video sending request command to the communication station E on the video sending side (S1201). After judging whether or not to allow the video to be sent, the communication station G on the video sending side resends the packet indicative of the video sending request command, and performs a process for securing a communication band based on IEEE802.11, and a video signal inputted from the device H is sent as a packet (S1213). In case where there is no response in a certain time after sending the video sending request command, or in case where the packet includes a response status indicating that the video is not allowed to be sent, the communication station is standby for any operation such as device selection performed by the user (S1205: that is, the condition returns to the condition of "A4" in FIG. 42). After the video is properly displayed, the device list video may be erased. Here, the communication station A is under a condition of "A3" in FIG. 42 and FIG. 44. Thereafter, the process may be started from A3 of FIG. 41 in response to the input of the user again so as to display the device list.

Here, in case where a device can display a plurality of contents, it may be so arranged that the user not merely selects a device but also selects the content. Thus, it is possible to avoid such troublesome operation that the user selects the content after selecting the device.

As described above, the device control management apparatus of the present invention includes: first communication means connected to each of communication devices (for example, the communication stations A and B, or the controllers A1 and A2) via each of first communication paths; second communication means connected to each of controlled devices (for example, the devices D to F) via each of second communication paths; and control right management means (corresponding to the communication station control section 23 and the device control information management section 24 of the aforementioned embodiments) for managing a control right that is set between the communication device connected to the first communication means and the controlled devices connected to the second communication means.

According to the arrangement, it is possible to manage the control right between the devices (the communication devices and the controlled devices) that are connected to different networks.

Further, the device control management apparatus is arranged so that the control right management means is capable of obtaining or releasing the control right, which allows the communication device connected to the first communication means to control the controlled device connected to the second communication means as management of the control right.

According to the arrangement, it is possible to manage a condition under which the control right is obtained or released between the devices that are connected to different networks.

Further, the device control management apparatus is arranged so as to includes communication management means (corresponding to the communication condition monitoring section 27 of the aforementioned embodiments) for detecting a communication condition of at least one of the first communication path and the second communication path, wherein the control right management means is capable of changing a setting of the control right in accordance with variation of the communication condition detected by the communication management means.

According to the arrangement, it is possible to change the allotment of the control right in accordance with the communication condition detected by the communication management means.

Further, the device control management apparatus is arranged so that in case where the communication management means detects that a communication of at least one of the first communication path and the second communication path is cut off, the control right management means releases the control right between the communication device and the controlled device that communicate with each other via said at least one of the first communication path and the second communication path.

According to the arrangement, it is possible to prevent the control right from being given to a communication device which cannot communicate/control with respect to the controlled device.

Further, the device control management apparatus is arranged so that in case where the communication management means detects that a communication of at least one of the first communication path and the second communication path is established, the control right management means establishes the control right between the communication device and the controlled device that communicate with each other via said at least one of the first communication path and the second communication path.

According to the arrangement, the device control management apparatus receives a stream at the same time as commencement of transmission of the stream, thereby setting the control right with respect to a proper communication device.

Further, the device control management apparatus is arranged so that in case where the setting of the control right is changed, the control right management means notifies how the control priority right is changed to the communication device or the controlled device that is connected to the other of the first communication path and the second communication path.

According to the arrangement, a communication station which receives the notification can control the device thereafter.

Further, the device control management apparatus is arranged so as to includes setting input means (corresponding to the input section 25 of the aforementioned embodiments) which is capable of inputting the setting of the control right not via the first communication means.

According to the arrangement, the user on the side of the device control management device can set the control right as in the user who requests the control right for the controlled device from the communication device via the first communication means.

Further, the device control management apparatus is arranged so that in case where the setting input means inputs the setting of the control right, the control right management means prioritizes the setting of the control right that has been inputted.

According to the arrangement, in case where the user on the side of the device control management apparatus operates the controlled device, it is possible to prevent reception of unintended operation performed by other communication device connected to the device control management apparatus via the first communication means.

Further, the device control management apparatus is arranged so as to includes display means (corresponding to the display section 28 of the aforementioned embodiments) which is capable of displaying a setting condition of the control right.

According to the arrangement, the user can use the setting condition of the control right, that is displayed in the display means, so as to decide whether or not to request the control right for the controlled device.

Further, the device control management apparatus is arranged so that the display means is capable of displaying a relationship between the control right and the communication device having the control right as the setting condition.

According to the arrangement, it is possible to easily determine which communication device has the control right.

Further, the device control management apparatus is arranged so that the second communication means and the controlled device are provided in the device control management apparatus.

According to the arrangement, it is possible to manage the control right with respect to contents of the device control management apparatus in the same manner as in the case of managing the controlled device via the second communication means.

Further, the device control management apparatus is arranged so that the comprising control right management means adds or releases one or more control rights for controlled devices to or from one or more communication devices in case where the device control management apparatus receives each of control commands for the controlled devices from the communication devices via the first communication paths.

According to the arrangement, even in case where the communication device connected via the first communication path does not correspond to the control right management, it is possible to control the device in consideration for the control right.

Further, the device control management apparatus is arranged so that the control right management means adds or release the control right in accordance with a type of the control command.

According to the arrangement, it is possible to manage the control right according to the content of the process.

Further, the device control management apparatus is arranged so that the control right management means judges whether or not the control command is a command which changes an operative condition of each of the controlled devices, and the control right management means does not add or release the control right in case where the control command is a command which does not change the operative condition of the controlled device.

According to the arrangement, in the operation based on the control command, it is possible to set the control right merely when it is necessary to set the control right.

Further, the device control management apparatus is arranged so that the control right management means adds the control right to a communication device, which has sent a communication connection establishment command, in case where the control right management means receives the communication connection establishment command.

According to the arrangement, it is possible to set the control right in case where the communication device is to communicate with the controlled device.

Further, the device control management apparatus is arranged so that the control right management means releases the control right of a communication device, which has sent a communication connection cut-off command, in case where the control right management means receives the communication connection cut-off command.

According to the arrangement, it is possible to release the control right in case where the communication device completes communication with the controlled device.

Further, the device control management apparatus is arranged so that in case where the control right management means receives one or more control commands, targeted in adding the control right, from one or more communication devices connected to the device control management apparatus via the first communication paths, the control right management means adds the control rights to a predetermined number of communication devices out of the communication devices which have sent the control commands.

According to the arrangement, the communication device having the control right for a certain controlled device is not limited to a single device, so that it is possible to set the control right with high arbitrariness.

Further, the device control management apparatus is arranged so that in case where the control right management means receives the control commands, targeted in adding the control right, from a plurality of communication devices connected to the device control management apparatus via the first communication paths, the control right management means adds the control rights to the communication devices in such an order that a first communication device having sent the control command first receives the control right.

Further, the device control management apparatus is arranged so that in case where the control right is released from a certain communication device, the control right management means selects a next communication device, to which the control right is to be added, from other communication devices connected to the device control management apparatus via the first communication paths.

According to the arrangement, it is possible to prevent such a problem that there is no communication device corresponding to the control right for the controlled device though the device control management apparatus communicates with the controlled device.

Further, the device control management apparatus is arranged so that the control right management means selects a communication device which has sent the control command, targeted in adding the control right, to the device control management apparatus, as a next communication device to which the control right is to be added.

According to the arrangement, it is possible to select a communication device, to which the control right is to be newly given, from the communication devices which have to control the controlled device.

Further, the device control management apparatus is set so that when the control right is to be added to a communication device, the control right management means notifies a communication device which newly obtains the control right or a controlled device which is newly targeted that the control right is added, and when the control right is to be released to a communication device, the control right management means notifies the communication device which had the control right or the controlled device which was controlled by the communication device that the control right is released.

According to the arrangement, it is possible to determine how the communication device receiving the notification and the controlled device receiving the notification should operate thereafter.

Further, the communication device of the present invention is connected to the aforementioned device control management apparatus via a first communication path, and includes a display control means (corresponding to the communication station control section 33, the video signal superposing section 361, and the video signal output section 362 of the aforementioned embodiments) for receiving a control right obtaining condition from the device control management apparatus and for controlling a display so that the control right obtaining condition is displayed in the device control management apparatus.

According to the arrangement, the user operating the controlled device via the communication device can receive a result obtained by feedbacking the operation, and can make use of the result in subsequent operations.

Further, it is possible to arrange the device control management apparatus according to the present invention as follows.

The device control management apparatus of the present invention includes: first communication means connected to first communication paths; second communication means connected to second communication paths; and conversion means for converting each of commands, which are sent from control source communication devices via the first communication paths and are received by the first communication means, into a command for each of the second communication paths, wherein the command that has been converted is sent from the second communication means to each of controlled devices connected to the second communication means, so as to control the controlled device, and the device control management apparatus includes: specifying means for specifying a control source device or a control source communication device and the controlled device by extracting (i) control source specifying information for specifying the control source device generating a command on a side of the control source communication device or a control source communication device and (ii) controlled device specifying information for specifying the controlled device, from the command, having the control source specifying information and the controlled device specifying information, which has been received by the first communication means; relationship management means for managing a relationship in which the control source device allowed to control the controlled device in advance corresponds to the controlled device; and control allowing means for allowing the control source device or the control source communication device to control the controlled device when a relationship in which the control source device or the control source communication device specified by the specifying means corresponds to the controlled device is identical with the relationship between both the devices which is managed by the relationship management means.

According to the arrangement, the command generated by the control source device is sent from the sending end sending device and is received by the first communication means via the first communication path. The specifying means specifies the control source device or the control source communication device and the controlled device in accordance with the control source specifying information and the controlled device specifying information that have been extracted from the command. Then, the control allowing means compares (i) the relationship in which the specified control source (the control source device or the control source communication device) corresponds to the device with (ii) the relationship managed by the relationship management means. When both the relationships are identical with each other as a result of the comparison, the control source device or the control source communication device is allowed to control the controlled device corresponding thereto.

In this manner, the control right for the controlled device is given to the control source device or the control source communication device whose relationship is identical with the managed relationship. Thus, in case where the first communication path is formed as a network such as LAN, it is possible to set the control right for the controlled device which is not directly connected to the network.

It is preferable to arrange the device control management apparatus so that: the specifying means specifies both the devices by using at least one of (i) a unique value which has been set for each control source communication device or each control source device as the control source specifying information and (ii) a unique value which has been set for each device control management device as the controlled device specifying information.

More specifically, the specifying means specifies the controlled device by using at least one of (i) an identifier, set as the control source specifying information, which indicates a sending end including the command received by the first communication means, and (ii) an identifier, set as the controlled device specifying information, which indicates the controlled device included in the command received by the first communication means. Alternatively, the specifying means specifies the controlled device by using at least one of (i) an identifier which indicates a sending end of a packet, including the command received by the first communication means, as the controlled device specifying information, and (ii) an identifier which indicates the controlled device included in the command received by the first communication means.

Thus, it is possible to specify the device by using a desired value out of the foregoing values.

It is preferable to arrange the device control management apparatus so that: the control allowing means registers and updates information indicative of the relationship managed by the relationship management means. Thus, it is possible to easily change the setting according to the status.

It is preferable to arrange the device control management apparatus so that: the control allowing means updates the information indicative of the relationship managed by the relationship management means (a) when control right setting request is received from the control source communication device, or (b) when a command for controlling the controlled device is received, or (c) when variation of a communication condition in the first communication path is detected. Thus, the information indicative of the relationship is updated when the foregoing operations are performed, so that it is possible to omit the operation for registering the relationship in advance.

It is preferable to arrange the device control management apparatus so that: the control allowing means judges it possible to control the controlled device in case where the controlled device is controlled neither by the control source device nor by the control source communication device, or in case where the control device is controlled by one or more control source devices or one or more control source communication devices. Thus, a condition which enables the controlled device to be controlled is obvious, so that it is easy to manage the control right.

It is preferable to arrange the device control management apparatus so that: the control allowing means judges it impossible to control the controlled device in case where the controlled device is controlled neither by the control source device nor by the control source communication device, or in case where the control device is controlled by one or more control source devices or one or more control source communication devices. Thus, a condition which enables the controlled device to be controlled is obvious, so that it is easy to manage the control right.

It is preferable to arrange the device control management apparatus so that: when there is no control source device or there is no control source communication device which controls the controlled device and a control command for the controlled device is received, the control allowing means sets a control source device or a control source communication device, generating the received control command, in the relationship management means, as the control source device or the control source communication device having the control right for the controlled device. Thus, in response to the command, the control right is set without registering the relationship in advance, so that the setting of the control right is simplified, thereby improving the operability.

Specifically, it is preferable that the control command is a command concerning a setting of a stream outputted from the controlled device or commencement of sending/receiving of the stream for example.

Further, it is preferable that: when there is no control source device or there is no control source communication device which controls the controlled device and a control command for the controlled device is received, the control allowing means requests the relationship management means to release the control right for the controlled device.

Further, it is preferable that the control command gives instruction for relinquishing the control right by canceling the setting of the stream outputted from the controlled device.

Further, it is preferable to arrange the device control management apparatus so as to include monitoring means for monitoring a sending condition of the stream outputted from the controlled device, wherein when a new stream is detected by the monitoring means, the control allowing means sets the control right with respect to a control source device or a control source communication device handling the stream.

Further, it is preferable to arrange the device control management apparatus so as to include monitoring means for monitoring a sending condition of the stream outputted from the controlled device, wherein when the monitoring means detects that the stream is stopped or cut off, the control right for the device handling the stream is released.

It is preferable to arrange the device control management apparatus so that: the relationship management means sets the control right with respect to one or more control source devices generating a local command which can be received by the control source communication device. Thus, it is possible to locally set the control right for the control source device on the side of the control source.

Specifically, for example, it is preferable to arrange the relationship management means so that the control right set by the local command is more preferentially set than the control right which is set via the first communication path.

It is preferable to arrange the device control management apparatus so as to include indicating means for indicating a setting condition of the control priority so that the setting condition can be recognized by the user. Thus, the user can easily recognize the setting condition of the control right.

It is preferable to arrange the device control management apparatus so that the indicating means indicates the setting condition of the control right and the controlled device as a pair. Thus, the user can easily confirm which controlled device receives the control right.

It is preferable to arrange the device control management apparatus so as to be provided in the same housing including the controlled device therein. Thus, also in an arrangement in which the device control management apparatus and the controlled device are integrally provided, it is easy to manage the control right in the network.

INDUSTRIAL APPLICABILITY

In the present invention, the control allowing means compares (i) a relationship in which a specified control source (a control source device or a control source communication device) corresponds to a device with (ii) a relationship managed by the relationship management means. When both the relationships are identical with each other as a result of the comparison, the control source device or the control source communication device is allowed to control the controlled device corresponding thereto. In this manner, the control right for the controlled device is given to the control source device and the control source communication device whose relationship is identical with the managed relationship. Thus, in case where the first communication path is formed as a network such as LAN, it is possible to set the control right for the controlled device which is not directly connected to the network.

The invention claimed is:

1. A device control management apparatus, comprising:
a first communication section connected to each of communication devices via each of first communication paths;

a second communication section connected to each of controlled devices via each of second communication paths;

a control right management section that includes a control information management table, in advance, that allows the control right management section to manage a control right that is set between the communication device connected to the first communication section and the controlled devices connected to the second communication section; and a communication management section for detecting a communication condition of at least one of the first communication path and the second communication path, wherein the control right management section is capable of changing a setting of the control right without communicating with the communication device for which the control right is set;

the change of setting is made in accordance with variation of the communication condition detected by the communication management section, and the communication device is notified by the controlled device of a result of the control right, where the result includes either a notification of a success when the control right is successfully performed and a notification of a failure when the control right is unsuccessfully performed.

2. The device control management apparatus as set forth in claim 1, wherein the control right management section is capable of obtaining or releasing the control right, which allows the communication device connected to the first communication section to control the controlled device, connected to the second communication section, as management of the control right.

3. The device control management apparatus as set forth in claim 1, wherein in case where the communication management section detects that a communication of at least one of the first communication path and the second communication path is cut off, the control right management section releases the control right between the communication device and the controlled device that communicate with each other via said at least one of the first communication path and the second communication path.

4. The device control management apparatus as set forth in claim 1, wherein in case where the communication management section detects that a communication of at least one of the first communication path and the second communication path is established, the control right management section establishes the control right between the communication device and the controlled device that communicate with each other via said at least one of the first communication path and the second communication path.

5. The device control management apparatus as set forth in claim 1, wherein in case where the setting of the control right is changed, the control right management section notifies how the control right is changed to the communication device or the controlled device that is connected to the other of the first communication path and the second communication path.

6. The device control management apparatus as set forth in claim 1, comprising setting input section which is capable of inputting the setting of the control right not via the first communication section.

7. The device control management apparatus as set forth in claim 6, wherein in case where the setting input section inputs the setting of the control right, the control right management section prioritizes the setting of the control right that has been inputted.

8. The device control management apparatus as set forth in claim 1, comprising display section which is capable of displaying a setting condition of the control right.

9. The device control management apparatus as set forth in claim 8, wherein the display section is capable of displaying a relationship between the control right and the communication device having the control right as the setting condition.

10. The device control management apparatus as set forth in claim 1, wherein the second communication section and the controlled device are provided in the device control management apparatus.

11. The device control management apparatus as set forth in claim 1, further comprising not only the first communication section but also setting input section which allows the control right to be set and inputted from an outside of the device control management apparatus.

12. The device control management apparatus as set forth in claim 1, wherein the device control management apparatus confirms a control right condition set in the controlled device when relaying a controlled device operation command sent from the communication device, and the device control management apparatus stops sending the controlled device operation command sent from the communication device or an operation command corresponding to the controlled device operation command in case where a device other than the communication device has the control right for the controlled device.

13. The device control management apparatus as set forth in claim 12, wherein the device control management apparatus adds the control right for the controlled device to a communication device which has sent the controlled device operation command in case where no device has the control right for the controlled device.

14. The device control management apparatus as set forth in claim 12, wherein the device control management apparatus releases the control right for the controlled device in case where the communication device which has sent the controlled device operation command is identical with a device having the control right that has been set with respect to the controlled device on the basis of the controlled device operation command.

15. The device control management apparatus as set forth in claim 12, wherein the control management section adds or releases the control right in accordance with a type of the control command.

16. The device control management apparatus as set forth in claim 12, wherein the controlled device is provided in the device control management apparatus.

17. A device control management apparatus, being connected to communication devices via first communication paths, comprising:

a control right management section that includes a control information management table, in advance, that allows the control right management section to add or release one or more control rights for controlled devices to or from one or more communication devices in case where the device control management apparatus receives each of control commands for the controlled devices from the communication devices via the first communication paths; and a communication management section for detecting a communication condition for one of the first communication paths, wherein the control right management section is capable of changing a setting of the control right without communicating with the communication device for which the control right is set;

the change of setting is made in accordance with variation of the communication condition detected by the communication management section, and the communication device is notified by the controlled device of a result of the control right, where the result includes either a notification of a success when the control right is successfully performed and a notification of a failure when the control right is unsuccessfully performed.

18. The device control management apparatus as set forth in claim 17, wherein the control right management section adds or release the control right in accordance with a type of the control command.

19. The device control management apparatus as set forth in claim 18, wherein the control right management section judges whether or not the control command is a command which changes an operative condition of each of the controlled devices, and the control right management section does not add or release the control right in case where the control command is a command which does not change the operative condition of the controlled device.

20. The device control management apparatus as set forth in claim 18, wherein the control right management section adds the control right to a communication device, which has sent a communication connection establishment command, in case where the control right management section receives the communication connection establishment command.

21. The device control management apparatus as set forth in claim 18, wherein the control right management section releases the control right of a communication device, which has sent a communication connection cut-off command, in case where the control right management section receives the communication connection cut-off command.

22. The device control management apparatus as set forth in claim 17, wherein in case where the control right management section receives one or more control commands, targeted in adding the control right, from one or more communication devices connected to the device control management apparatus via the first communication paths, the control right management section adds the control rights to a predetermined number of communication devices out of the communication devices which have sent the control commands.

23. The device control management apparatus as set forth in claim 22, wherein in case where the control right management section receives the control commands, targeted in adding the control right, from a plurality of communication devices connected to the device control management apparatus via the first communication paths, the control right management section adds the control rights to the communication devices in such an order that a first communication device having sent the control command first receives the control right.

24. The device control management apparatus as set forth in claim 17, wherein in case where the control right is released from a certain communication device, the control right management section selects a next communication device, to which the control right is to be added, from other communication devices connected to the device control management apparatus via the first communication paths.

25. The device control management apparatus as set forth in claim 24, wherein the control right management section selects a communication device which has sent the control command, targeted in adding the control right, to the device control management apparatus, as a next communication device to which the control right is to be added.

26. The device control management apparatus as set forth in claim 17, wherein when the control right is to be added to a communication device, the control right management section notifies a communication device which newly obtains the control right or a controlled device which is newly targeted that the control right is added.

27. The device control management apparatus as set forth in claim 17, wherein when the control right is to be released to a communication device, the control right management section notifies the communication device which had the control right or the controlled device which was controlled by the communication device that the control right is released.

28. A communication device, connected to the device control management apparatus as set forth in claim 17 via a first communication path, said communication device comprising a display control section receiving a control right obtaining condition from the device control management apparatus and for controlling a display so that the control right obtaining condition is displayed in case where the control command is sent to the device control management apparatus.

29. A device control management apparatus, being connected to each of communication devices via each of first communication paths, having a function for controlling a controlled device in accordance with a predetermined control command, said device control management apparatus being characterized by comprising:

a control right management section controlling the controlled device in accordance with the control command and for adding or releasing the control right for the controlled device to or from the communication device which has sent the control command in case where the device control management apparatus receives the control command for the controlled device from the communication device via the first communication path, where the control right management section includes a control information management table, in advance, that allows the control right management section to add or release the control right for the controlled devices; and a communication management section for detecting a communication condition for one of the first communication paths, wherein the control right management section is capable of changing a setting of the control right without communicating with the communication device for which the control right is set;

the change of setting is made in accordance with variation of the communication condition detected by the communication management section, and the communication device is notified by the controlled device of a result of the control right, where the result includes either a notification of a success when the control right is successfully performed and a notification of a failure when the control right is unsuccessfully performed.

30. The device control management apparatus as set forth in claim 29, wherein the controlled device is provided in the device control management apparatus.

31. The device control management apparatus as set forth in claim 29, wherein control right information of the controlled device is not included in the control command of the controlled device.

* * * * *

UNITED STATES PATENT AND TRADEMARK OFFICE
CERTIFICATE OF CORRECTION

PATENT NO. : 7,620,713 B2  Page 1 of 1
APPLICATION NO. : 10/512057
DATED : November 17, 2009
INVENTOR(S) : Tokuhashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Twenty-sixth Day of October, 2010

David J. Kappos
*Director of the United States Patent and Trademark Office*